US012578035B2

(12) United States Patent
Alexeenko et al.

(10) Patent No.: US 12,578,035 B2
(45) Date of Patent: Mar. 17, 2026

(54) MICROELECTRONIC THERMAL VALVE

(71) Applicant: Purdue Research Foundation, West Lafayette, IN (US)

(72) Inventors: Alina Alexeenko, West Lafayette, IN (US); Anthony George Cofer, Lafayette, IN (US); Stephen Douglas Heister, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/389,880

(22) Filed: Dec. 20, 2023

(65) Prior Publication Data

US 2024/0175522 A1 May 30, 2024

Related U.S. Application Data

(60) Division of application No. 17/306,811, filed on May 3, 2021, now Pat. No. 11,867,319, which is a continuation of application No. 15/370,633, filed on Dec. 6, 2016, now Pat. No. 10,995,879.

(60) Provisional application No. 62/263,719, filed on Dec. 6, 2015.

(51) Int. Cl.
| | |
|---|---|
| *F16K 99/00* | (2006.01) |
| *B64G 1/10* | (2006.01) |
| *B64G 1/40* | (2006.01) |
| *B64G 1/50* | (2006.01) |

(52) U.S. Cl.
CPC ............ *F16K 99/0017* (2013.01); *B64G 1/10* (2013.01); *B64G 1/401* (2013.01); *B64G 1/50* (2013.01); *F16K 99/0036* (2013.01); *F16K 2099/0092* (2013.01); *F16K 2099/0094* (2013.01)

(58) Field of Classification Search
CPC ............ F16K 99/0017; F16K 99/0036; F16K 2099/0092; F16K 2099/0094; F02K 7/08; B64G 1/10; B64G 1/401; B64G 1/50
USPC ...................... 244/171.1; 60/203.1, 204, 221
See application file for complete search history.

(56) References Cited

U.S. PATENT DOCUMENTS

| | | | | | |
|---|---|---|---|---|---|
| 2,342,262 | A | * | 2/1944 | Anselm ..................... | F01N 5/00 60/242 |
| 3,350,885 | A | * | 11/1967 | Hall .......................... | F02K 5/00 392/324 |
| 3,478,712 | A | * | 11/1969 | Fox .......................... | B63H 11/11 60/221 |
| 3,575,003 | A | * | 4/1971 | LaRocca ................... | F02K 5/00 60/204 |
| 3,603,093 | A | * | 9/1971 | Isley .......................... | F02K 9/68 60/260 |
| 3,647,137 | A | * | 3/1972 | Naydan ................... | F04F 99/00 60/221 |

(Continued)

*Primary Examiner* — Brady W Frazier
(74) *Attorney, Agent, or Firm* — Gerald W. Roberts; John V. Daniluck; Dentons Bingham Greenebaum LLP

(57) ABSTRACT

A microfabricated valve with no moving parts. In one embodiment, the valve includes a reservoir of a liquid that is in fluid communication with an outlet channel having a throat that is less than 100 microns wide. Preferably, the channel is an elongated slit. The configuration of channel is adapted and configured such that surface tension of the liquid prevents flow out of the channel. A heater increases the temperature of the meniscus of the fluid, until a portion of the fluid is ejected from the channel. The ejection of the fluid creates both a thrusting effect and a cooling effect.

1 Claim, 45 Drawing Sheets

(56)  References Cited

U.S. PATENT DOCUMENTS

| | | | | | |
|---|---|---|---|---|---|
| 4,821,508 | A | * | 4/1989 | Burton | F03H 1/0087 |
| | | | | | 60/204 |
| 4,821,509 | A | * | 4/1989 | Burton | F03H 1/0087 |
| | | | | | 60/204 |
| 5,519,991 | A | * | 5/1996 | Butler | B64G 1/415 |
| | | | | | 313/46 |
| 5,901,551 | A | * | 5/1999 | Butler | B64G 1/415 |
| | | | | | 219/121.48 |
| 6,263,665 | B1 | * | 7/2001 | Ketsdever | B64G 1/415 |
| | | | | | 60/203.1 |
| 6,293,091 | B1 | * | 9/2001 | Seymour | F02K 1/008 |
| | | | | | 60/245 |
| 6,996,972 | B2 | * | 2/2006 | Song | B05B 5/0255 |
| | | | | | 60/202 |
| 7,516,610 | B2 | * | 4/2009 | Gilchrist | F03H 1/005 |
| | | | | | 60/202 |
| 2008/0094448 | A1 | * | 4/2008 | Sugahara | B41J 2/17513 |
| | | | | | 347/55 |
| 2008/0202093 | A1 | * | 8/2008 | Simon | F03H 1/00 |
| | | | | | 60/203.1 |
| 2010/0058734 | A1 | * | 3/2010 | Stein | F03H 1/0093 |
| | | | | | 60/200.1 |
| 2012/0144796 | A1 | * | 6/2012 | Marrese-Reading | |
| | | | | | F03H 1/0012 |
| | | | | | 205/205 |
| 2015/0198380 | A1 | * | 7/2015 | Haj-Hariri | F28D 15/02 |
| | | | | | 62/3.2 |

* cited by examiner

Etch Inlet and outlet

Add oxide layer

Add Nichrome layer

Add Gold layer

Etch Gold

Etch Nichrome-

Etch throat -

Nozzle Inlet and Throat 1 cm

Gold Conductor 0.5 micron thick by 200 microns wide

Silicon Oxide Insulating Layer 4 microns thick

Nichrome Heater 0.7 micron thick by 10 microns wide 200 microns

Etch nozzle

Add oxide
layer

Add copper
layer

Etch copper

Add
nichrome
layer

Etch nichrome
and oxide

Vac-High PC-Std. 10 kV x 2700 ——— 10 μm

Vac-High PC-Std. 10 kV x 800 ——— 20 μm

Vac-High PC-Std. 10kV x 15000 ———— 2 μm

Vac-High PC-Std. 10 kV x 2700 ———— 10 μm

Etch Nozzle
Inlet

Deposit Oxide
Insulator

Deposit Platinum
Layer

Etch Platinum
Outside Inlet

Etch Throat

Etch Exit
Cavity

MICROELECTRONIC THERMAL VALVE

CROSS REFERENCE TO RELATED APPLICATIONS

This application is a divisional of U.S. patent application Ser. No. 17/306,81, filed May 3, 2021, which is a continuation of U.S. patent application Ser. No. 15/370,633, filed Dec. 6, 2016, which issued as U.S. Pat. No. 10,995,879 on May 4, 2021, which claims the benefit of priority to U.S. Provisional Patent Application No. 62/263,719, filed Dec. 6, 2015, all of which are incorporated herein by reference.

GOVERNMENT SUPPORT CLAUSE

This invention was made with government support under NNX13AR02A awarded by the National Aeronautics and Space Administration. The government has certain rights in the invention.

TECHNICAL FIELD

The present application relates to valves including thermally activated valves, and including valves that operate a thrusting device.

BACKGROUND

This section introduces aspects that may help facilitate a better understanding of the disclosure. Accordingly, these statements are to be read in this light and are not to be understood as admissions about what is or is not prior art.

In many applications, there is a need for a minute amount of fluid to pass through a valve. At micro-scales, ensuring the desired release volume is difficult to impractical with current technologies. Various technologies exists. For example, a peristaltic pump not only separates small amounts of fluid from a reservoir, but also pumps the fluid downstream. However, such a pump includes a complex motor assembly and control. Ink jet technologies is another area where small amounts of fluid are jetted out. In this class of technology, a plurality of small chambers, generally formed by a photolithography process are used to propel a droplet of ink out of the printer an on to a medium. Each chamber contains a heater that is configured to heat liquid surrounding it causing a rapid vaporization. In operation, an electrical current pulse is provided to each heater, which then vaporizes liquid ink in immediate vicinity, causing a sudden rise in pressure near the tip of the chamber forming a bubble which then causes a droplet of ink to be ejected. The chamber is then refilled by the next payload by surface tension and a negative pressure caused by contraction of the vapor bubble once the heater has cooled. However, the inkjet technology is not practical in various applications where continuous release of fluid is desired over a short period of time at high release velocity. In other words, the basic tenant of heating and vaporizing liquid at immediate vicinity of the heater to propel a droplet of ink in the chamber, including cycling of the next payload by cooling the heater does not provide a mechanism for continuous release for a short period of time.

There is, therefore an unmet need for a novel valve arrangement that can be used to release fluid from a reservoir at micro-scale volumes in a continuous manner for specific periods of time.

SUMMARY OF THE INVENTION

A propulsion system has been developed for potential application for control of nano and picosats. The device, which relies on capillary control of water within a micron-sized high aspect ratio nozzle, has been shown to deliver specific impulse over 80 seconds, a value that exceeds cold gas performance. The device is the only known capability to meet the volume and power demands of these small spacecraft with an overall volume of less than 2 cubic centimeters, a mass less than two grams and thruster powers less than 400 mW using an input potential of 2-5 VDC. Using a nozzle aspect ratio of four, stable and repeatable thrust values were measured and ranged from 6 $\mu$N at 25 mW of input power to 68 $\mu$N at 300 mW power level with an average thrust to power ratio of around 230 $\mu$N/W. The o/off response time was around 200 milliseconds. The low pressure liquid propellant storage means a much greater mass ratio than high pressure systems whose effective Isp might be a tiny fraction of that of the propellant.

The evaporation of water that serves as thrust production mechanism also has the benefit of providing cooling to the local structure. In the units with throat aspect ratios of two, cooling coefficients of performance as high as 11 have been measured. Unfortunately the thrust performance of the AR~2 units has proven to be unreliable due to meniscus instability leading to increased response times and uncommanded impulses. However, this intermittent performance has shown a greatly enhanced thrust to power ratio as much as 5 mN/W, an order of magnitude greater than AR~4, because more vaporization energy is extracted from the optimal aspect ratio such that energy and propulsion efficiency can be maximized.

One aspect of the present invention pertains to a method for applying thrust to a spacecraft. The spacecraft is provided with a plurality of valves having apertures which are maintained closed by surface tension of a liquid. The valves are covered by shutters when not in use. The shutter assembly is electrostatically actuated using the force generated between two plates of different potential. Serpentine silicon springs hold the shutter, a silicon bar, in place when in quiescent mode to prevent propellant loss. The plates are energized prior to the heaters to allow unrestricted access of the vapor jet to the vacuum. In some embodiments the temperature of the valve is sensed by a resistance temperature device or other sensor, with this temperature information being provided to a controller of the spacecraft.

One aspect of the present invention pertains to a method for controlling the flow of a liquid. Some embodiments include closing an aperture in a chamber containing liquid by the surface tension of the liquid. Other embodiments include heating a portion of the liquid proximate to the aperture and changing a physical property of the portion by the heating. Still other embodiments include reclosing the aperture by the surface tension of the liquid after the flowing.

Another aspect of the present invention pertains to a valve for controlling the flow of a liquid. Some embodiments include a chamber having an interior adapted and configured as a reservoir of liquid. Other embodiments include an aperture in the chamber, the aperture having an entrance in fluid communication with the liquid and an exit in fluid communication with the ambient conditions of the chamber. Still other embodiments include a source of heat proximate to the aperture, wherein application of heat from the source to the liquid changes a physical property of the liquid at the entrance and permits an ejection of the liquid from the exit to ambient conditions.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 21 shows 3-axis control on a cubesat; FIG. 22 shows 4×12 array inlet side up; FIG. 23 shows close up of a single element inlet side up showing 60-10 micron converging inlet and electrical connectors.

FIG. 33 shows a top view, FIG. 34 shows a cross section, and FIG. 35 shows a close up—not to scale.

FIG. 41B is repeated from FIG. 41A (which is shown on the previous page of figures).

5

Figures 77, 78:
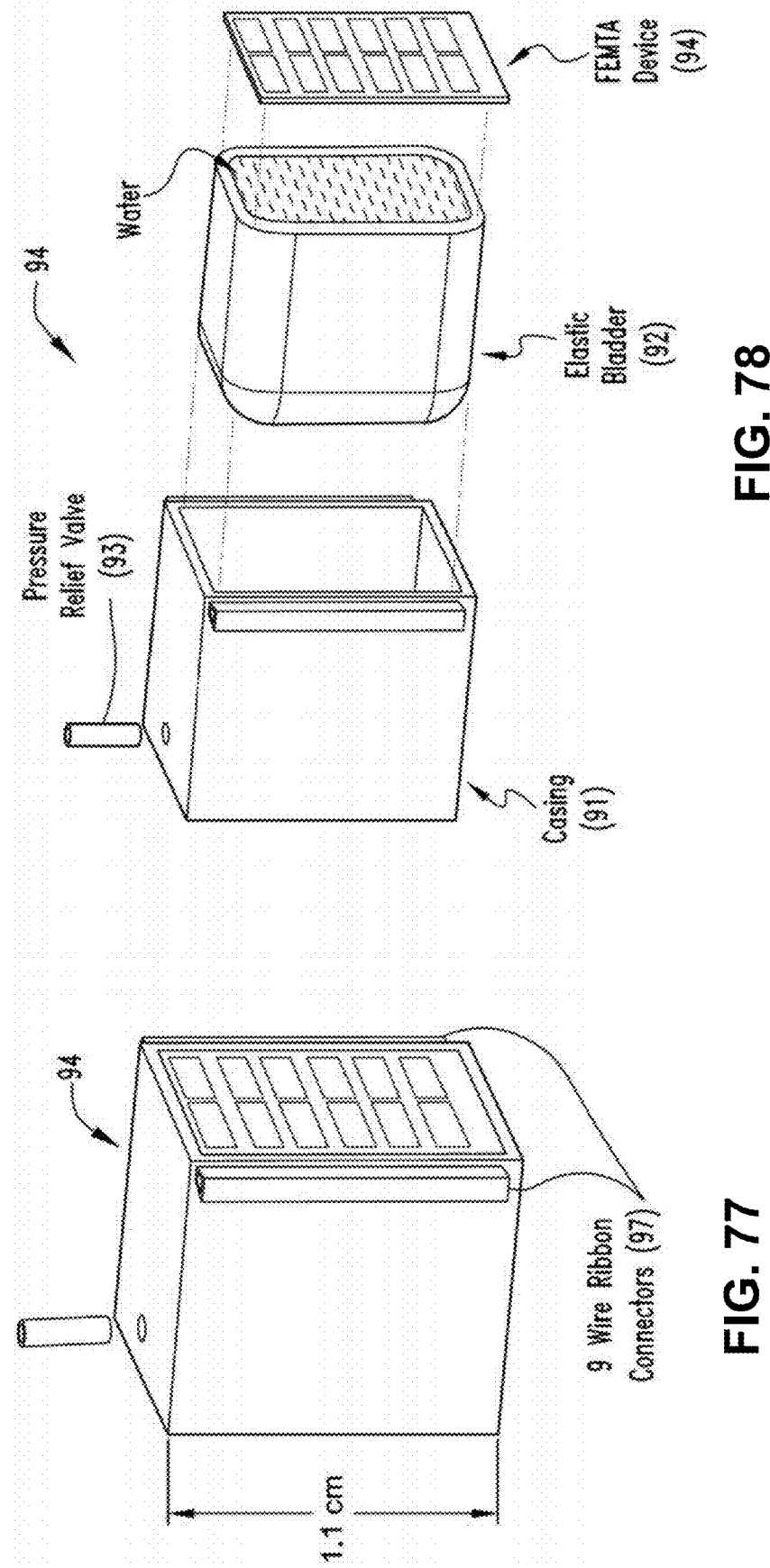

FIG. 77 and FIG. 78 show the unit assembly for FEMTA array device with 1 g of propellant; assembled (FIG. 77) and exploded view (FIG. 78).

ELEMENT NUMBERING

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety.

| | |
|---|---|
| 20 | valve |
| 30 | channel, slit |
| 34 | inlet |
| 38 | outlet |
| 40 | heating elements |
| 90 | cubesat |
| 91 | casing |
| 92 | elastic bladder |
| 93 | pressure relief valve |
| 94 | thruster array |
| 95 | serpentine springs |
| 96 | microshutter assembly |
| 96.1 | conductor |
| 96.2 | shutter |
| 97 | ribbon cables |
| 98 | microthruster |
| 99 | resistance temperature device |

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments, it therefore being understood that use of the word "preferably" implies the term "optional."

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present invention, is discussion of one or more tests or simulations that were performed. It is understood that such examples are by way of example only, and are not to be construed as being limitations on any embodiment of the present invention. Further, it is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Various references may be made to one or more methods of manufacturing. It is understood that these are by way of example only, and various embodiments of the invention can be fabricated in a wide variety of ways, such as by etching, photolithography, casting, sintering, sputtering, welding, electrodischarge machining, milling, as examples. Further, various other embodiment may be fabricated by any of the various additive manufacturing methods, some of which are referred to 3-D printing.

This document may use different words to describe the same element number, or to refer to an element number in a specific family of features. It is understood that such multiple usage is not intended to provide a redefinition of any language herein. It is understood that such words demonstrate that the particular feature can be considered in various linguistical ways, such ways not necessarily being additive or exclusive.

What will be shown and described herein are one or more functional relationships among variables. Specific nomenclature for the variables may be provided, although some relationships may include variables that will be recognized by persons of ordinary skill in the art for their meaning. For example, "t" could be representative of temperature or time, as would be readily apparent by their usage. However, it is further recognized that such functional relationships can be expressed in a variety of equivalents using standard techniques of mathematical analysis (for instance, the relationship F=ma is equivalent to the relationship F/a=m). Further, in those embodiments in which functional relationships are implemented in an algorithm or computer software, it is understood that an algorithm-implemented variable can correspond to a variable shown herein, with this correspondence including a scaling factor, control system gain, noise filter, or the like.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Miniaturization of electronic systems and sensors has created a new class of spacecraft which can perform the same missions as previous bulky and energy demanding machines but at a fraction of the mass and power. As the space industry shifts toward the private domain new technologies will be driven by economics. Large, complex, and expensive can give way to the small and affordable as long as functionality and reliability are not compromised. As launch costs are mass and volume based smaller satellites and probes are gaining popularity. A 1 U cubesat (a 10 cm cube with 1.33 kg maximum mass) can be launched for as little as $50,000 so that new markets are emerging in academia, developing nations, small businesses, and even high schools.

Applications of pico and nano-sats include disposable short-term surveillance and communication missions in LEO, Lunar and planetary orbits, telemetry relays for orbit insertions and shadowed flybys, and upper atmospheric mapping. These smallsats can provide a cost effective solution where massive systems are not needed. There are however no mature technologies currently available for tunable propulsion and precise attitude control at this scale without sacrificing a substantial mass fraction of the vehicle.

A space born vehicle is generally only useful as long as position and orientation can be controlled. Angular momentum can be adjusted by reaction wheels but in a constant torque situation these quickly reach their operational limit and should be desaturated with either a microthruster or a magnetorquer if an ambient magnetic field is present. However miniaturized mechanical technology has not kept pace with electronics due to microscale effects such as viscosity, surface tension, and stiction, thus microthruster performance does not scale down linearly with mass. Various electric propulsion systems have been designed and implemented but all suffer from excess power consumption and bulky power processing units needed to produce either high voltages or high currents. Many require long start up times so that fast response is difficult. There are currently no commercially available propulsion systems that can be integrated into a 1 U cubesat that does not require less than 10 T of the mass or volume budget and consumes less than the 1 of Watt power usually allocated for propulsion of this class vehicle.

Figure 15:
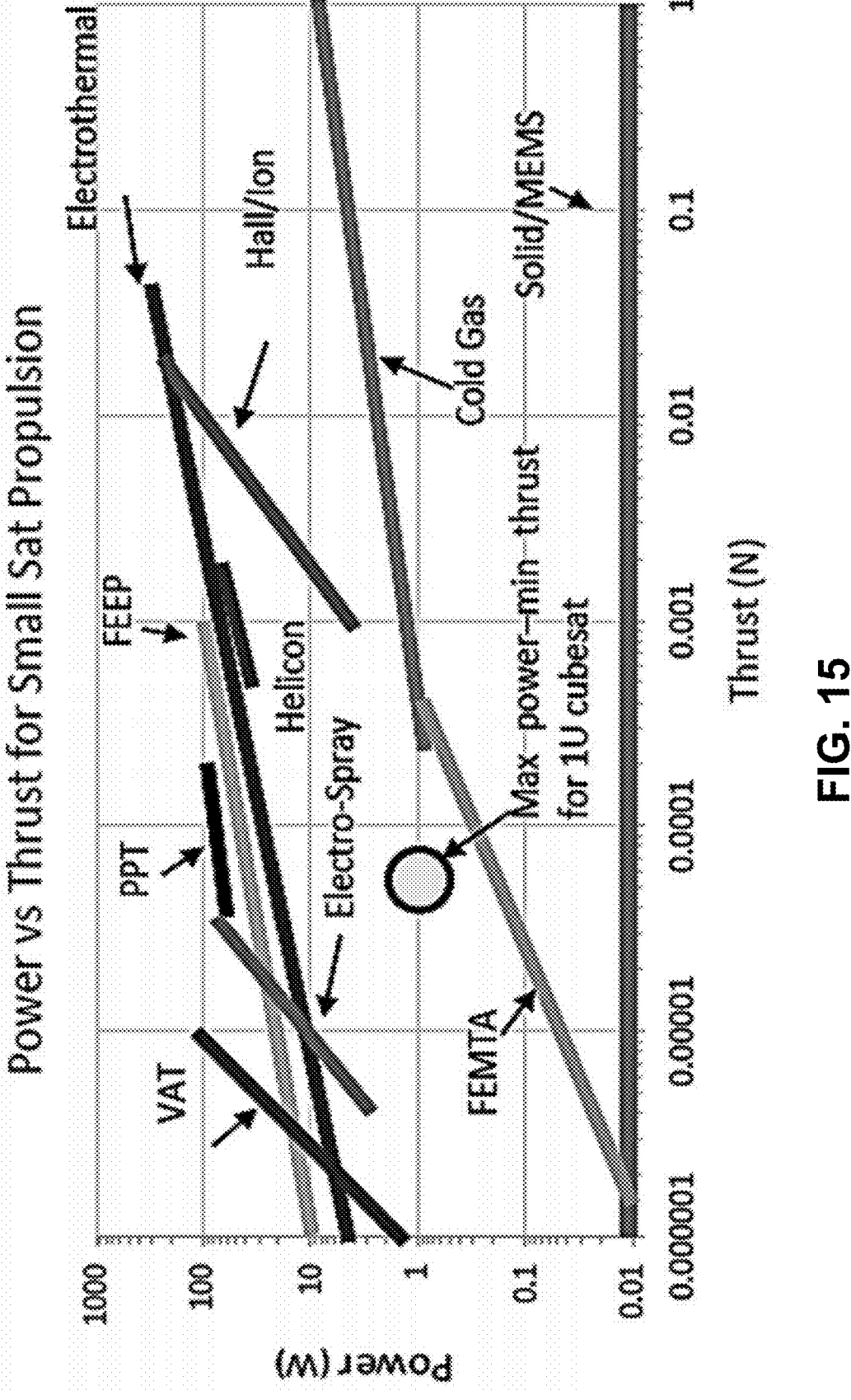
FIG. 15 shows power vs. thrust for smallsat propulsion.

The plot in FIG. 15 compares the power to thrust options that are available or are currently in development. Liquid chemical micropropulsion options for small satellite systems (i.e. cube-sats, nano-sats, pico-sats) are currently limited by feed system complexity and viscous effects, which dominate low Reynolds number flows, inhibiting efficient operation at low thrust levels. MEMS solid thruster arrays can provide high thrust at low power but is pulsed with a limited number of impulse bits which can vary as much as 19% and have been known to cross fire.

Electric propulsion offers high Isp but with high power/thrust demands and require power supplies which are bulky, complex, and expensive. High Isp types of electric propulsion rely on high voltage plasma systems that are more susceptible to radiation damage and therefore have to be specially designed and constructed which increases cost and thus the overall micropropulsion systems size is the key challenge.

Solar sails are an option if interplanetary flight is required though difficult to control and has no attitude correction ability. The solar flux can produce about 4.6 pN/m2 thrust at Earth's orbit for 100 m2 of sail with mass of 1 g/m2. These sails require a rigid frame such that the perimeter to area ratio is larger for small sails so thrust to mass is reduced at small scale. Also they can only be controlled by shifting the center of gravity of the vehicle in relation to the center of pressure which requires a mechanical actuation system adding more mass and complexity.

Unproven electrodynamic tethers offer the ability to change orbits but also no attitude control though they may be useful for deorbiting. The thrust to power ratio varies according to the external magnetic field which is dependent on altitude and inclination, for instance at 380 km it is 31 $\mu$N/W at 70° inclination or 69 $\mu$N/W at the equator. Tethers for propulsion require 2 spacecraft to maintain tension on the wire.

The concept for the Film Evaporation MEMS Tunable Array (FEMTA) described here was created as a response to these deficiencies. A visualization of a proposed three axis control system incorporating these thrusters can be found in FIG. 1 and FIG. 71, FIG. 72, and FIG. 73.

A cubesat 90 incorporates a plurality of thruster arrays 94, preferably on opposing external surfaces. The arrays are positioned on the satellite to provide redundant 6-axis attitude control. Each array 94 includes a plurality of individual microthrusters 98. In one embodiment, the microthrusters 98 are arranged in a two-dimensional array. In some embodiments, each microthruster comprises an elongated slit 30 that is adapted and configured to be closed by the surface tension of an internal fluid, such as a liquid. However, various other embodiments of the present invention contemplate any shape of aperture that can be adapted and configured to be closed by the surface tension of the working fluid, yet when the fluid is heated a physical property of the fluid (such as surface tension, vapor pressure, or the like) changes such that surface tension can no longer maintain the aperture closed. This application of heat can be commanded (such as an electrical command to a resistive heater from the spacecraft's attitude control system), or from internal waste heat of the satellite (such as from a heat sink, a capillary tube transferring heat from another location in the satellite, or the like).

Figures 71, 72, 73:
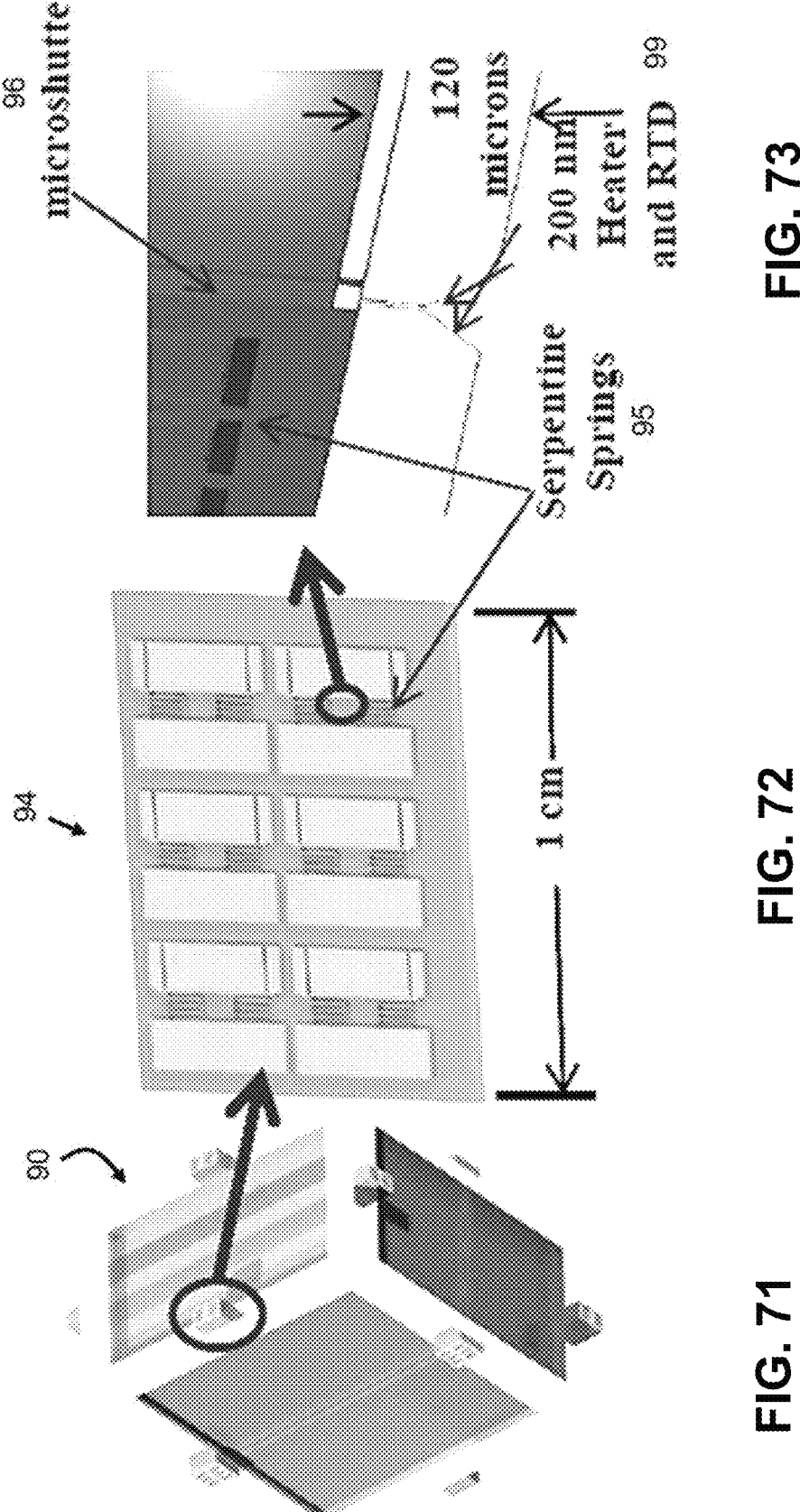
FIG. 71, FIG. 72, and FIG. 73 show a FEMTA 3×2 array according to other embodiments of the present invention: mounted on a cubesat (FIG. 71); close-up of die (FIG. 72); and close-up of shutter (FIG. 73).
Figures 74, 75, 76:
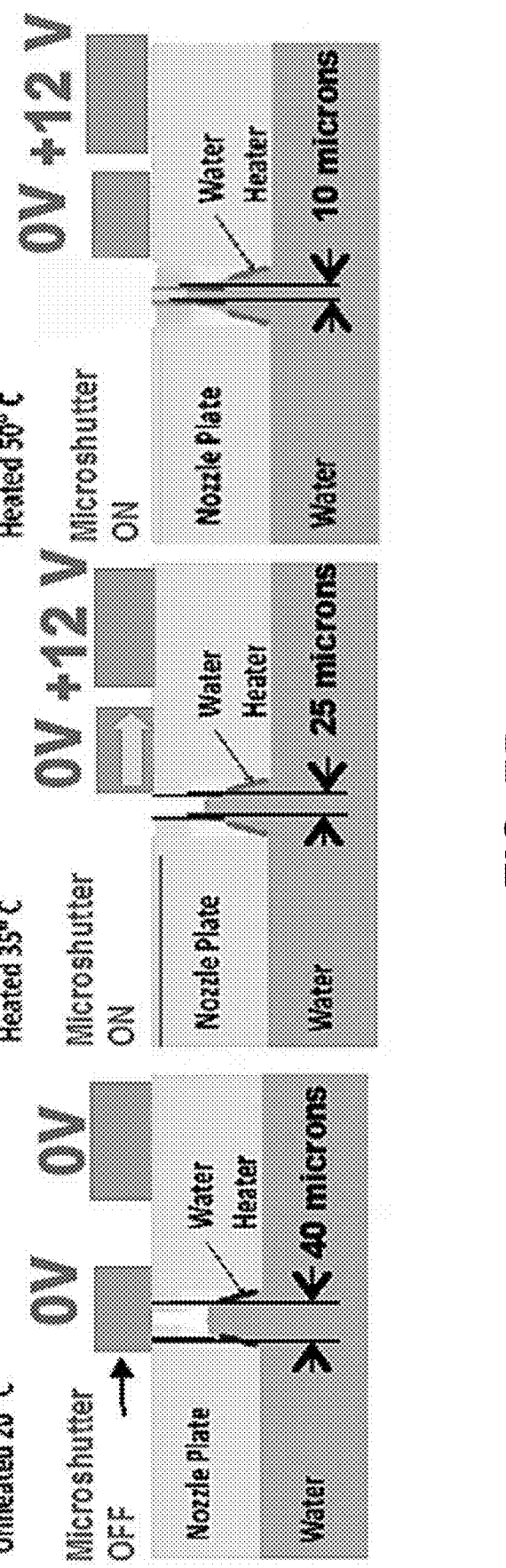
FIG. 74, FIG. 75, and FIG. 76 show schematically the operation of a microthruster according to the embodiment of FIG. 71.

FIGS. 71, 72, 73, 74, 75, and 76 show the apparatus and schematic operation of a cubesat thruster according to another embodiment of the present invention. FIG. 71 shows a cubesat having a plurality of microthruster arrays 94 positioned on various surfaces of the cubesat 90. Each thruster array 94 includes a plurality of microthrusters 94, each covered when not operating by respective microshutters assembly 96. Each assembly 96 includes a microshutter 96.2 that covers the microthruster channel 30 when not operating. One or more serpentine springs 95 connect microshutter 96.2 to an adjacent conductor 96.1. Prior to operation, the spacecraft attitude control system applies a voltage difference between the shutter 96.2 and conductor 96.1. This voltage (such as a DC voltage is sufficient to create an electrostatic field that moves the microshutter 96.1 to expose the channel 30. When the microshutter assembly 96 is placed in this armed state, the application of heat to the liquid proximate to the channel results in the inability of the liquid surface tension to keep the channel closed. Subsequently, liquid is ejected from channel 30 having a thrusting and/or cooling effect on the spacecraft.

The film-evaporation MEMS tunable array (FEMTA) concept utilizes microscale effects in fluid surface tension and heat transfer and advanced microfabrication techniques to integrate the propellant storage, feedthroughs and valving in a compact micropropulsion system. The phase change energy can be provided by the native heat generation of the vehicle by heat sinking to the metal frame that is standard for cubesats. Using the MEMS fabrication process, the decoder and driver electronics can be integrated onto the FEMTA propulsion and thermal management chip itself. The power requirement is a low-voltage source in the range of 1 Watt or less. Thrust to power is approximately 300 μN/W. The entire FEMTA unit with 1 gram of propellant could be fabricated with a total mass of less than 2 grams and volumes less than 2 cm3 which makes it suitable for picosatellites (i.e. 1 U cubesat) of 1 Watt power or less.

The compact microfabricated thermal valving and very-high-integration level will enable fast high-capacity cooling and high-resolution, low-power micropropulsion for picosats that is applicable to all existing smallsat micropropulsion and thermal management alternatives. The development and demonstration program directly responds to the requirement for new smallsat technologies in propulsion and thermal management. The FEMTA subsystem enables picosat capabilities for orbital maneuvering, formation flying, proximity operations, rendezvous, docking and precision pointing.

Figure 1:
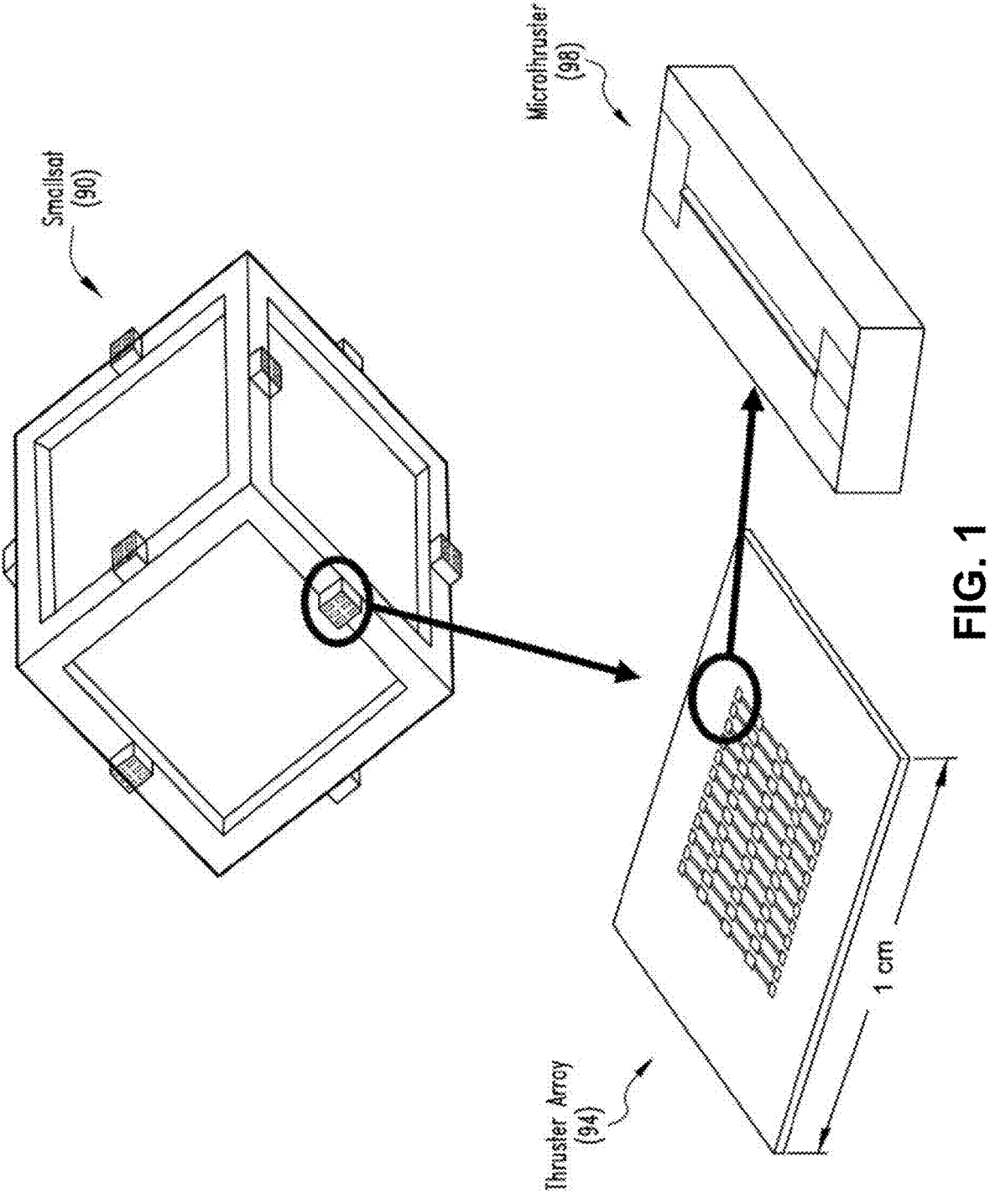
FIG. 1 is a rendering of 12 FEMTA units positioned for 3-axis control on a 1 U cubesat in low Mars orbit (top); close-up of 10×10 thruster array (bottom left); close-up of individual nozzle (bottom right).
Figures 2, 3, 4:
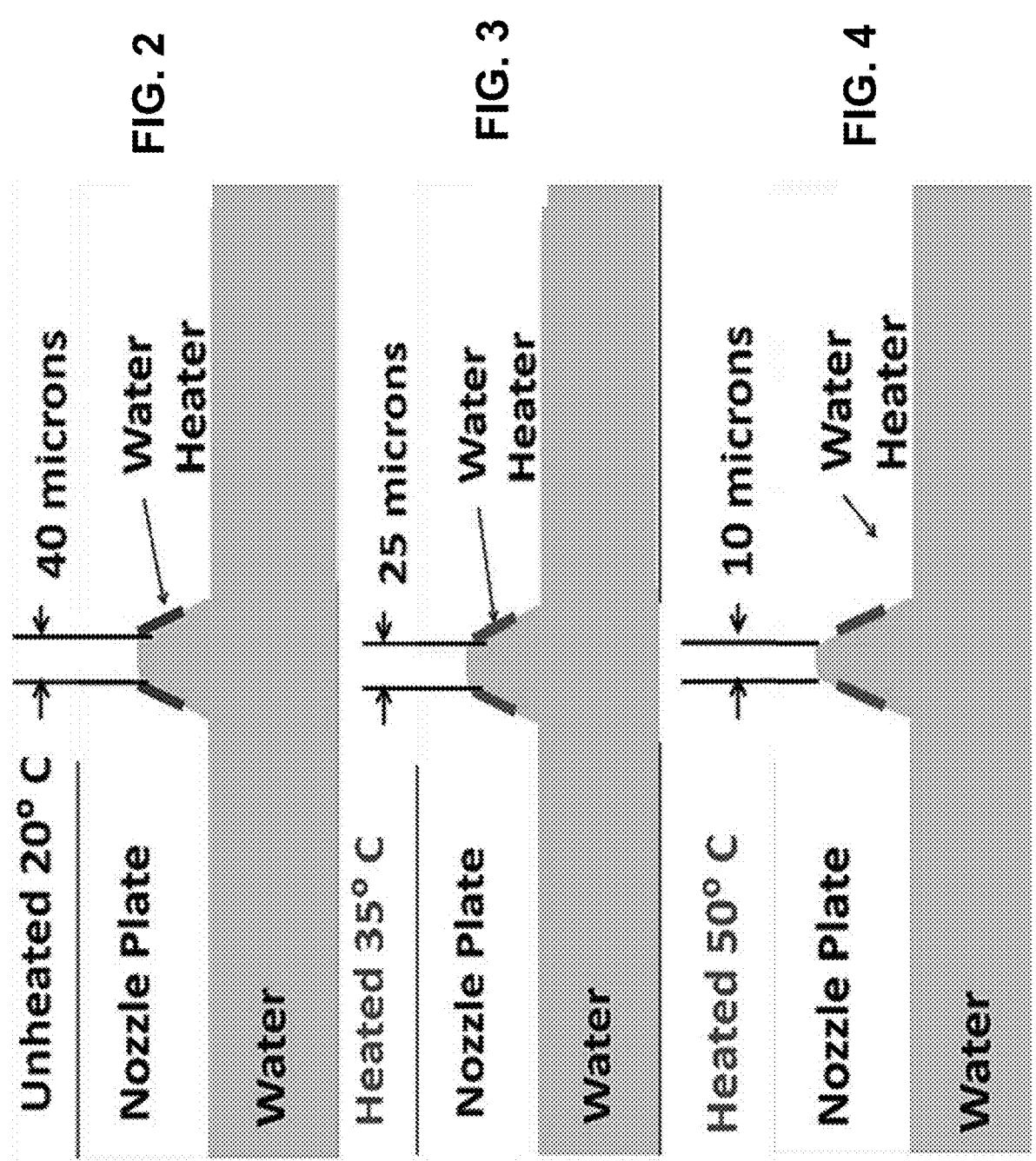
FIG. 2, FIG. 3, and FIG. 4 show the progression of meniscus with temperature; cold (FIG. 2); warm (FIG. 3); and firing (FIG. 4).

FEMTA operation utilizes the microscale effects of surface tension and hydrophobicity to balance with stresses created by temperature dependent vapor pressure, as shown in FIG. 2, FIG. 3, and FIG. 4, and is loosely based on inkjet technology. A critical size of capillary for the surface tension is being balanced by normal stresses due to the pressure drop across the boundary can be estimated from the Young-Laplace equation as $$d = \frac{2\tau\cos\theta}{p_{vap}}$$

where d is the gap size of the annular or slit capillary, $\tau$ is the surface tension, $\theta$ is surface contact angle, $p_{vap}$ is vapor pressure which depends exponentially on the temperature of the liquid film. Specifically for water the critical gap size varies from d=60 μm to 10 μm for film temperatures from 20 to 50° C. as plotted in FIG. 5. When the capillary size is above the critical value a rapid evaporation can be triggered. This provides low-power, compact and highly controllable thermal valve for individual elements in the FEMTA array. No moving parts or high pressure is required so the system volume is orders of magnitude smaller than for those with the stat-of-the-art proportional (e.g. solenoid) valves. The film-evaporation valve can be directly embedded on the micromachined propellant storage container. Because the physical effect of the thermal valving is on the micrometer scale, individual thrusters should be sized accordingly. Multiple elements are used to provide the desired maximum thrust. This also augments minimum impulse control and provides a redundancy feature in case of failure of one or more elements.

Figure 5:
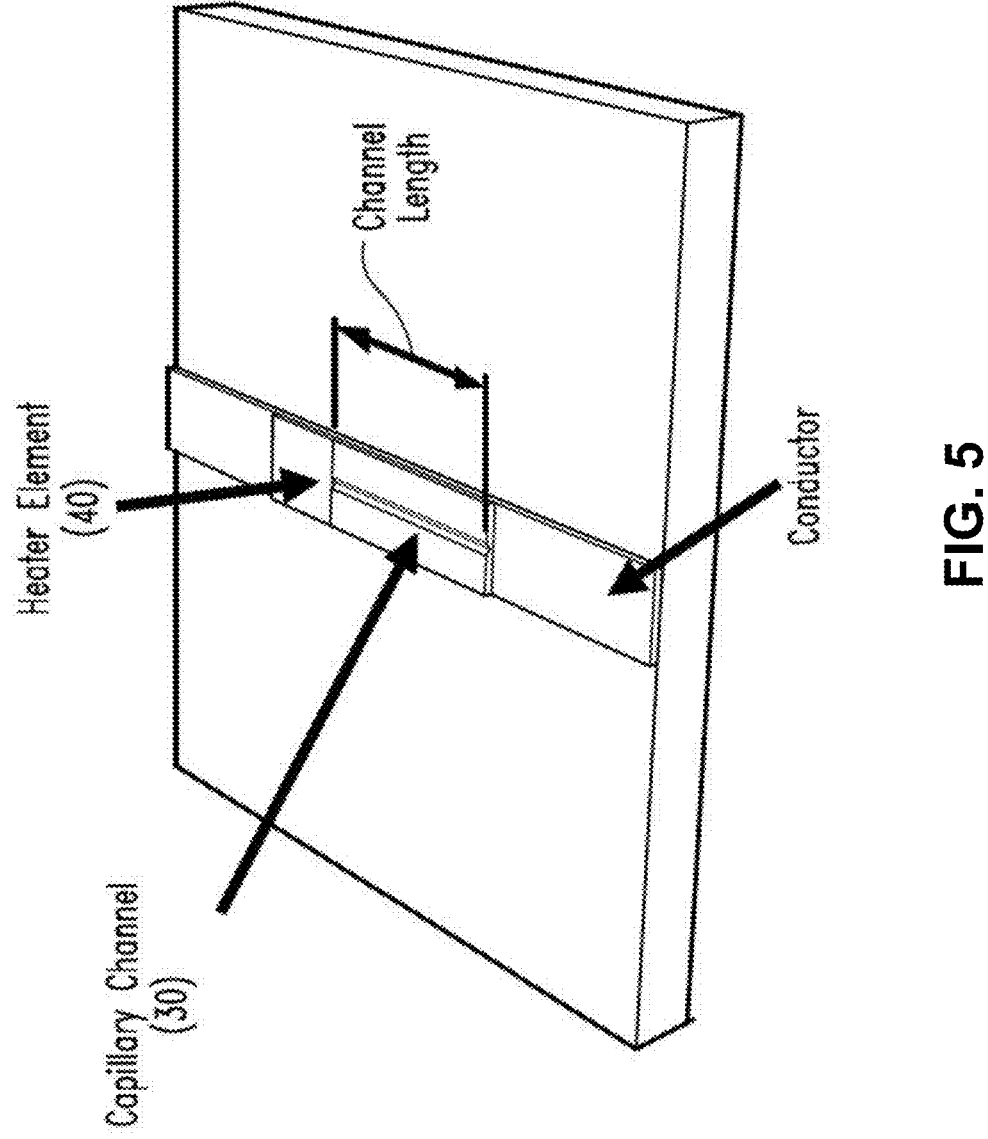
FIG. 5 is a schematic representation in perspective view of a thermal valve according to one embodiment of the present invention.
Figure 6:
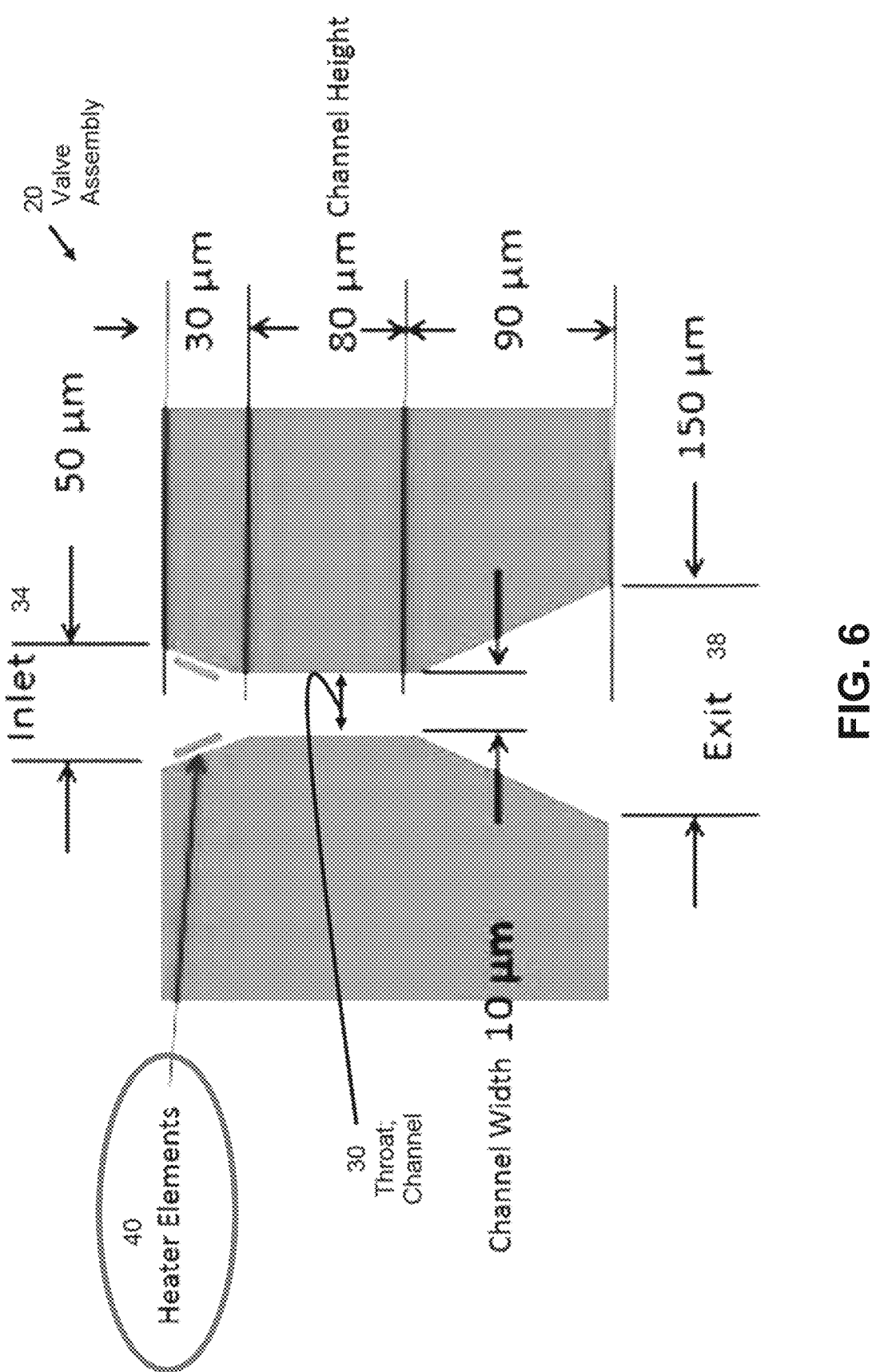
FIG. 6 is a cross sectional representation of the capillary channel of FIG. 5.

Various embodiments of a novel valve arrangement that can be used to release fluid from a reservoir at micro-scale volumes in a continuous manner for specified periods of time are presented herein. Referring to FIG. 5 and FIG. 6, schematic representations of the valve arrangement according to the present disclosure is shown. It should be appreciated that sizes shown in FIG. 6 and throughout this document are for reference purposes only and should not be taken as limiting the scope of the valve arrangement. As shown in these figures, the valve 20 arrangement includes an inlet 34, an outlet 38, a channel 30, and heating elements 40 positioned at the inlet. The inlet is coupled to a fluid reservoir. The heater elements in one embodiment can comprise nichrome dimensioned at 700 nanometers thick and 10 micrometers wide. Conductors, e.g., 100 nanometers thick layers of gold, are provided to make electrical contact with the heaters and to cover the nichrome except for the exposed elements. Some embodiments of the valve shown in FIG. 6 (and the various other embodiment herein) include variations of the channel width and the aspect ratio between channel width and channel height. These dimensional parameters help provide the ability for the valve to shut off flow due to surface tension when the heaters are not heating the fluid.

Figure 7:
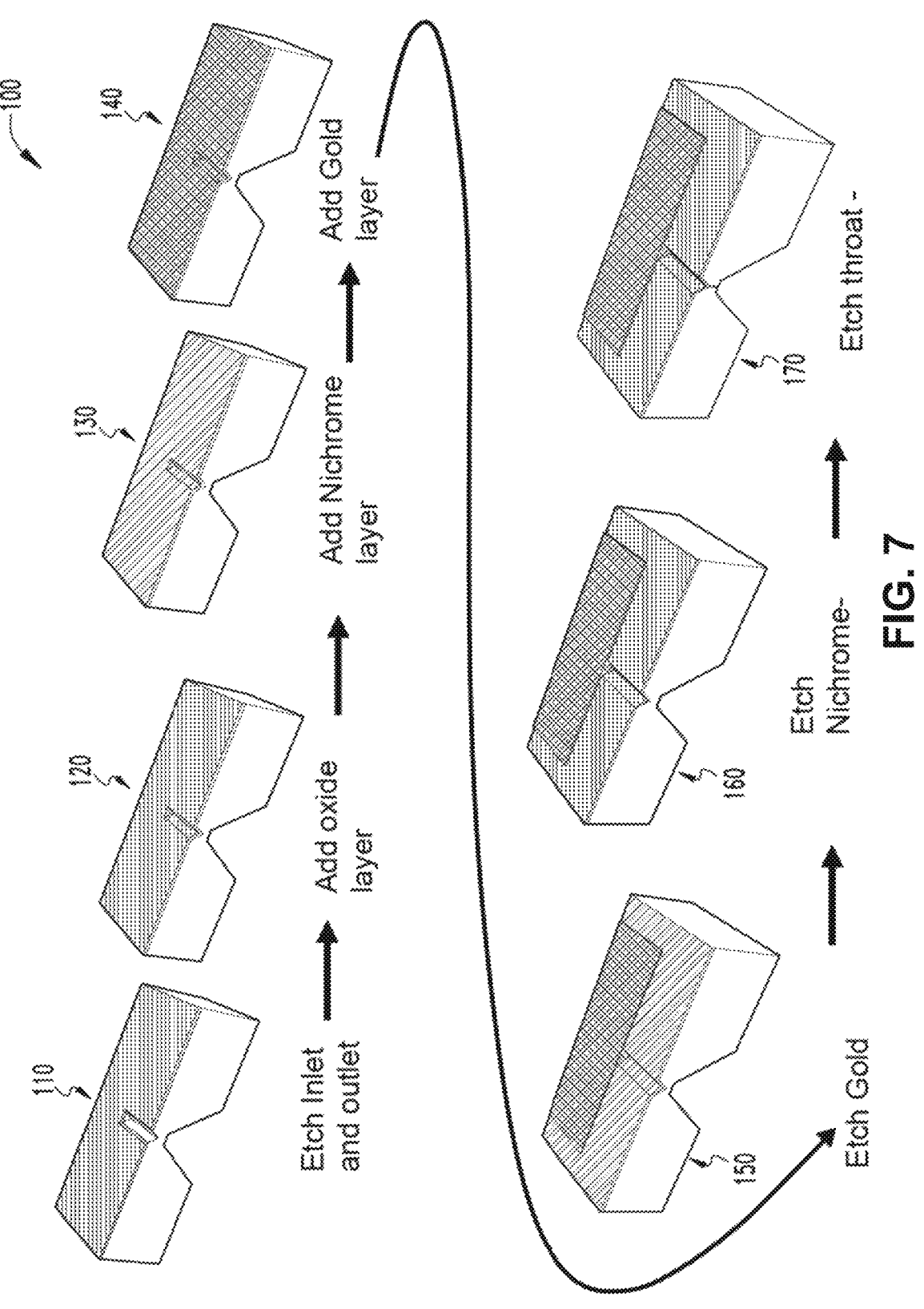
FIG. 7 is a schematic representation of one method of fabricating a thermal valve according to one embodiment of the present invention.

The following descriptions outlines one embodiment for a method 100 of making the valve arrangement according to the present disclosure, and shown schematically in FIG. 7

Nozzle Inlet/Exit Lithography

Apply AZ1827 photoresist to a 4 inch diameter 200 micrometer thick <1,0,0> silicon wafer and spin at 5000 rpm for 30 seconds in the G3 wafer spinner. Soft bake at 115° C. for 75 seconds on a hotplate then set aside to let rehydrate for 10 minutes. Expose in MA6 using either inlet or outlet mask for 18 seconds at 14 mW/cm$^2$; use a 500 micrometer thick wafer beneath it for support. Immerse with slight agitation in pure MF26A solution for 6 seconds then rinse with ultrapure water and check development, repeat with 3 second increments until image is completely delineated.

RIE Etch Nozzle Silicon Oxide Mask

Mount on a 4 inch diameter 500 micrometer thick plain supporting wafer using Crystal Bonding® adhesive by heating the supporting wafer to 85° C. (Crystal Bonding melts at 60° C.), applying the Crystal Bonding, then pressing the device wafer to the melted adhesive. RIE in the AOE for two runs of 2.5 minutes each with 5 minutes cool down time between. Unmount wafer by remelting the adhesive and sliding the wafers apart, wash the Crystal Bonding away with water and then soak the device wafer in Bakers PRS2000 photoresist stripper for at least 30 minutes. Wash the wafer in water and dry in a 120° C. oven for 10 minutes. Repeat the steps i and ii on the reverse side of the wafer using the opposite (inlet or exit) mask and the backside alignment feature of MA6. This may involve temporarily sticking the device wafer to a glass wafer with a drop of water as adhesive for additional support.

Wet Etch Nozzle Inlet/Exit

Immerse wafer in 40% potassium hydroxide in water heated to 80° C. with 100 rpm stirring. Etch to desired depth of exit determined by 80 micrometers per hour for 40% KOH; 1 hr 15 minutes for Type B or 2 hrs for Type A. Rinse thoroughly in water after etching.

Deposit Silicon Oxide

Strip the wafer of remaining oxide by immersing in buffered oxide etch (BOE) for 8 to 10 minutes until all surfaces appear hydrophobic. Clean the sample with a solution of piranha (1 part 98% sulfuric acid and 1 part 30% hydrogen peroxide) for 10 minutes and rinsed with water. Place the wafer in the oxide oven and select the 5000 angstrom wet oxide recipe. Remove the wafer after recipe is completed, about 6½ hours.

Deposit Heater/Conductor Material

Sample is lightly taped with KAPTON to a 6 inch wafer and placed in the Plasmatech RIE system where it is roughened for 30 seconds at 50 sccm flow rate of argon at 100 watts RF power. The wafer is now ready for metal deposition in the Mantis sputtering system. After the system has been vented, the sample is mounted on the Mantis turntable and the system pumped down for 2 to 4 hours until the chamber pressure falls below 2 microTorr. Argon is then introduced at 100 sccm flow rate and the nichrome source fired at 200 mA for 1 hour 15 minutes which sputters a 1.5 micrometer thick layer. The nichrome source is turned off and gold sputtered at 100 mA for 25 minutes which produces 0.5 micrometers of the conductor.

Conductor Lithography

Apply AZ9260 photoresist to the wafer and spin at 5000 rpm for 30 seconds in the G3 spinner. Soft bake on a hotplate at 100° C. for 7 minutes and set aside to let rehydrate for 30 minutes. Expose in MA6 using the conductor portion of the mask (with other portions covered with KAPTON tape) for 250 seconds at 14 mW/cm², use a 500 micrometer thick wafer for support. Rotate the wafer and repeat to expose all 4 quadrants. Immerse with slight agitation in AZ400 solution mixed with 3 parts water for 2 minutes then rinse with ultrapure water and check development, repeat with 1 minute increments until image is completely delineated and inlet channel is free of photoresist.

Wet Etch Conductor

Etch gold by immersing wafer in Gold Etchant TFA solution with mild agitation until visible gold is gone. Rinse thoroughly with water and check inlet channel under a microscope to ensure no spots of gold are left. Re-immerse for 10 second increments if necessary. After etching bake the wafer on a hotplate at 150° C. to hard set the photoresist. The next lithography will be applied on top of the old one.

Heater Material Outside Lithography

Apply AZ9260 photoresist to the wafer and spin at 5000 rpm for 30 seconds in the G3 spinner. Soft bake at 100° C. for 7 minutes on a hotplate then set aside to let rehydrate for 30 minutes. Expose in MA6 using the heater portion of the mask (with other portions covered with KAPTON tape) for 76 seconds at 14 mW/cm2, use a 500 micrometer thick wafer for support. Rotate the wafer and repeat to expose all 4 quadrants. Immerse with slight agitation in AZ400 solution mixed with 3 parts water for 1 minute then rinse with ultrapure water and check development, repeat with 15 second increments until image is completely delineated. Bake again at 120° C. for 2 minutes on a hotplate to reflow photoresist.

Wet Etch Outside Heater Material

Etch nichrome by immersing wafer in Nichrome Etchant TFN solution heated to 40° C. with mild agitation until visible nichrome is gone. Rinse thoroughly with water then soak the wafer in PRS2000 photoresist stripper for at least 2 hours. Wash the wafer in water and dry in a 120° C. oven for 10 minutes.

Heater Material Inside Lithography

Apply AZ9260 photoresist to the wafer and spin at 5000 rpm for 30 seconds in the G3 spinner. Soft bake at 100° C. for 7 minutes on a hotplate then set aside to let rehydrate for 30 minutes. Expose in MA6 using the 10 micrometer channel portion of the mask (with other portions covered with KAPTON tape) for 86 seconds at 14 mW/cm2, use a 500 micrometer thick wafer for support. Rotate the wafer and repeat to expose all 4 quadrants. Immerse with slight agitation in AZ400 solution mixed with 3 parts water for 6 minutes then rinse with ultrapure water and check development, repeat with 1 minute increments until the entire bottom of the inlet channel is visible. Bake again at 120° C. for 2 minutes on a hotplate to reflow photoresist.

Wet Etch Inside Heater Material

Etch nichrome by immersing wafer in Nichrome Etchant TFN solution heated to 60° C. with mild agitation for 30 seconds. Rinse thoroughly with water and dry with nitrogen.

RIE Etch Oxide

Mount on a 4 inch diameter 500 micrometer thick plain supporting wafer using crystal bonding adhesive. RIE etch in AOE for two runs of 2.5 minutes each with 5 minutes cool down time between. Unmount wafer and wash the crystal bonding away with water and then soak the device wafer in PRS2000 photoresist stripper for at least 1 hour. Wash the wafer in water and dry in a 120° C. oven for 10 minutes.

Nozzle Throat Lithography

Apply AZ9260 photoresist to the wafer and spin at 1000 rpm for 30 seconds in the G3 spinner. Soft bake at 100° C. for 17 minutes on a hotplate then set aside to let rehydrate for 2 hours. Expose in MA6 using the 5 micrometer channel portion of the mask (with other portions covered with KAPTON tape) for 250 seconds at 14 mW/cm2, use a 500 micrometer thick wafer for support. Rotate the wafer and repeat to expose all 4 quadrants. Immerse with slight agitation in AZ400 solution mixed with 3 parts water for 8 minutes then rinse with ultrapure water and check development, repeat with 1 minute increments until the entire bottom of the inlet channel is visible.

DRIE Etch Silicon Nozzle Throat

Mount on a 6 inch diameter plain supporting wafer using crystal bonding. DRIE etch in ASE using for 5 minute runs (2 for type A and 8 for type B) with 5 minutes cool down time between. Number of runs is determined by throat length with decreasing etch rate with increased aspect ratio. Unmount wafer by remelting the adhesive and sliding the wafers apart, wash the crystal bonding away with water and then soak the device wafer in Bakers PRS2000 photoresist stripper overnight. Wash the wafer in water and dry in a 120° C. oven for 10 minutes. If photoresist is still present, soak in NANOSTRIP 2X for 5 minutes then wash with water.

Wet Etch Oxide Nozzle Exit

Etch the oxide layer from the exit by carefully floating the wafer in a container of buffered oxide etch until the exit side surface is hydrophobic. Wash thoroughly with water and dry in a 120° C. oven for 10 minutes. The individual FEMTA dies can be separated by carefully scratching along the dicing lines with a diamond scribe and breaking them apart, this avoids nozzle blockage from silicon dust when using a dicing machine.

Cross sectioned schematics illustrating the deposition and etch method 100 are found in FIG. 7. Initially, the valve arrangement was fabricated using 200 micrometer by 100 millimeter <0 0 1> oriented silicon wafers; however, in certain circumstances due to their inherent fragility physical breakage during processing was observed. Wafers were often broken by vacuum clamping during photoresist spin and mask alignment in addition to fractures resulting from necessary handling with tweezers during developing and cleaning procedures.

Figure 8:
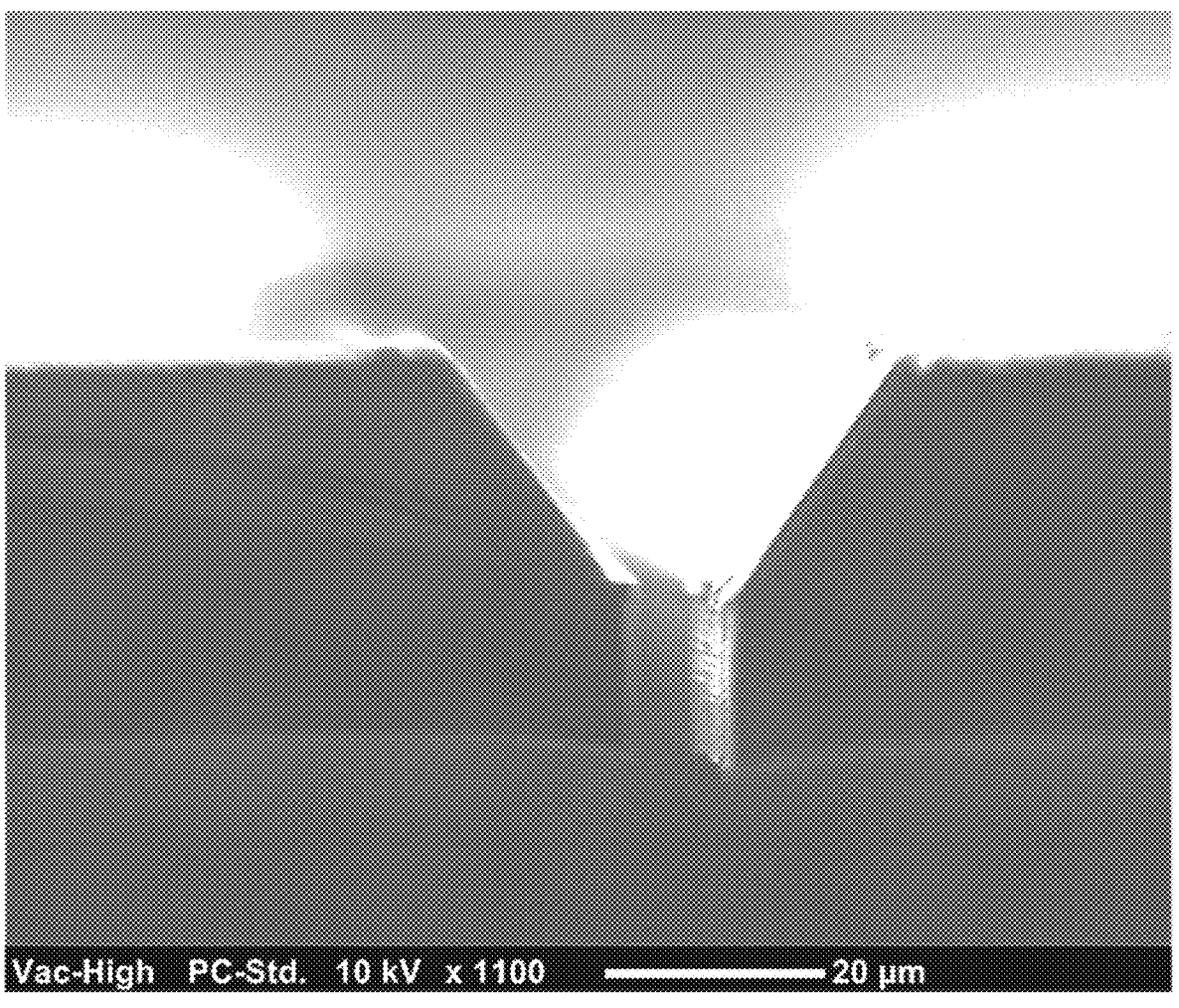
FIG. 8, FIG. 9, and FIG. 11 are SEM photographic representations of a channel according to one embodiment of the present invention.
Figure 9:
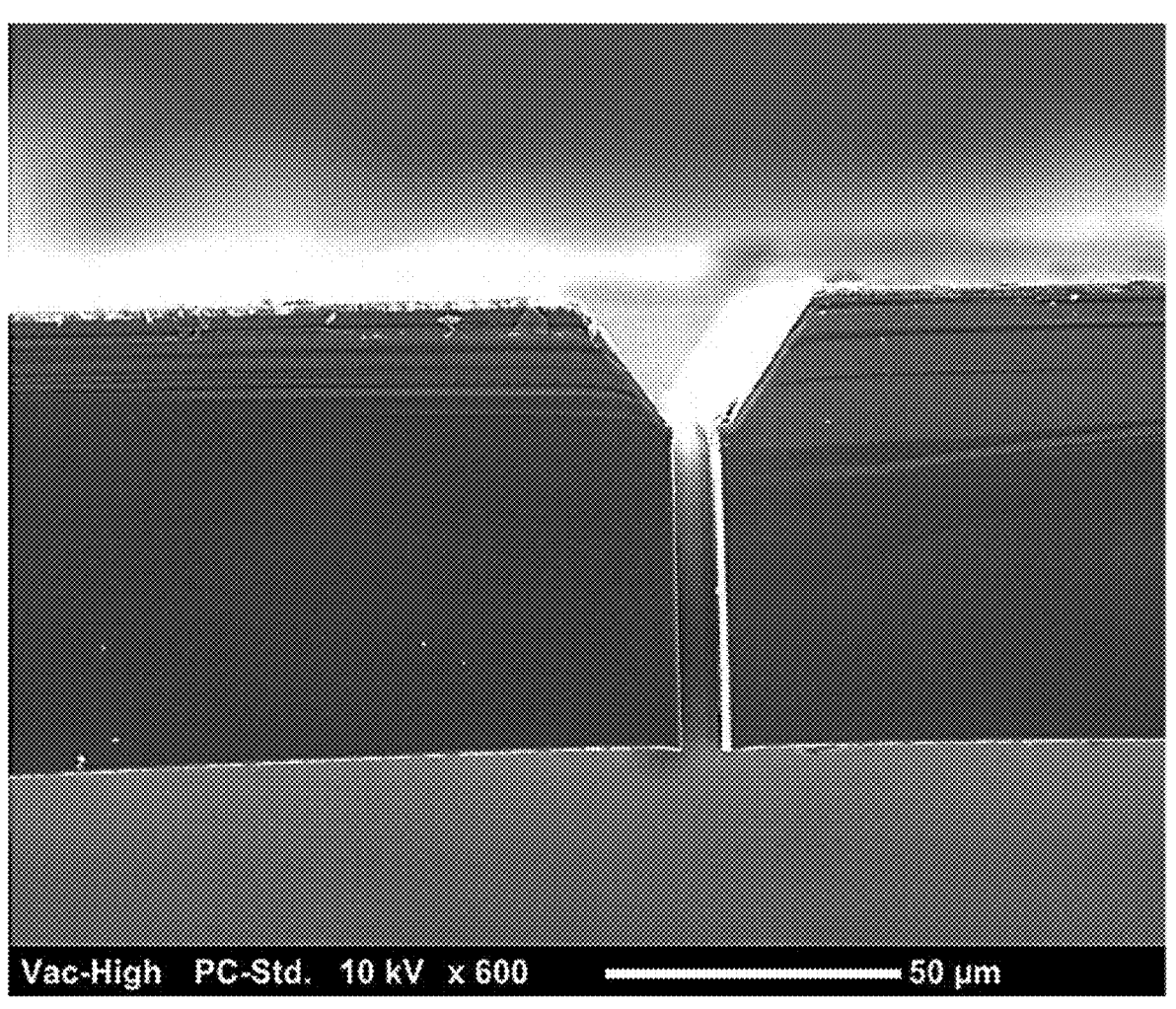
Figure 10:
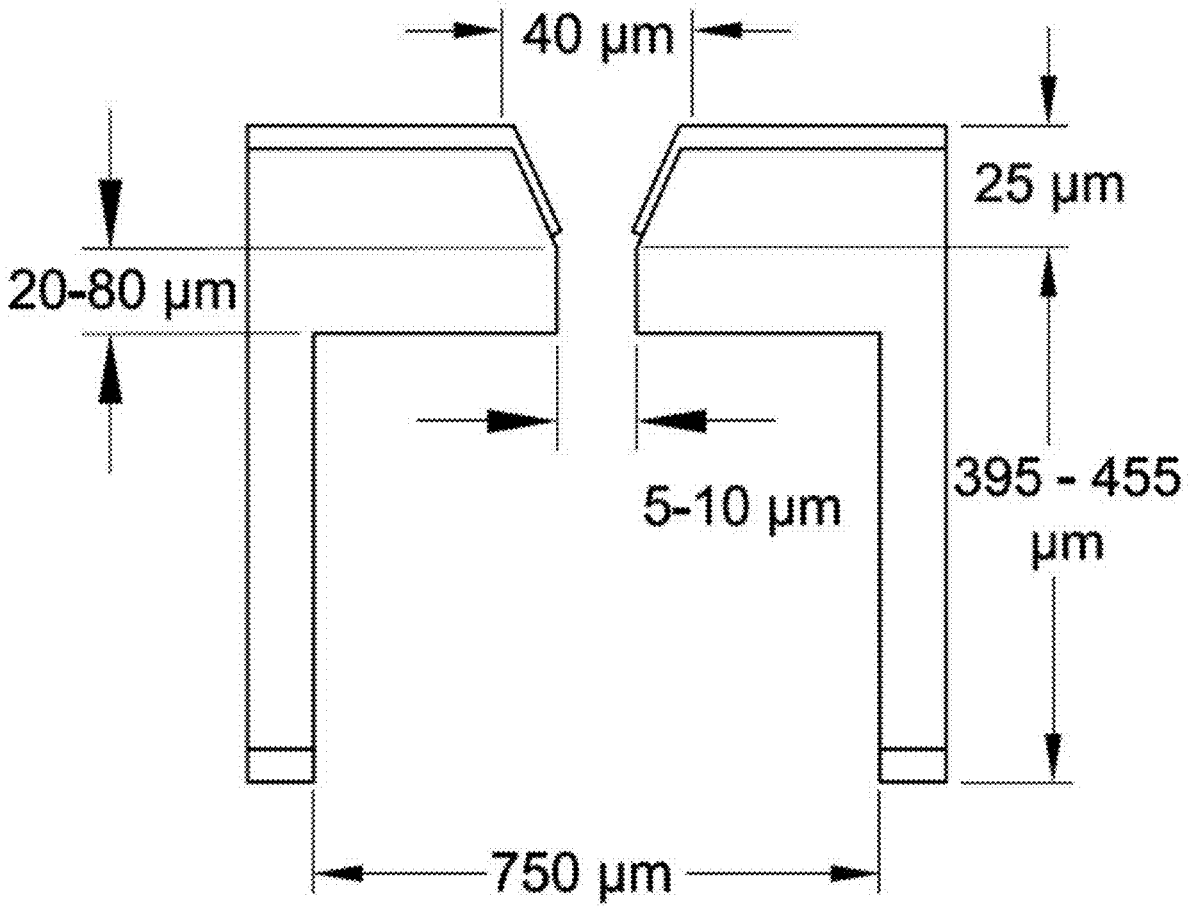
FIG. 10 is a schematic representation of a thermal valve according to another embodiment of the present invention.
Figure 11:
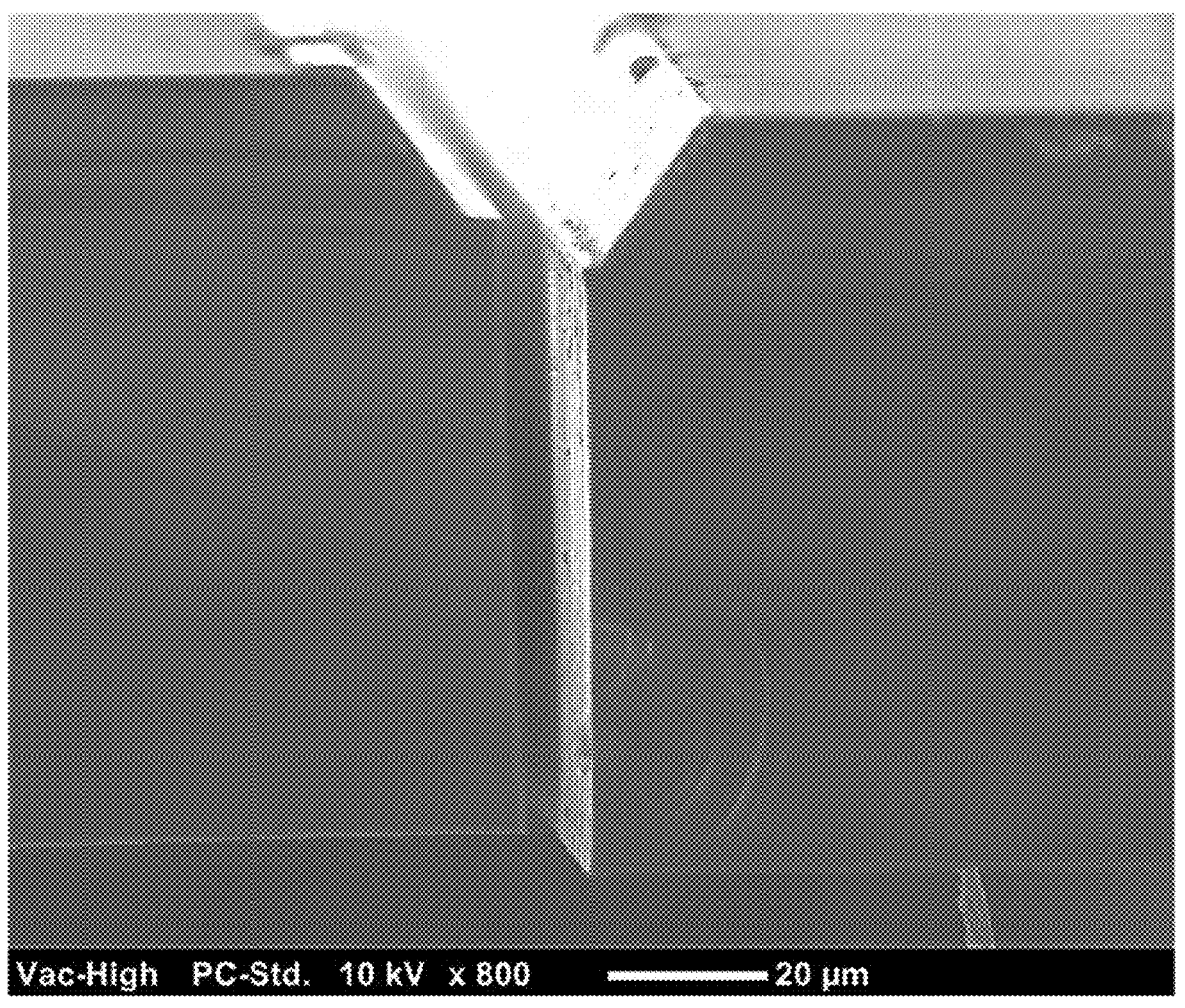
Figure 12:
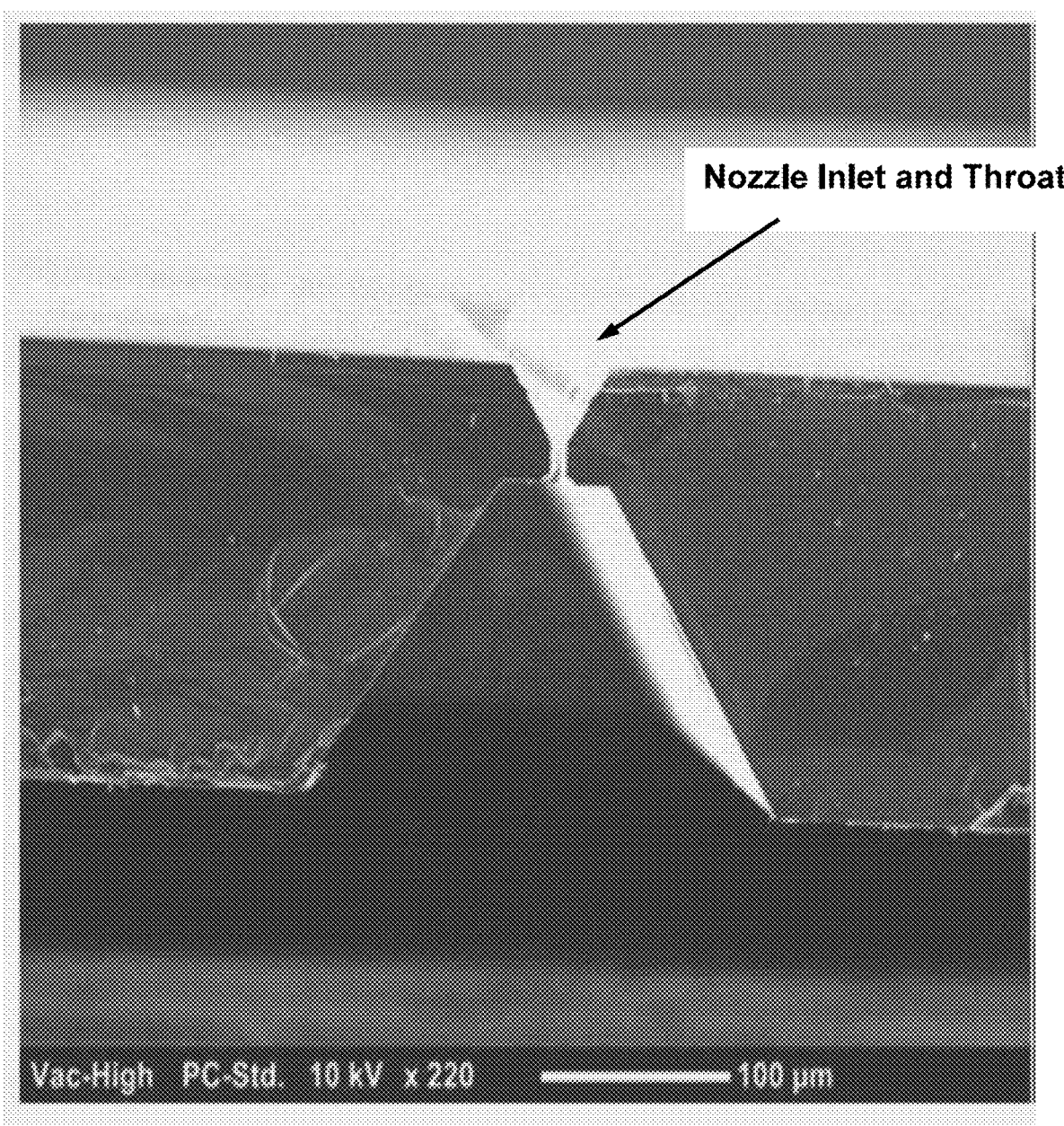
FIG. 12 and FIG. 13 are SEM photographic representations of portions of a thermal valve according to another embodiment of the present invention, showing AR~2 nozzle fabricated on 200 µm wafer (FIG. 12); and 500 µm wafer (FIG. 13) nozzle inlets and throats have the same dimensions.
Figure 13:
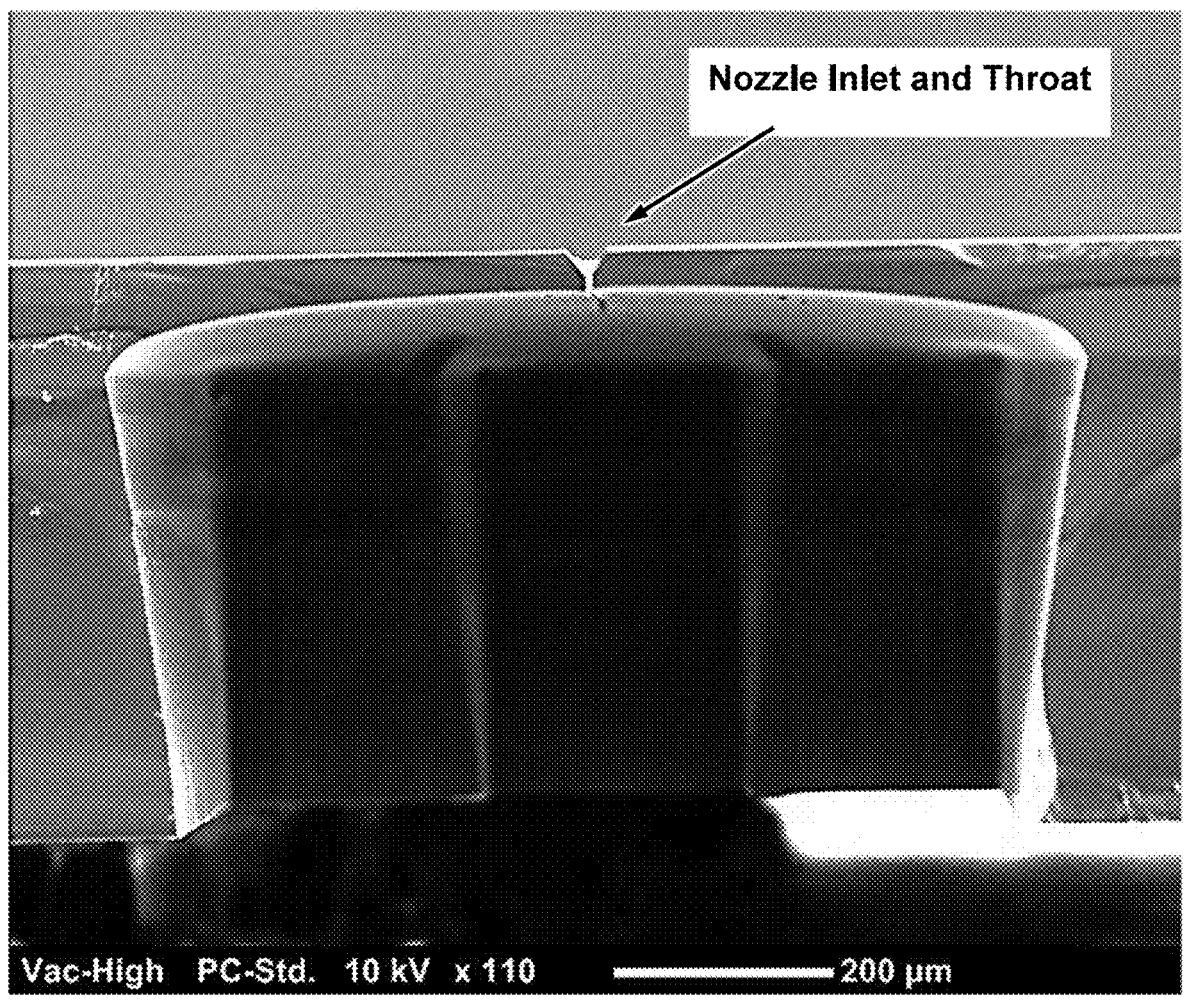

Various embodiments of the present invention contemplate a different deposition and etch method 200 and includes fabricating nozzles on a 500 micrometer thick wafer. This included removing about 450 micrometers of material on the exit side of the nozzle in the final step but provided a robust platform so that the wafer retained integrity throughout the entire process. This allowed greater homogeneity with respect to throat dimensions because they were all fabricated in parallel processes rather than one by one. SEM photos of cross sections of the nozzles can be seen in FIG. 8, FIG. 9, and FIG. 11. The dimensions provided in FIG. 10 are for reference purposes and should not be viewed as incorporating any limitation with respect to the valve arrangement of the present disclosure. FIG. 8 shows an aspect ratio of about 2, FIG. 9 shows an aspect ratio of about 6, and FIG. 11 shows an aspect ratio of about 8. A comparison of the different thickness wafers is seen in FIG. 12 (200 μm) and FIG. 13 (500 μm).

Figure 14:
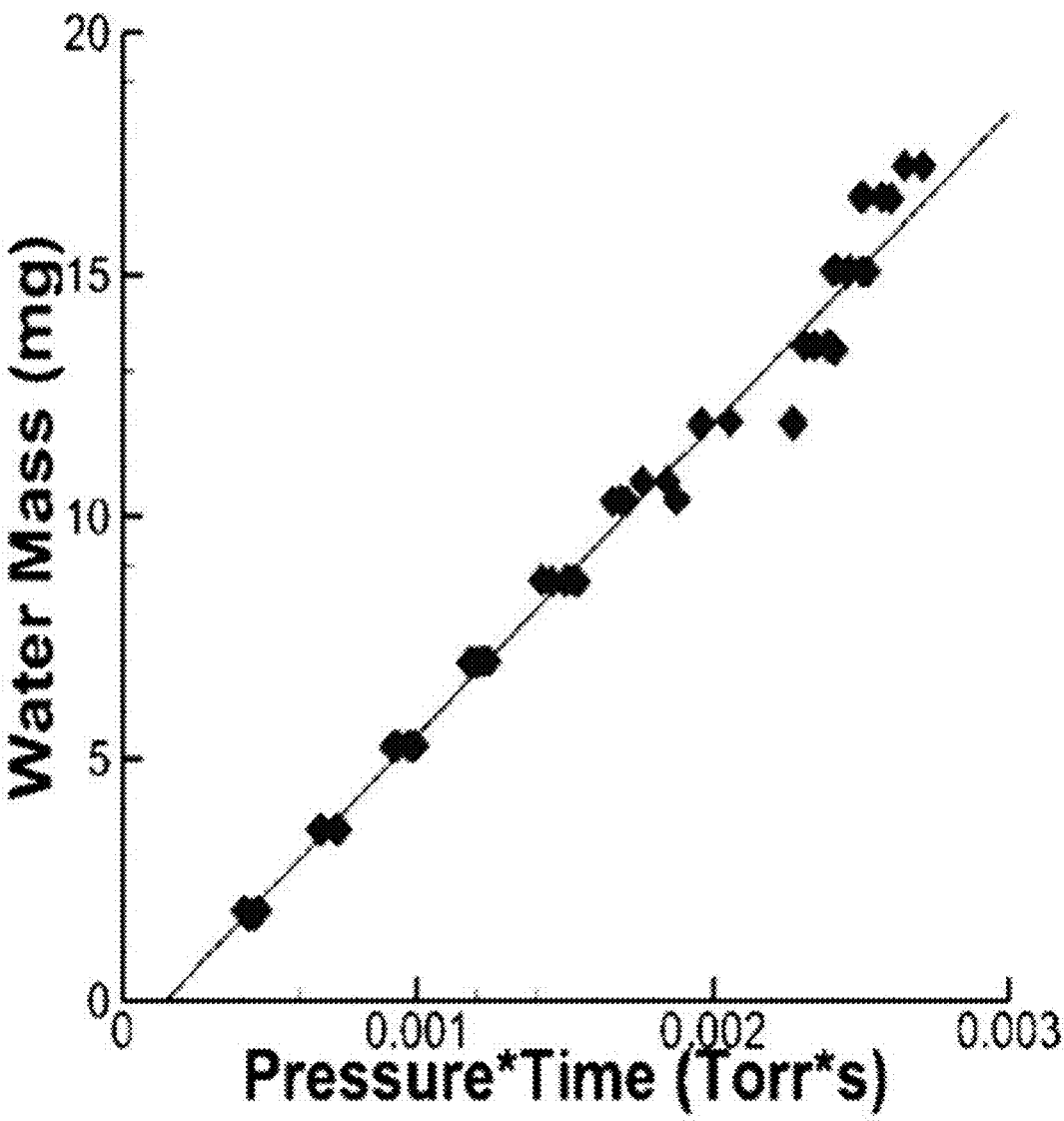
FIG. 14 is a graphical plot of the measured performance of a thermal valve according to another embodiment of the present invention.

Mass flow measurements for the thrust test were performed indirectly. The vacuum chamber was evacuated to base pressure of 5 microTorr and measured amounts of pure nitrogen were introduced over a specific period. A graph of mass flow rate measured in (mg/s) vs. Applied power (mW) is shown in FIG. 14, where for a 100 mW of power, about 0.03 mg/s flow rate is achieved.

Figures 16, 17, 18:
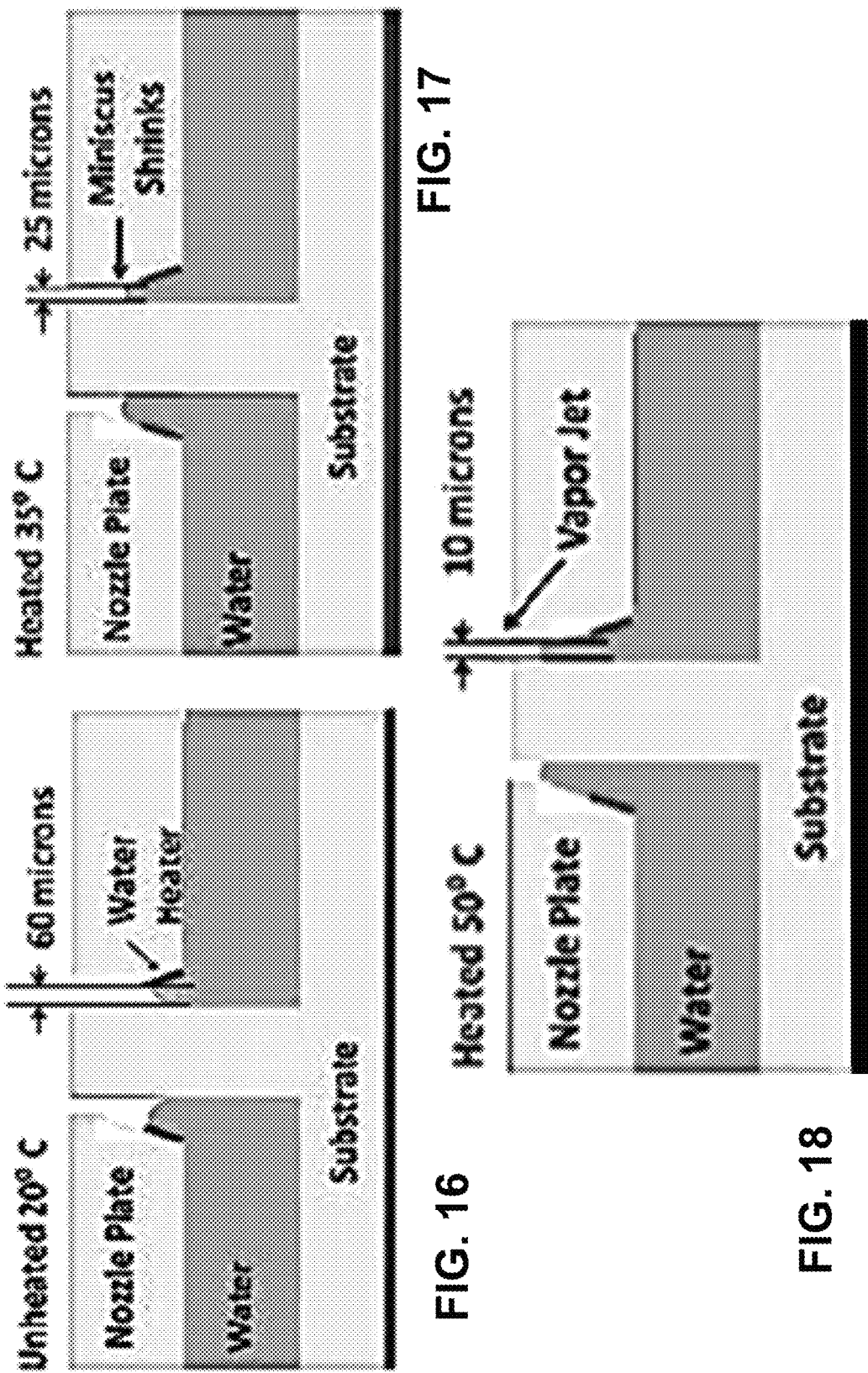
FIG. 16, FIG. 17, and FIG. 18 are schematic representations of FEMTA operation. Meniscus position changes with the local heating of the capillary wall. A single array element according to another embodiment of the present invention is shown.
Figures 19, 20:
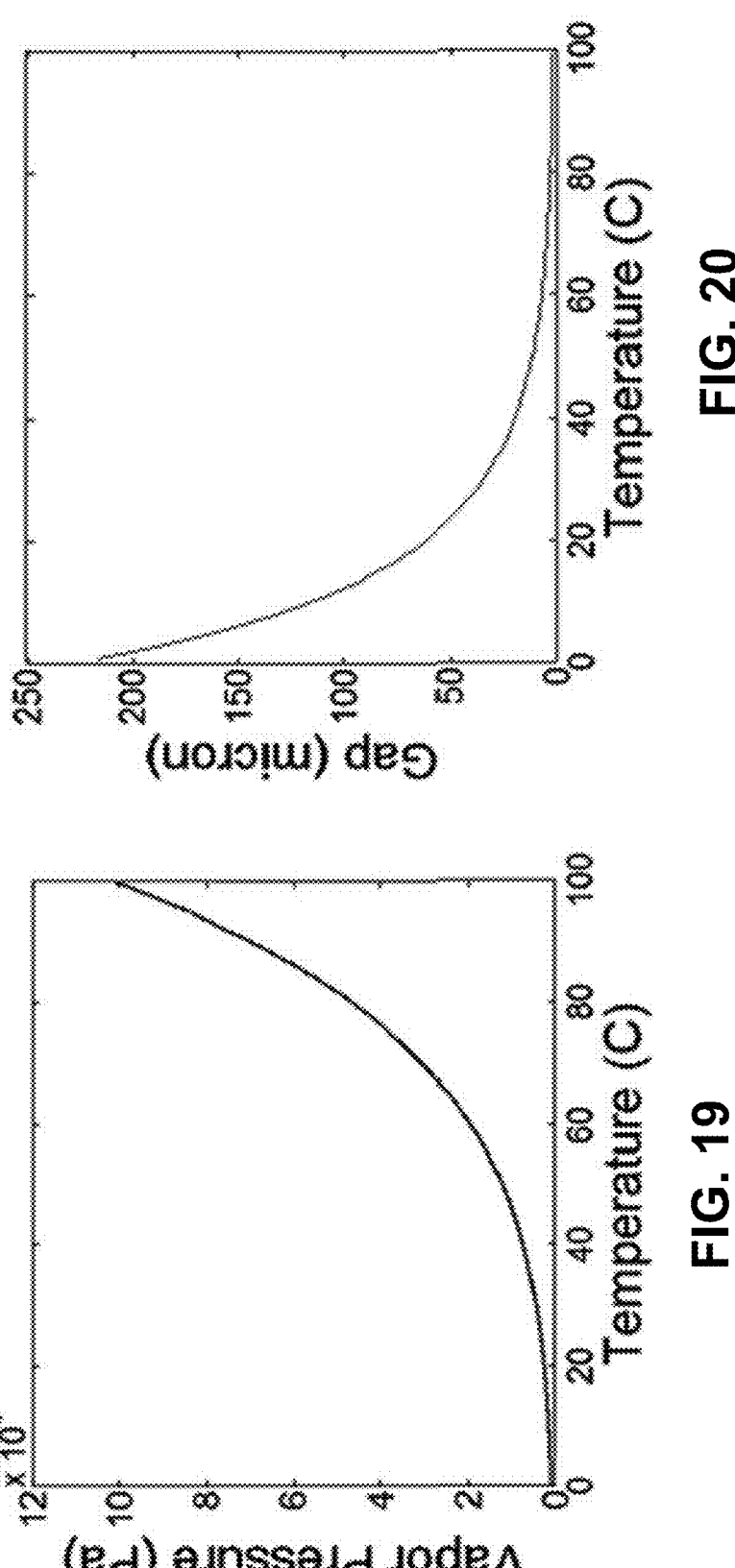
FIG. 19 and FIG. 20 are graphical representations of vapor pressure (FIG. 19) and critical gap size (FIG. 20) vs. temperature for water. It is understood that various embodiments of the present invention contemplate working fluids other than water, and these other fluids may present different working ranges of gap sizes.

Yet other configurations and embodiments of the FEMTA valve and its fabrication are now presented. FEMTA operation utilizes on exploitation of microscale effects of surface tension and its balance with stresses created by the vapor pressure, which can be in some embodiments dependent on the liquid film temperature as illustrated in FIG. 16, FIG. 17, and FIG. 18. A critical size of capillary for which the surface tension is being balanced by normal stresses due to the pressure drop across the boundary can be estimated from the Young-Laplace equation as $$d = \frac{2\tau\cos\theta}{p_{vap}} \qquad (1)$$

where d is the gap size of the annular or slit capillary, $\tau$ is the surface tension, pvap is vapor pressure which depends exponentially on the temperature of the liquid film. Specifically for water the critical gap size varies from d=60 μm to 10 μm for film temperatures from 20 to 50° C. as plotted in FIG. 20. When the capillary size is above the critical value a rapid evaporation can be triggered. This provides low-power, compact and highly controllable thermal valve for individual elements in the FEMTA array. Because no or few moving parts or pressurization are required the system volume is orders of magnitude smaller than for those with the state-of-the-art piezoelectric valves or proportional (e.g. solenoid) valves. Using the film-evaporation valve the propellant storage can be directly embedded in the micromachined thermal control and propulsion device. Because the physical effect of the thermal valving is on the micrometer scale, individual thrusters should be sized accordingly. Multiple elements are used to provide the desired maximum thrust. This also augments minimum impulse control and provides a redundancy feature in case of failure of one or more elements.

Performance for this device was estimated using ideal isentropic conditions and the assumption that the ejected fluid was vapor only. The mass flow ṁ, with critical temperature set at 50 C can then be calculated as $$\dot{m} = \frac{W}{Cp\Delta T} = 7.97 \text{ mg/s} \qquad (2)$$

Where W is available power, Cp is specific heat, and T is temperature. Heat of vaporization is provided by the bulk fluid. Cooling rate is then $$P = \dot{m}h_v - W = 17.5 \text{ Watts} \qquad (3)$$

In non-cooling mode the vaporization energy is replenished by a substrate heater in addition to the local devices reducing available mass flow $$\dot{m} = \frac{W}{Cp\Delta T + h_v} = 455 \text{ μg/s} \qquad (4)$$

Where $h_v$ is heat of vaporization. The specific impulse is approximated using the formula for a converging nozzle $$Isp = \frac{\sqrt{\frac{2RT(\gamma + 1)}{\gamma}}}{g} = 73.7 \text{ s} \qquad (5)$$

Where R is the specific gas constant, $\gamma$ is ratio of specific heats, and g is gravitational acceleration. Because it is a sonic nozzle we can assume an exhaust velocity v of Mach 1

$$v = \sqrt{\gamma RT} = 445 \text{ m/s} \qquad (6)$$

Producing a thrust of $$F = \dot{m}g \cdot Isp = 5.7| \text{ mN cooling mode} \qquad (7)$$
$$= 3.29 \text{ μN non-cooling mode}$$

A single FEMTA unit with a 1 g propellant can also provide a delta-V of $$\Delta V = Isp \cdot g \cdot \frac{mass_{propellant}}{mass_{spacecraft}} = 0.72 \frac{m}{s} \qquad (8)$$

for a 1 kg spacecraft in a 160 km LEO. By rearranging the equation for orbital velocity $$V_0 = \sqrt{\frac{\mu}{a_0}} \qquad (9)$$

15 where a is the orbital radius and $\mu$ is the standard gravitational parameter for Earth so that $$V_0^2 a_0 = V_1^2 a_1 \qquad (10)$$

an altitude change can be calculated as $$\Delta a = a_0 \left( \left( \frac{V_0}{V_0 - \Delta V} \right)^2 - 1 \right) = 1.2 \text{ km} \qquad (11)$$

Figures 21, 22, 23:
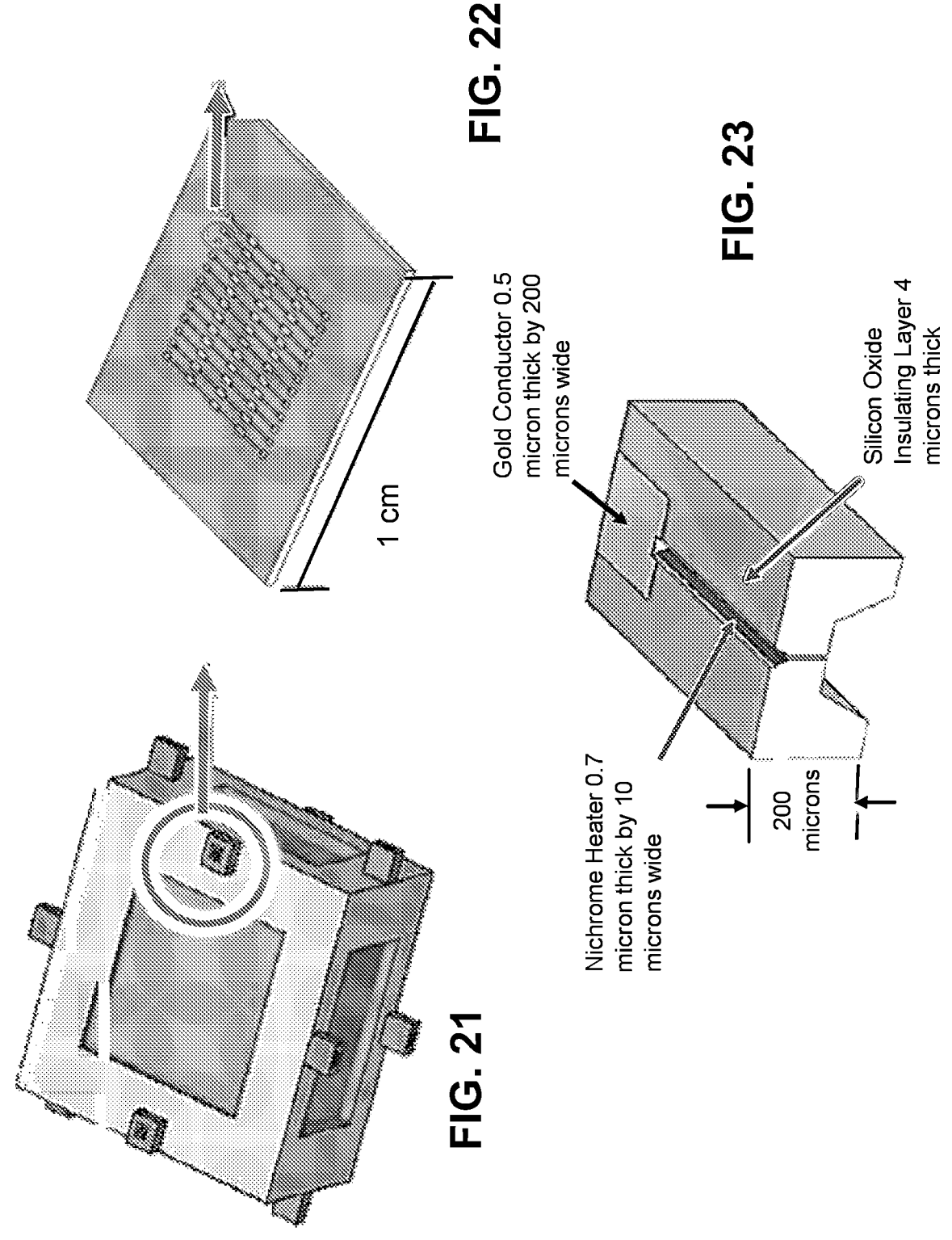
FIG. 21, FIG. 22, and FIG. 23 show a 2-D slot type FEMTA, where.

Fabrication of FEMTA units including a rounded annular nozzle (or aperture) design were changed in favor of a simple slit (or aperture) nozzle consisting of a rectangular converging section followed by a straight throat. An illustration of the full array mounted on a cubesat is found in FIGS. 21-23 to showcase the simplicity of the new design. This was intended to reduce the level of complexity of both the fabrication process and the device itself to increase production yields and minimize the number of failure modes. The thermal triggering method remains the same as illustrated in FIG. 16, FIG. 17, and FIG. 18. The single nozzle length was chosen to be about 2.5 mm to provide measureable thrust, in contrast to the about 10 micron width of the throat this would make 2-D modeling plausible.

Performance for this configuration was estimated using ideal isentropic conditions, again with vapor only, so that mass flow with stagnation pressure $P_0$ set as vapor pressure at $T_0 = 50$ C can then be calculated as $$\dot{m} = \frac{(P_0 A^*)}{\sqrt{T_0}} \sqrt{\frac{\gamma}{R} \left( \frac{2}{\gamma + 1} \right)^{\frac{\gamma+1}{\gamma-1}}} = 569 \text{ } \mu g/s \qquad (12)$$

Where A* is the area of the throat. In cooling mode only the internal heaters are used to raise local temperature at the meniscus facilitating vacuum boiling of the working fluid at the throat. The loss of phase change energy propagates through the fluid producing a cooling effect. The mass flow is set by available power and local temperature change needed to equate surface tension with vapor pressure. An optimization algorithm has determined a delta T of 30K from an ambient temperature of 20 C to maximize thrust and reduce viscous losses within the geometrical constraints inherent to the microfabrication process. Within these limits power is then estimated as $$W = \dot{m} Cp \Delta T = 67.7 \text{ mW} \qquad (13)$$

Cooling rate P is then $$P = \dot{m} h_v - W = 1.15 \text{ Watts} \qquad (14)$$

In non-cooling mode the vaporization energy is replenished by a substrate heater in addition to the local devices reducing available mass flow.

$$\dot{m} = \frac{W}{Cp\Delta T + h_v} = 28 \text{ } \mu g/s \qquad (15)$$

Producing a thrust of $$F = \dot{m} g \cdot Isp = 338 \text{ } \mu N \quad \text{cooling mode} \qquad (16)$$
$$= 18 \text{ } \mu N \quad \text{non-cooling mode}$$

16

The previous equations assume an isentropic flow which is non-physical as the Reynolds number in the throat is $$Re = \frac{\rho VL}{\mu} = 53 \qquad (17)$$

Where V is the sonic velocity, $\rho$ is the density in the throat, and the dynamic viscosity $\mu$ are all taken at 50° C. The characteristic length L is the throat width of 10 microns. This indicates a very viscous flow so that the isentropic values can only be used as a reference.

With sonic flow (M=1) the Reynolds number provides the corresponding Knudsen number of $$Kn = \sqrt{\frac{\gamma \pi}{2}} \frac{M}{Re} = 0.027 \qquad (18)$$

Which places the flow very near the transitional regime between continuum and free molecular.

Figures 24, 25, 26:
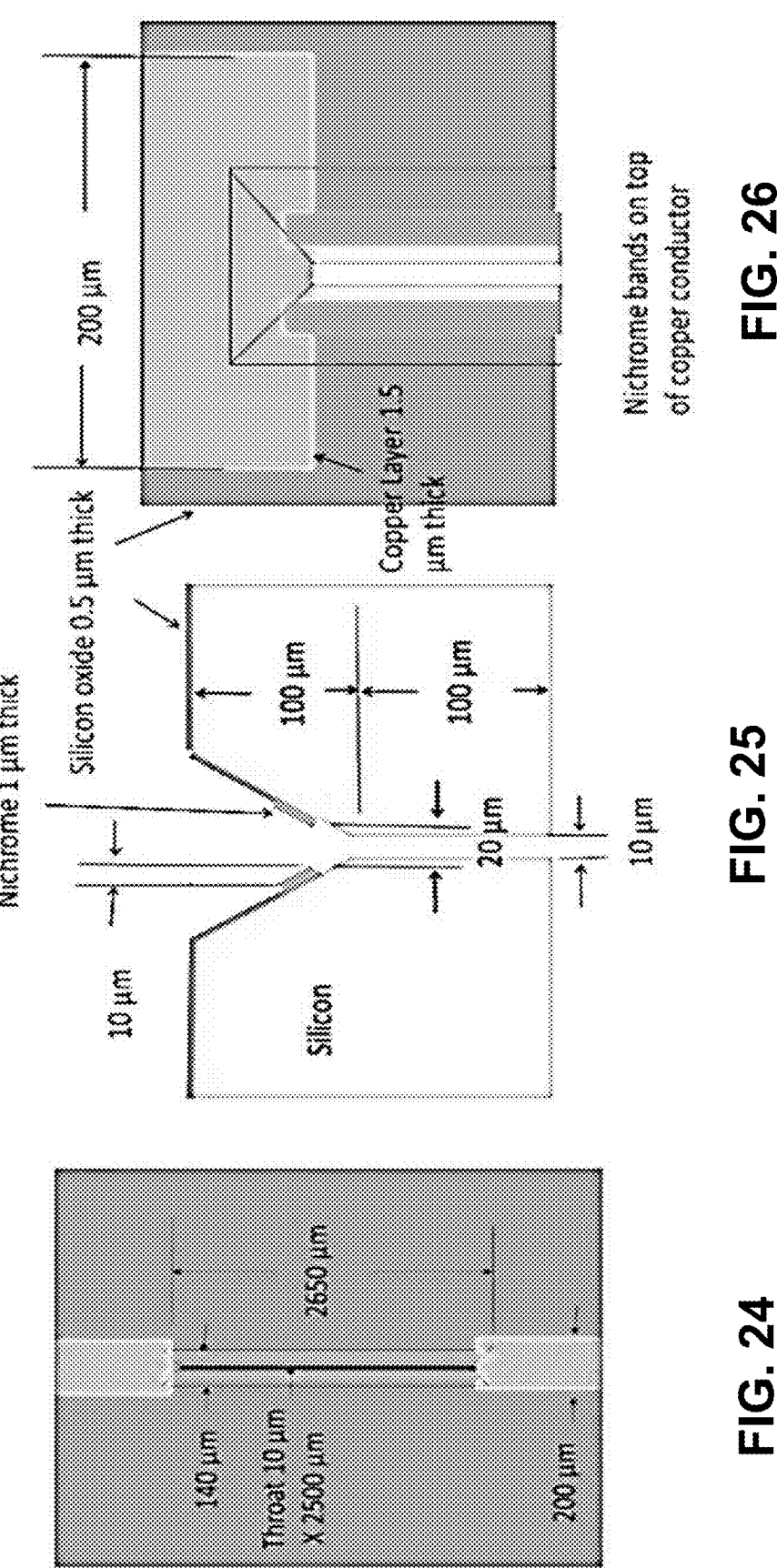
FIG. 24, FIG. 25, and FIG. 26 show a design according to one embodiment: top view (FIG. 24), cross section (FIG. 25), and close-up (FIG. 26)—not to scale.
Figures 27, 28, 29, 30, 31, 32:
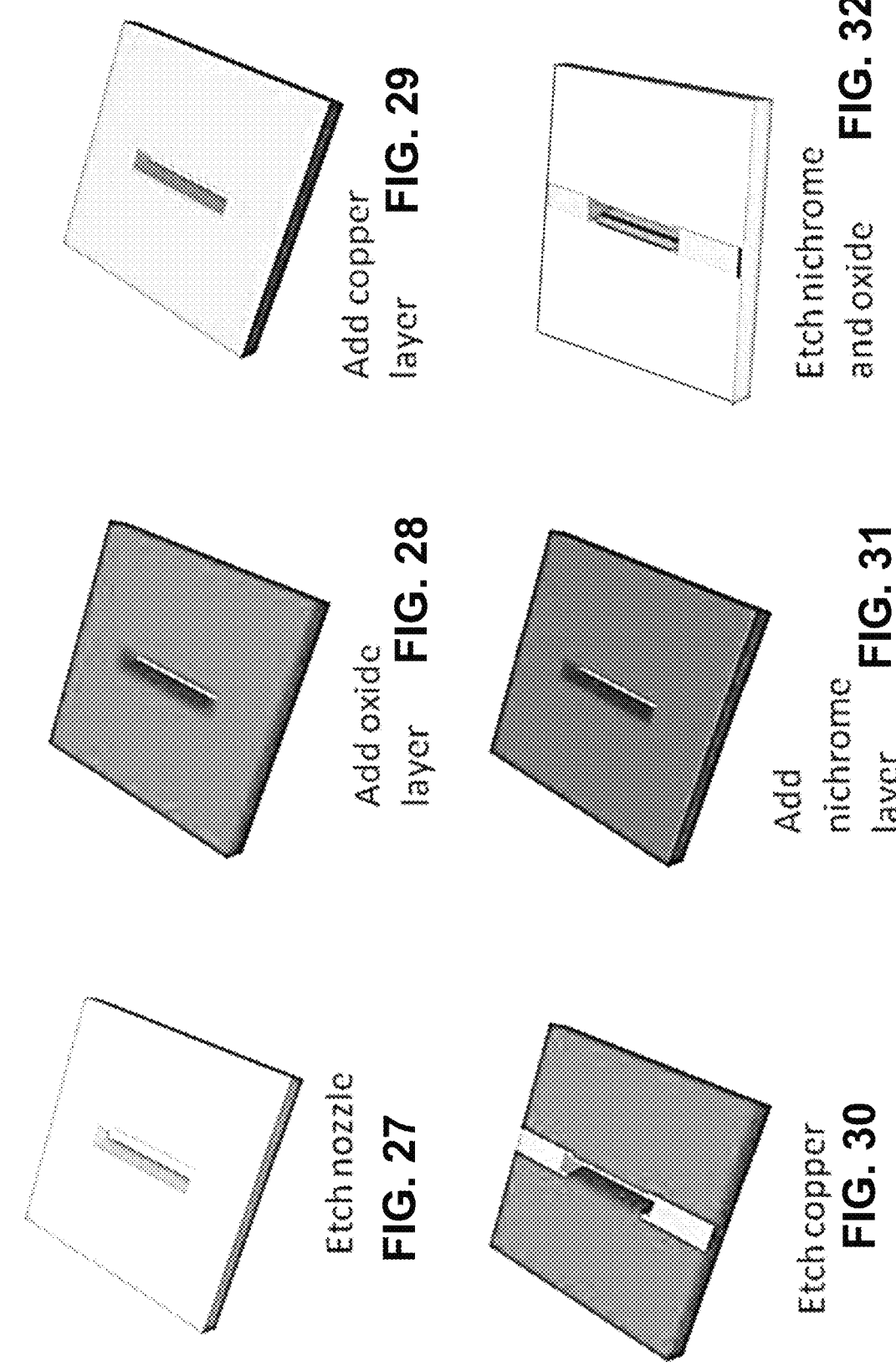
FIG. 27, FIG. 28, FIG. 29, FIG. 30, FIG. 31, and FIG. 32 show a fabrication process according to one embodiment.
Figures 33, 34, 35:
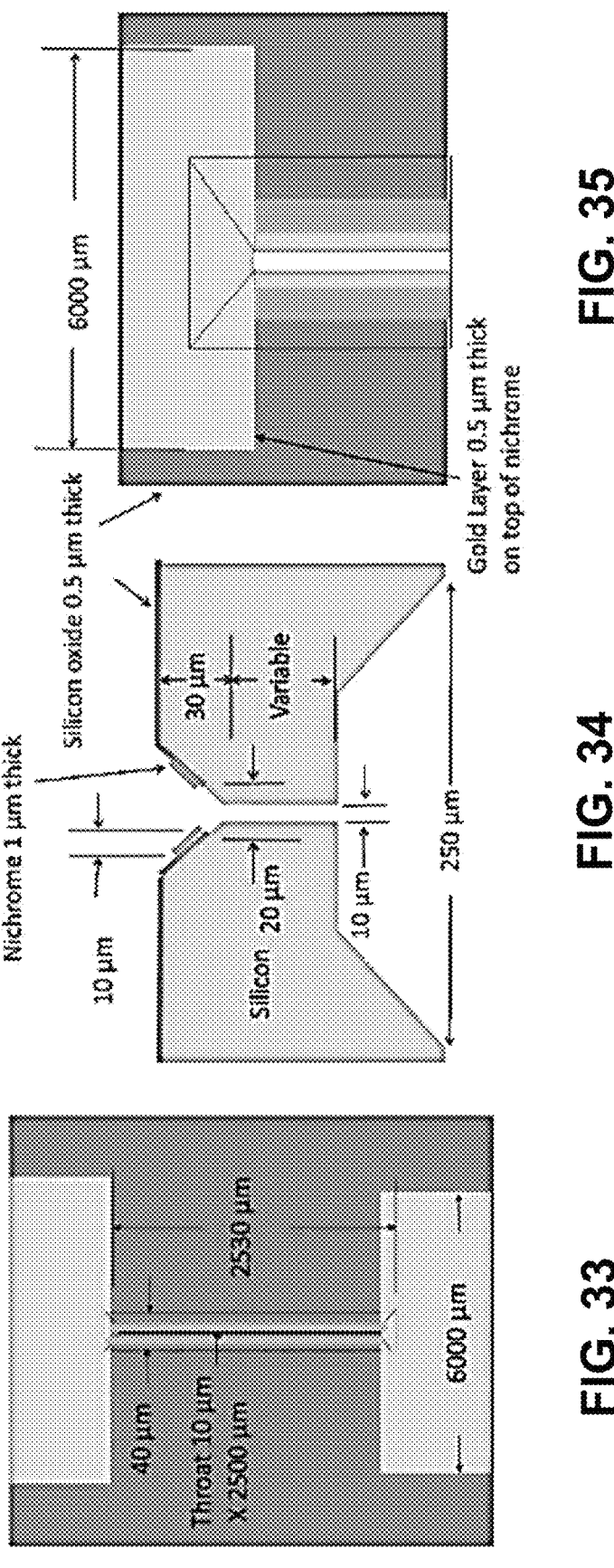
FIG. 33, FIG. 34, and FIG. 35 show a design according to another embodiment, where
Figure 36:
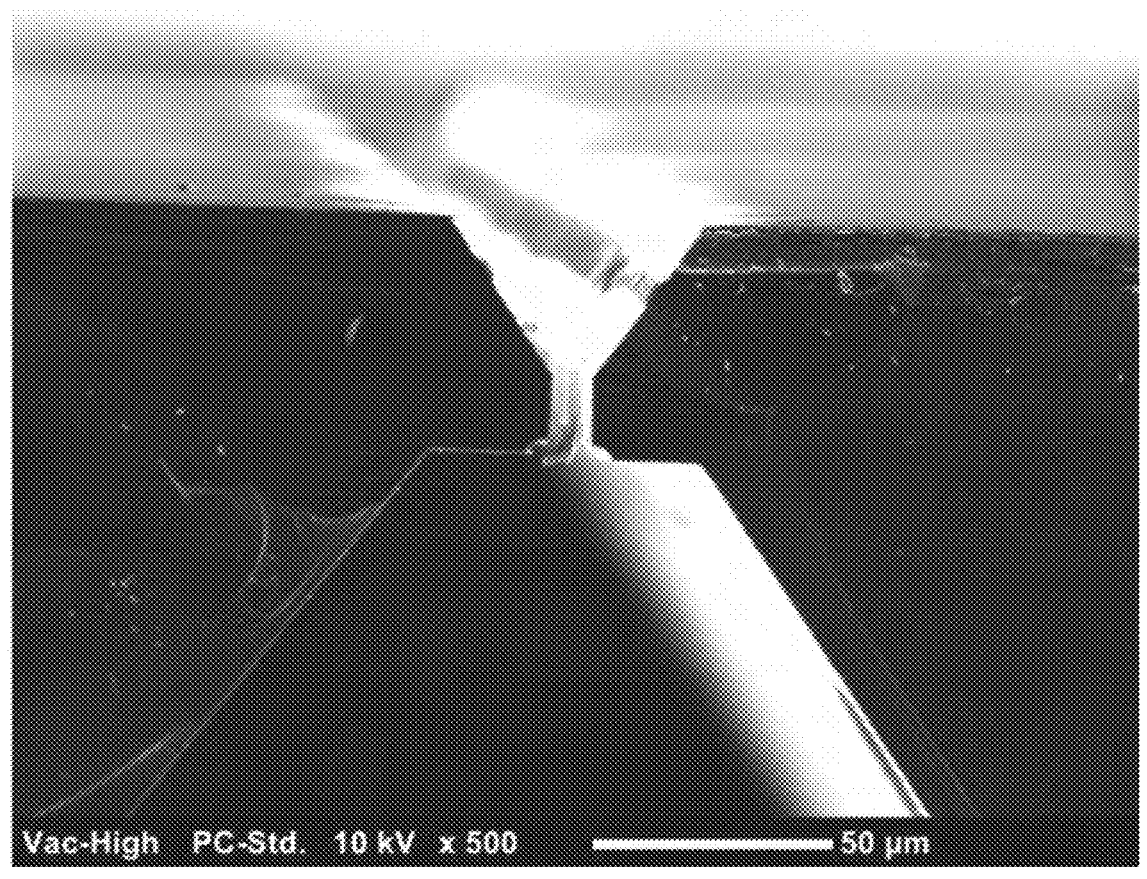
FIG. 36, FIG. 37, FIG. 38, and FIG. 39 show an AR~2 FEMTA nozzle cross section; SEM photo (FIG. 36) schematic (FIG. 37); top view; SEM photo (FIG. 38) schematic—not to scale (FIG. 39) 8.0 µm.
Figure 37:
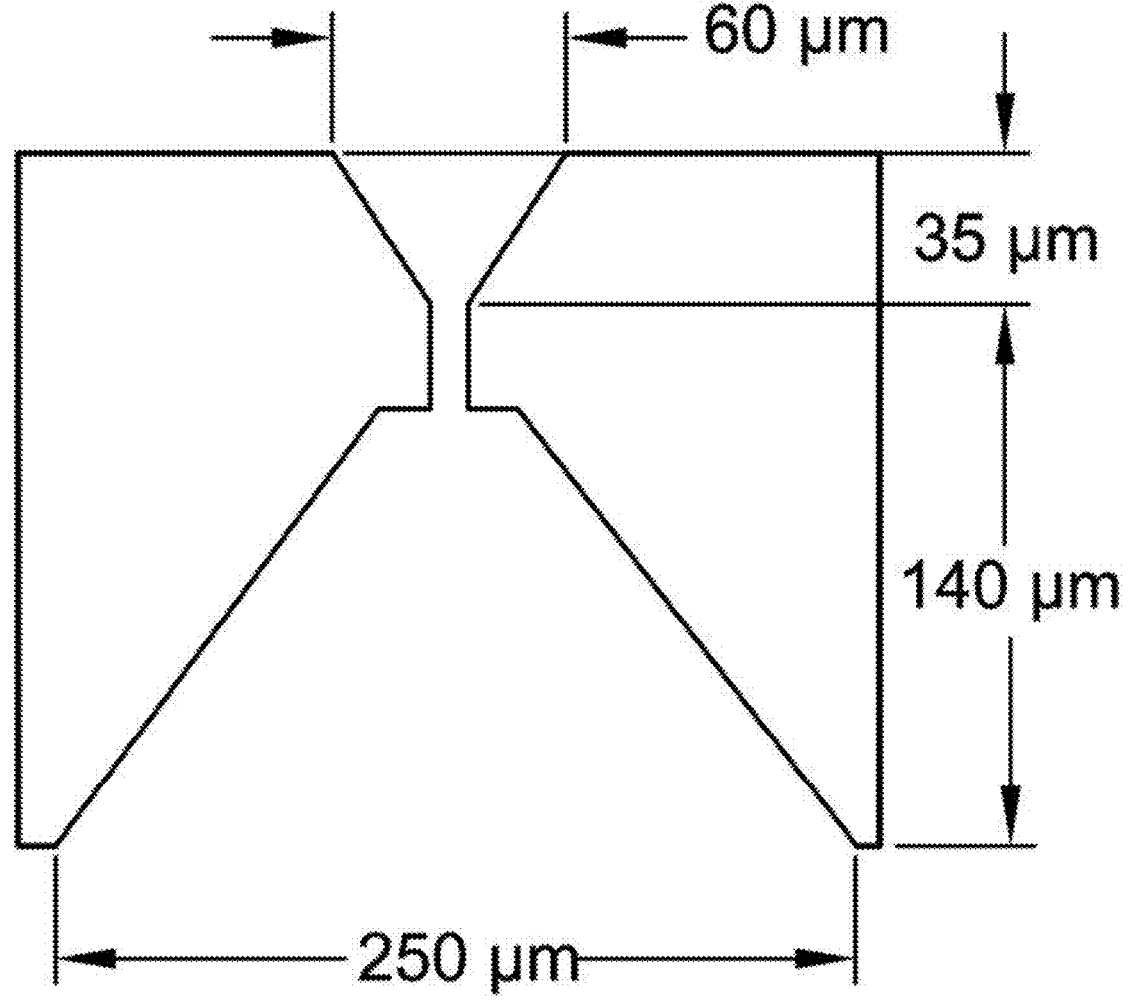
Figure 38:
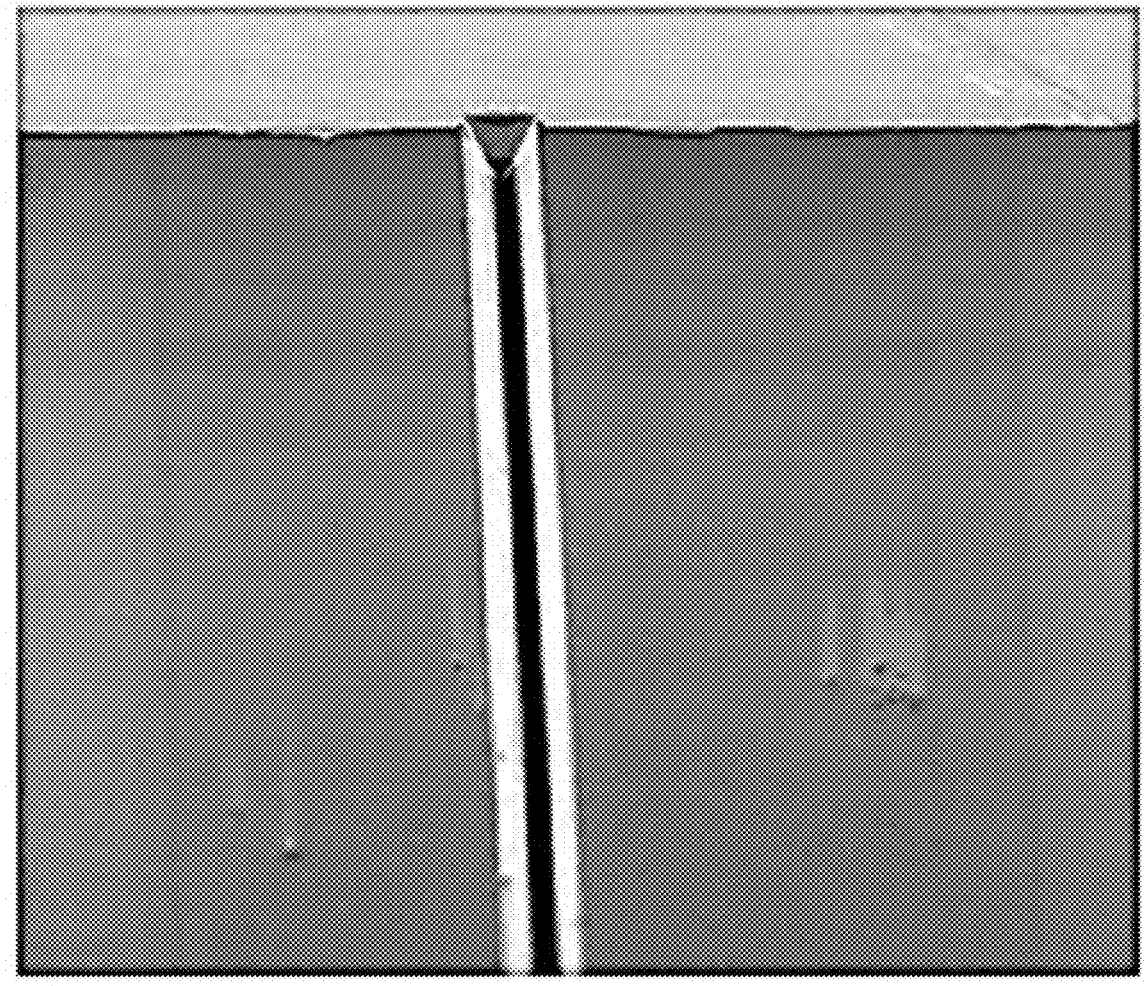
Figure 39:
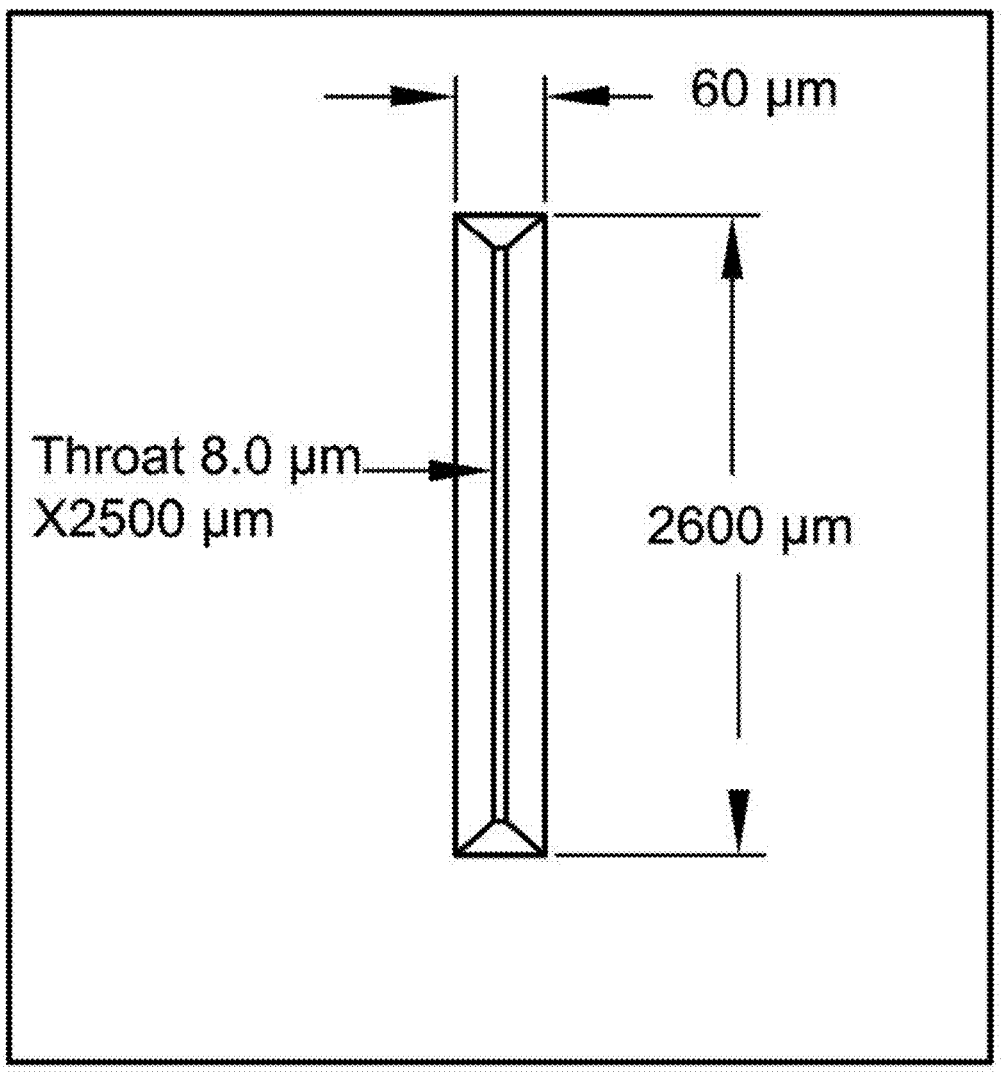

The thinnest silicon wafer utilized for manual processing is 200 micrometers due to premature fracturing during handling. Setting an upper limit to the aspect ratio of the throat of 10 meant that the throat would be 100 micrometers deep for a 10 micrometer throat gap. The initial design of the 2-D slot single nozzle FEMTA is illustrated in FIG. 24, FIG. 25, and FIG. 26. The original fabrication process involved wet etching the nozzle inlet followed by separate deposition and etching of first the conductor then the heater material and Deep Reactive Ion (DRI) etching of the throat last as shown in FIGS. 27-32. Another design is shown in FIG. 33, FIG. 34, and FIG. 35 and the fabrication process in FIG. 7.

Figures 40, 41A:
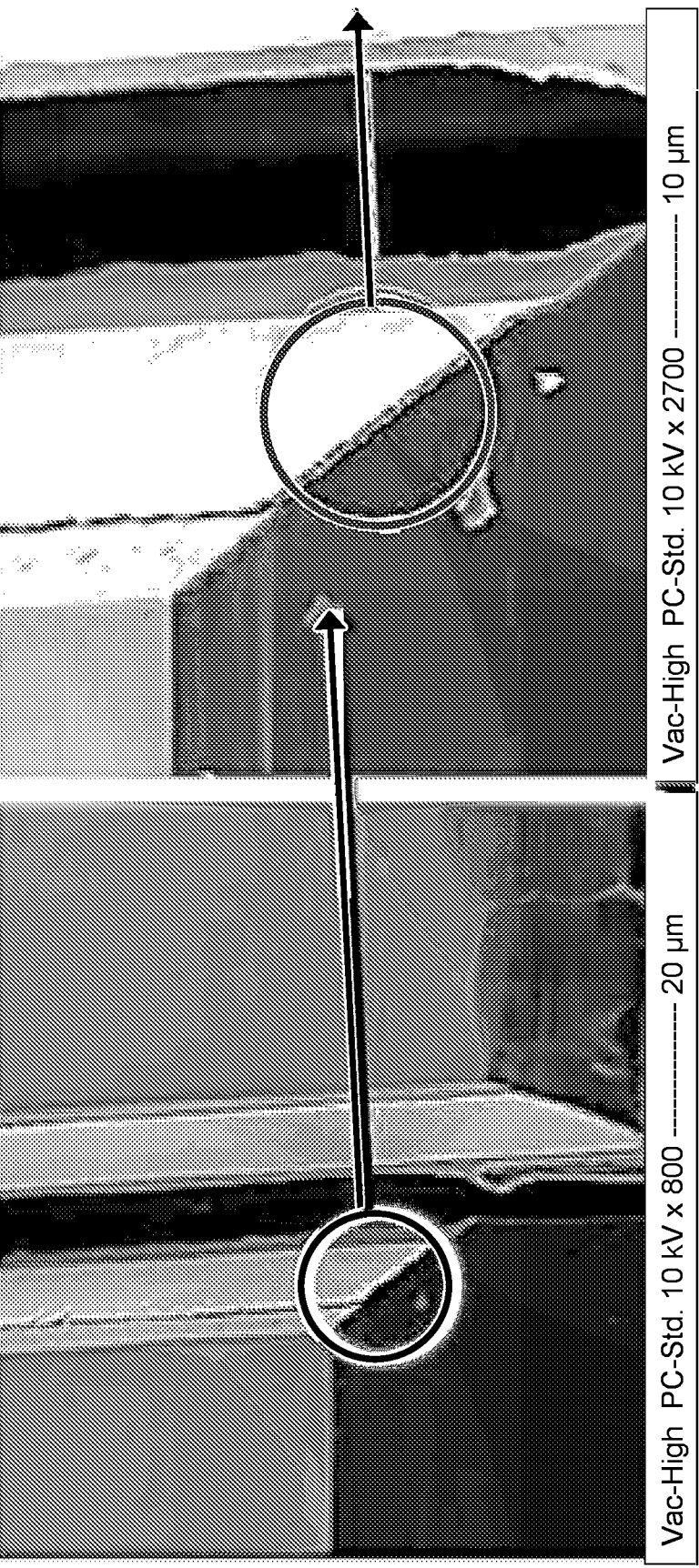
FIG. 40 and FIG. 41A show SEM images of the FEMTA nichrome heater elements, indicating that FIG. 41A is an enlargement of a portion of FIG. 40.
Figures 41B, 42:
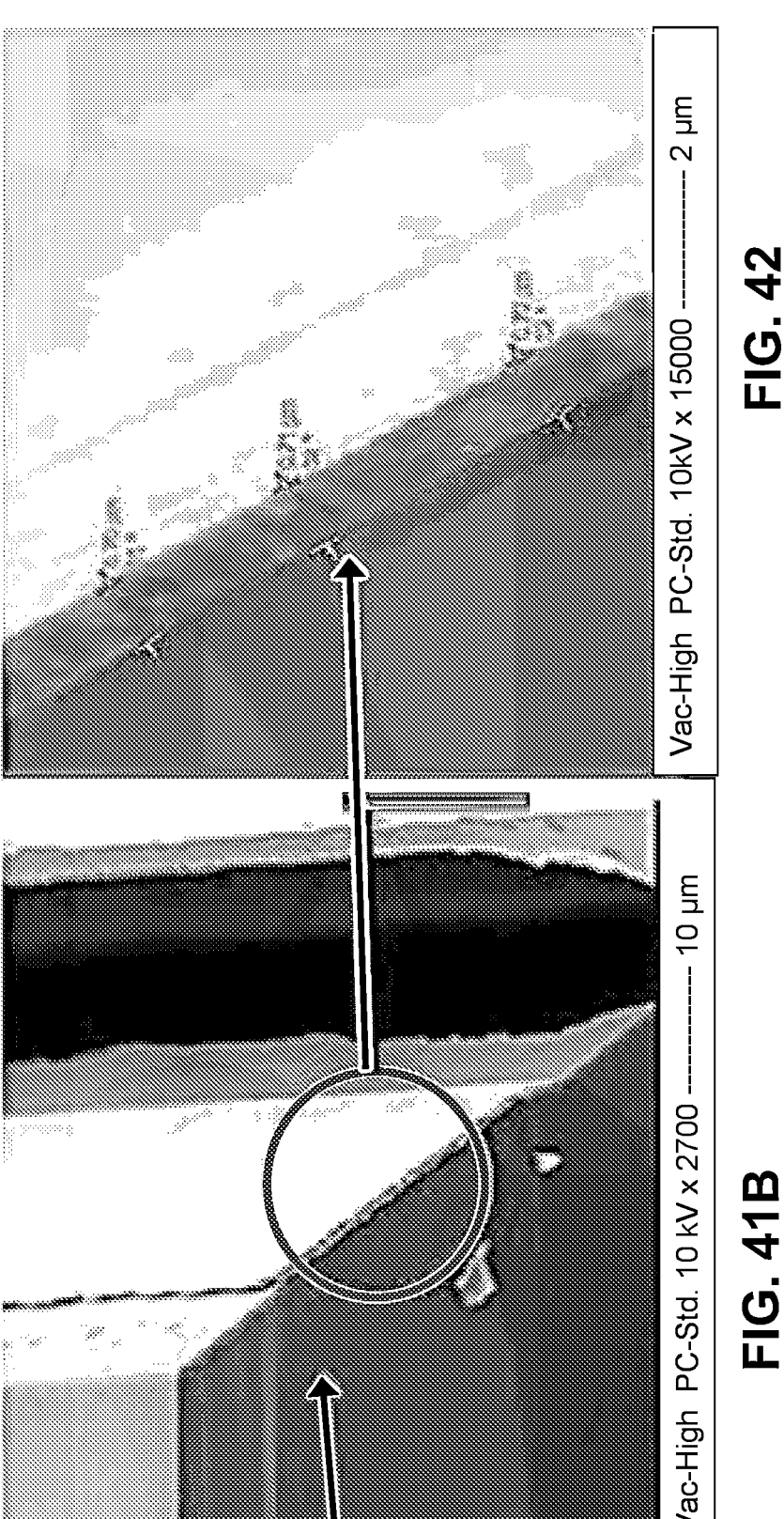
FIG. 41B and FIG. 42 show SEM images of the FEMTA nichrome heater elements, indicating that FIG. 42 is an enlargement of a portion of 41B.

The first embodiment of FEMTA nozzles included throat aspect ratios (width/depth) at the upper and lower ends of the design spectrum which yielded FEMTA with AR~2 seen in FIG. 36, FIG. 37, FIG. 38, and FIG. 39, and FEMTA with AR~8 seen in FIG. 40, FIG. 41A (and FIG. 41B), and FIG. 42. The different aspect ratios were achieved by varying the etch time in step 3 of the fabrication procedure.

Figure 43:
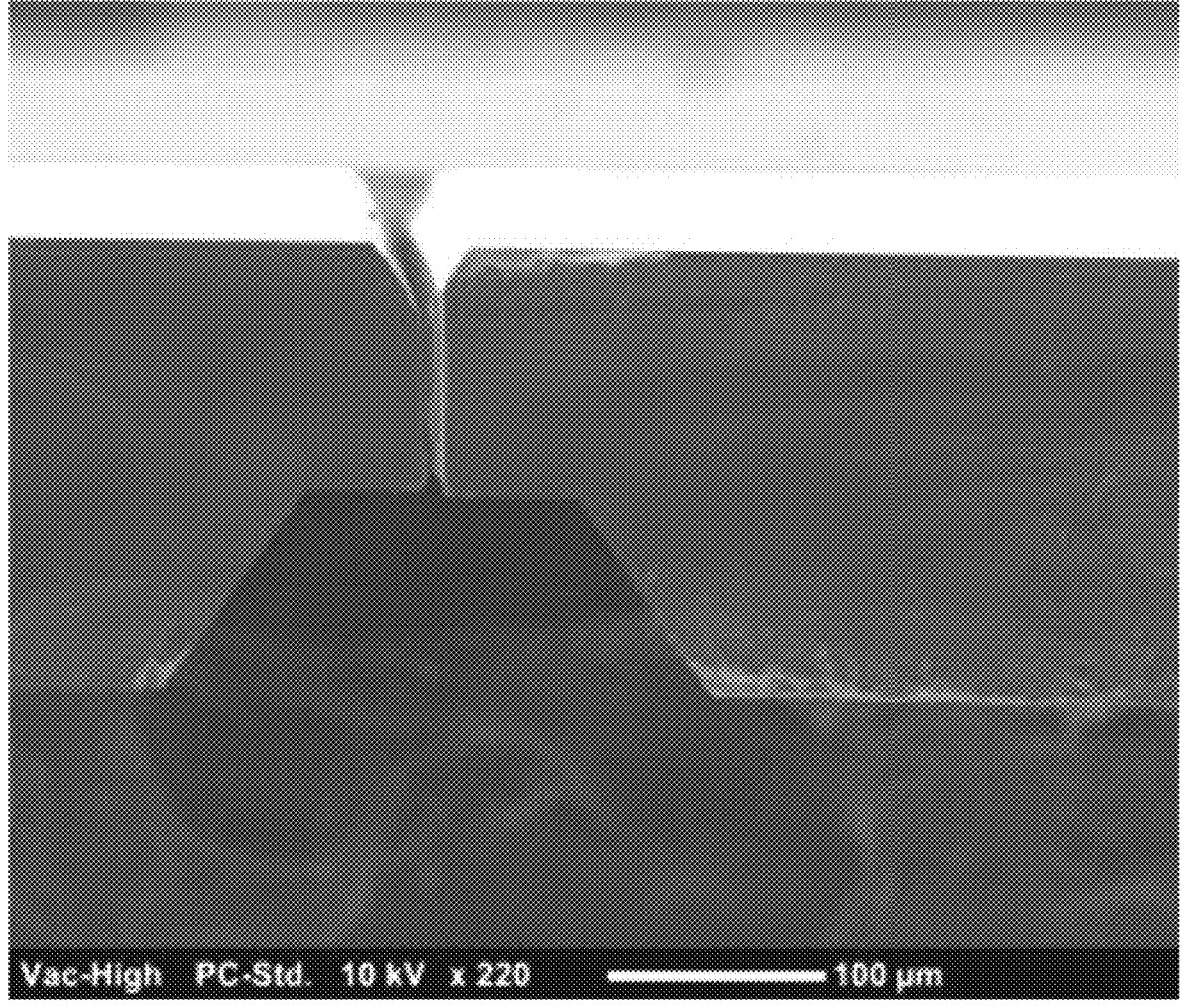
FIG. 43 and FIG. 44 show an AR~8 FEMTA nozzle cross section; SEM photo (FIG. 43) and schematic (FIG. 44).
Figure 44:
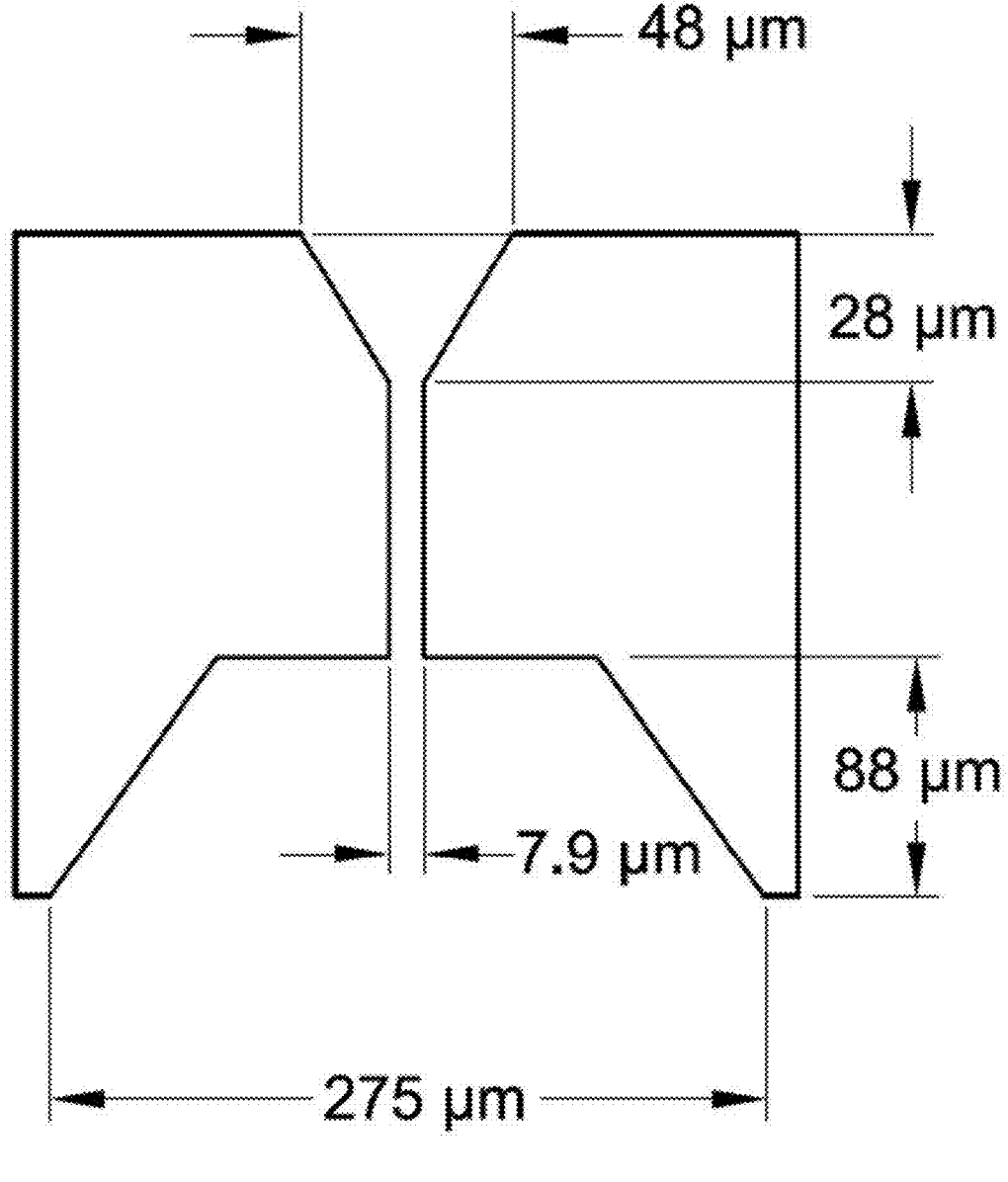

The nichrome heater elements were produced at a 10 micrometer target width which should give ample margin for error if over etching occurred (see FIG. 43 and FIG. 44). This produced heaters with resistances approximately 25% of the target value but was compensated by using a lower voltage drive signal.

Two 200 micron thick silicon wafers were split by scratching with a diamond scribe so that 4 halves were processed. The heater thickness was doubled to reduce current density so to eliminate electromigration as a factor and the insulating oxide layer thickness was increased by a factor of 4 to reduce thermal diffusion into the substrate. Enhancement of the heater layer was achieved by increasing sputtering time of the nichrome in step v of the fabrication process to 2 hours and 30 minutes. To reduce fabrication time and complexity the conductor layer was omitted, due to the 300:1 ratio of the contact to heater width this only increased overall resistance around 1%. The extra oxide was deposited by choosing the 22,000 angstrom recipe on the oxide furnace in step iv which increased deposition time from 6½ to 14½ hours.

Figure 45:
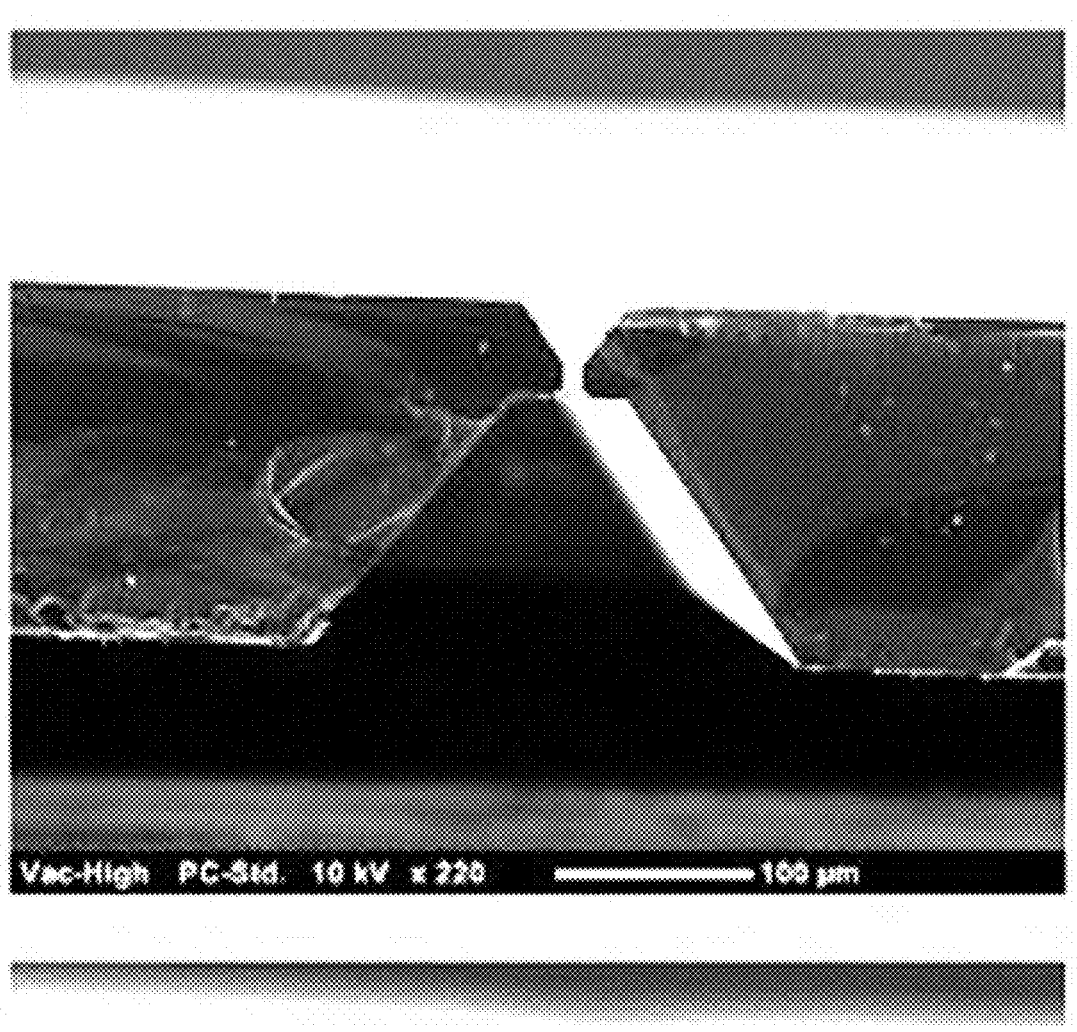
FIG. 45, FIG. 46, FIG. 47, and FIG. 48 show Nominal aspect ratios of Gen 2 nozzles AR~2 (FIG. 45), AR~4 (FIG. 46), AR~6 (FIG. 47), AR~8 (FIG. 48), all according to another embodiment of the present invention.
Figure 46:
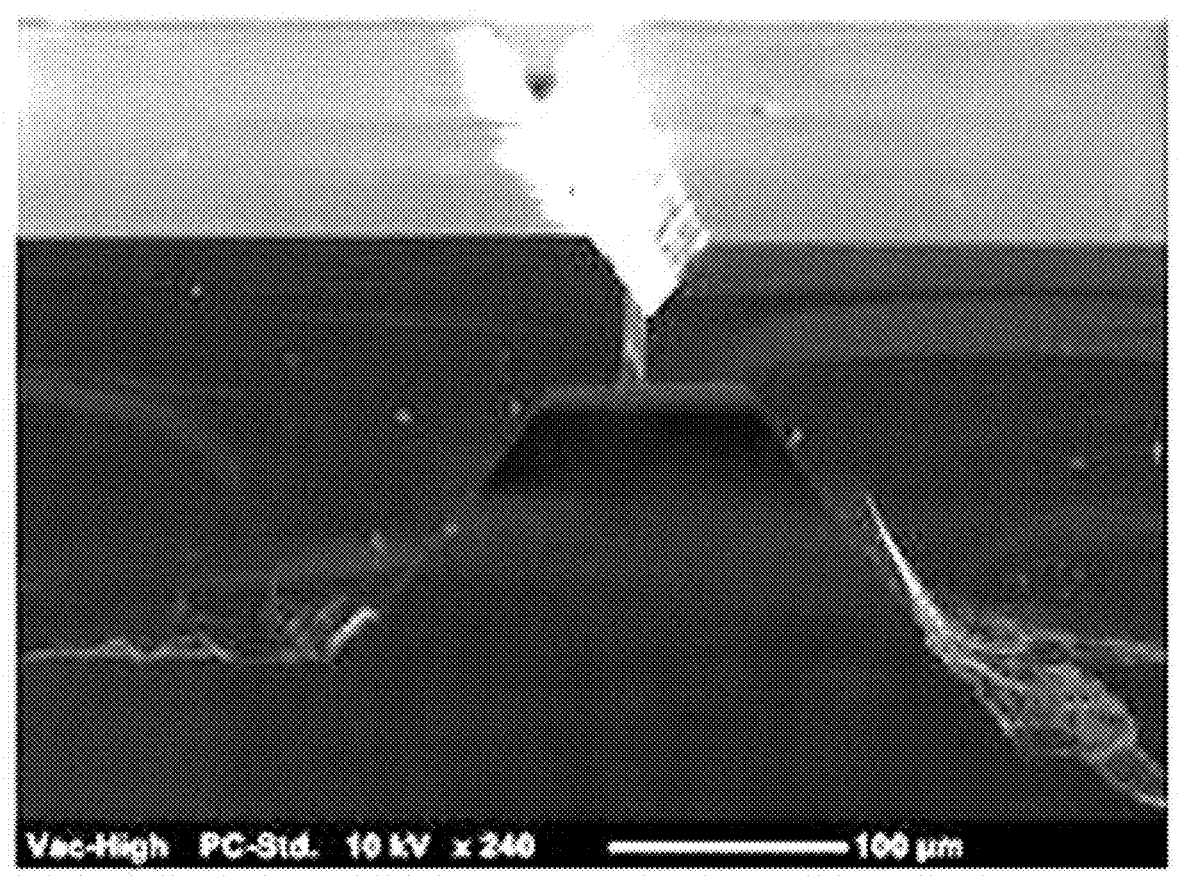
Figure 47:
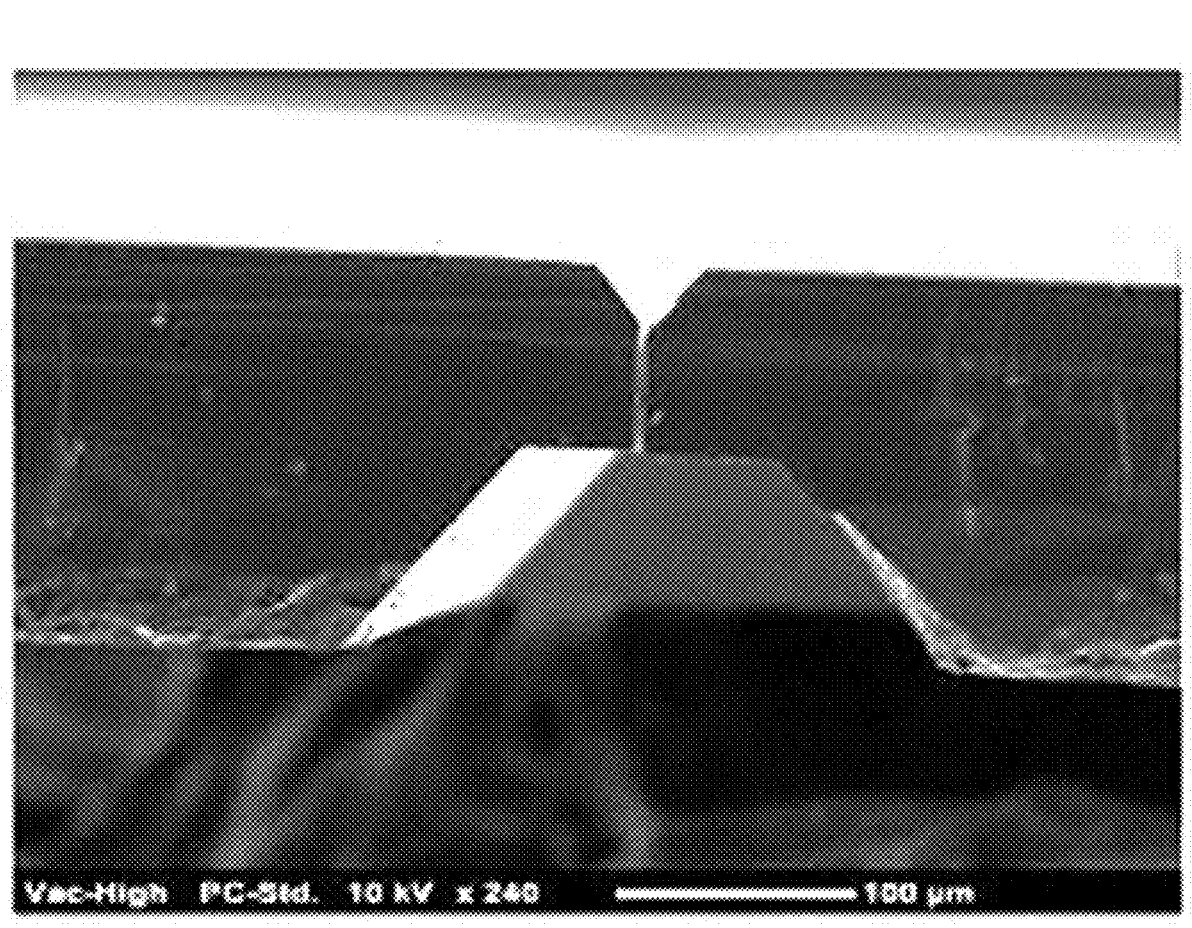
Figure 48:
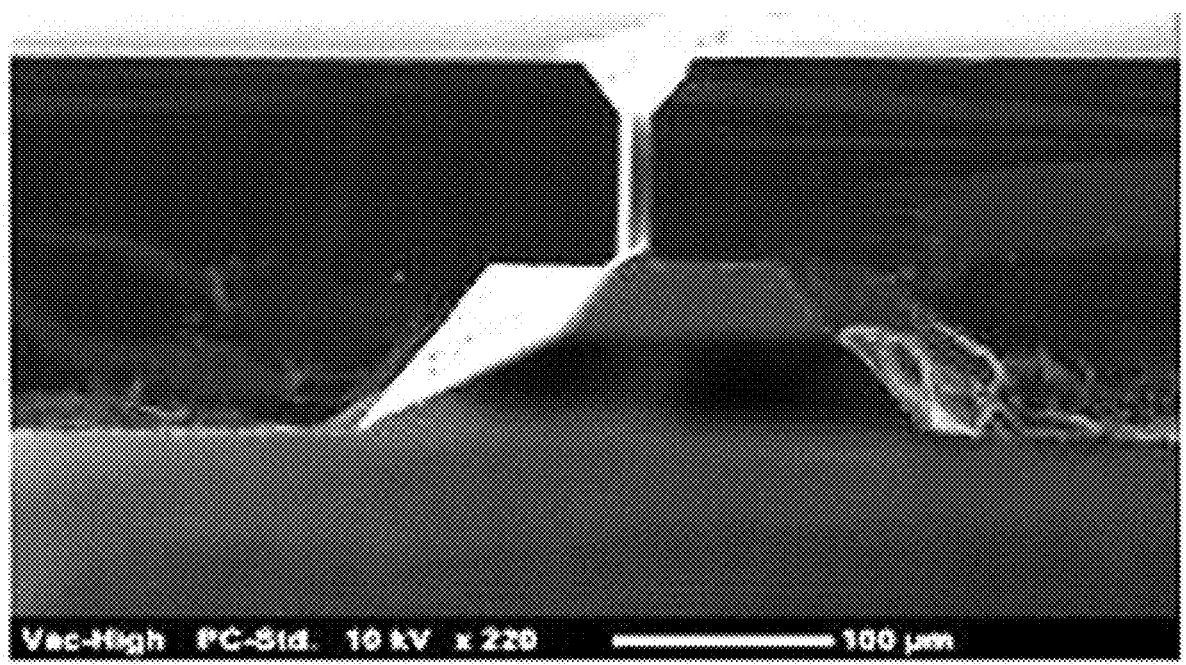
Figures 49, 50, 51, 52, 53, 54:
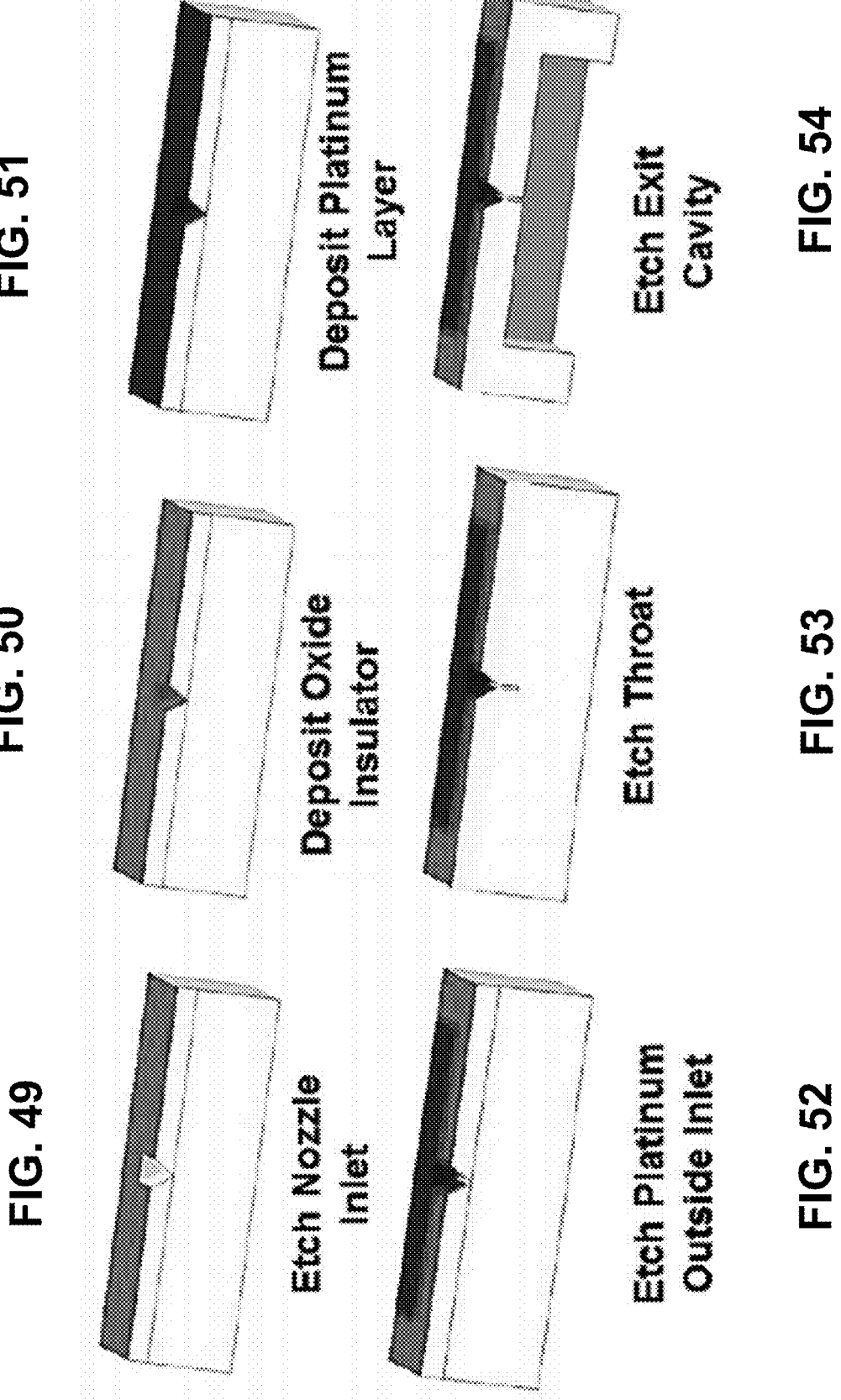
FIG. 49, FIG. 50, FIG. 51, FIG. 52, FIG. 53, and FIG. 54 show major fabrication steps for Gen 3 nozzles according to yet another embodiment.

Two intermediate throat aspect ratios of 4 and 6 were produced by altering the wet etch time in fabrication step to 1 hour 30 minutes for AR~4 and 1 hour 45 minutes for AR~6 and the number of DRI etch cycles in step xiv to 4 and 6. SEM photos of all four aspect ratios can be found in FIG. 45, FIG. 46, and FIG. 47.

The small batch yield and somewhat inconsistent dimensions led to yet another fabrication embodiment. The wafer thickness of the third embodiment devices was chosen to be 500 microns due to availability and ease of handling. Four wafers were selected to represent the four aspect ratios defined previously. The internal nozzle design was consistent with both gen-1 and gen-2 designs with the greatest alteration being the width and depth of the exit chamber. Wet etching of the exit was prohibited by the lifetime of the oxide mask in the etching solution so DRI etching was to be used instead. This meant that only the inlet side lithography and oxide etch was performed in steps i, ii, and iii of the process and the wet etch time in step iv was reduced to 18 minutes since only the 24 micron deep inlet need be etched at this time.

The heater material was changed from nichrome to vanadium with sputtering time in step v increased to 3 hours with all other settings the same. The vanadium was etched in steps ix and xi with a 1:1 solution of nitric acid and DI water at room temperature.

The exit lithography and oxide etching described in steps i-iii were performed after the DRI etching of the throat in step xv then placed back in the etching machine and were etched for 133.3, 140, 146.6, and 153.3 minutes to acquire AR~8, AR~6, AR~4, and AR~2 nozzles respectively. The major steps are illustrated in FIGS. 49-54, and SEM photos of AR~2, 6, and 8 are found in FIG. 12 and FIG. 13.

The thicker wafers provided a much more robust platform for the nozzles such that wafer integrity was maintained throughout the fabrication process leading to 98-100% yields for all four wafers.

The vanadium heaters proved much more durable than the nichrome units. Vanadium was chosen because of its availability and its corrosion resistance. It was found that though vanadium is resistant to strong sulfuric acid and seawater it will oxidize in ultrapure deionized water within a few hours which eliminated multiple tests on samples and any long term experiments. It was decided that platinum would be the choice heater material due to its inert nature. The vanadium material was removed from the nozzles with nitric acid and 200 nm of platinum deposited via an electron beam evaporator. The heaters were masked and etched per the instructions in steps viii-xi.

AR~2 AR~6, and AR~8 wafers produced ~95% yield but the AR~4 wafer was tragically destroyed due to human error. It was discovered that higher aspect ratio devices could have their exits DRI etched further to produce lower aspect ratio throats. This way 2 AR~8 nozzles were converted to AR~4.

Nozzle Inlet Lithography i Apply AZ1827 photoresist to a 4 inch diameter 500 micrometer thick <1,0,0> silicon wafer and spin at 5000 rpm for 30 seconds in the G3 wafer spinner. Soft bake at 115° C. for 75 seconds on a hotplate then set aside to let rehydrate for 10 minutes. Expose in MA6 using inlet mask for 18 seconds at 14 mW/cm$^2$. Immerse with slight agitation in pure MF26A solution for 6 seconds then rinse with ultrapure water and check development, repeat with 3 second increments until image is completely delineated.

ii. RI Etch Inlet Silicon Oxide Mask

RI etch in the AOE for two runs of 2.5 minutes each with 5 minutes cool down time between. Soak the device wafer in Bakers PRS2000 photoresist stripper for at least 30 minutes. Wash the wafer in water and dry in a 120° C. oven for 10 minutes.

iii. Wet Etch Nozzle Inlet

Immerse wafer in 40% potassium hydroxide in water heated to 80° C. with 100 rpm stirring; there is a permanent etching bath set up in the biotechnology lab room 2133. Etch for 18 minutes, rinse thoroughly in water after etching.

iv. Deposit Silicon Oxide

Strip the wafer of remaining oxide by immersing in buffered oxide etch (BOE) for 8 to 10 minutes until all surfaces appear hydrophobic. Clean the sample with a solution of piranha (1 part 98% sulfuric acid and 1 part 30% hydrogen peroxide) for 10 minutes and rinsed with water. Place the wafer in the Protem® oxide oven and select the 22000 angstrom wet oxide recipe. Remove the wafer after recipe is completed, about 14½ hours.

v. Deposit Heater Material

Sample is mounted in the CHA e-beam evaporator and pumped down to below 1 microTorr pressure. A 5 nm adhesion layer of chromium is deposited first. The heater layer is then deposited as 200 nm of platinum.

vi. Heater Lithography

Apply AZ9260 photoresist to the wafer and spin at 5000 rpm for 30 seconds in the G3 spinner. Soft bake on a hotplate at 100° C. for 7 minutes and set aside to let rehydrate for 30 minutes. Expose in MA6 using the conductor portion of the mask (with other portions covered with Kapton tape) for 250 seconds at 14 mW/cm2, use a 500 micrometer thick wafer for support. Rotate the wafer and repeat to expose all 4 quadrants. Immerse with slight agitation in AZ400 solution mixed with 3 parts water for 2 minutes then rinse with ultrapure water and check development, repeat with 1 minute increments until image is completely delineated and inlet channel is free of photoresist. Since there is no conductor material to use as a mask this lithography should incorporate both heater and conductor portions before the etching process. Therefore the wafer should be hard baked at 180° C. for 20 minutes to render the photoresist insoluble so that another lithography may be performed on top.

vii. Heater Material Outside Lithography

Apply AZ9260 photoresist to the wafer and spin at 5000 rpm for 30 seconds in the G3 spinner. Soft bake at 100° C. for 7 minutes on a hotplate then set aside to let rehydrate for 30 minutes. Expose in MA6 using the heater portion of the mask (with other portions covered with Kapton tape) for 76 seconds at 14 mW/cm2. Rotate the wafer and repeat to expose all 4 quadrants. Immerse with slight agitation in AZ400 solution mixed with 3 parts water for 1 minute then rinse with ultrapure water and check development, repeat with 15 second increments until image is completely delineated. Bake again at 120° C. for 2 minutes on a hotplate to reflow photoresist.

viii. Wet Etch Outside Heater Material

Etch nichrome by immersing wafer in aqua regia which is 3 parts hydrochloric acid to 1 part nitric acid solution heated to 60° C. with mild agitation until visible platinum is gone. Rinse thoroughly with water then soak the wafer in PRS2000 photoresist stripper for at least 2 hours. Wash the wafer in water and dry in a 120° C. oven for 10 minutes. If photoresist is still present longer soaking may be necessary.

ix. Heater Material Inside Lithography

Apply AZ9260 photoresist to the wafer and spin at 5000 rpm for 30 seconds in the G3 spinner. Soft bake at 100° C. for 7 minutes on a hotplate then set aside to let rehydrate for 30 minutes. Expose in MA6 using the 10 micrometer channel portion of the mask (with other portions covered with Kapton tape) for 86 seconds at 14 mW/cm$^2$, use a 500 micrometer thick wafer for support. Rotate the wafer and repeat to expose all 4 quadrants. Immerse with slight agitation in AZ400 solution mixed with 3 parts water for 6 minutes then rinse with ultrapure water and check development, repeat with 1 minute increments until the entire bottom of the inlet channel is visible. Bake again at 120° C. for 2 minutes on a hotplate to reflow photoresist.

x. RI Etch Inside Heater Material

Etch platinum and oxide over the throat by RI etch in the AOE for 6 runs of 2.5 minutes each with 5 minutes cool down in between.

xi. DRI Etch Silicon Nozzle Throat

Mount on a 6 inch diameter plain supporting wafer using crystal bonding. DRI etch in ASE for 5 minute runs (2 for AR~2, 4 for AR~4, 6 for AR~6, and 8 for AR~8) with 5 minutes cool down time between. Number of runs is determined by throat depth with decreasing etch rate with increased aspect ratio. Unmount wafer by remelting the adhesive and sliding the wafers apart, wash the crystal bonding away with water and then soak the device wafer in Bakers PRS2000 photoresist stripper overnight. Wash the wafer in water and dry in a 120° C. oven for 10 minutes. If photoresist is still present soak in NANOSTRIP 2x® for 5 minutes then wash with water.

xii. Nozzle Exit Lithography

Apply AZ9260 photoresist to the back of the wafer and spin at 1000 rpm for 30 seconds in the G3 wafer spinner. Soft bake at 100° C. for 17 minutes on a hotplate then set aside to let rehydrate for 2 hours. Expose in MA6 using outlet mask for 88 seconds at 14 mW/cm$^2$. Immerse with slight agitation in 3:1 AZ400 solution for 60 seconds then rinse with ultrapure water and check development, repeat with 60 second increments until image is completely delineated.

xiii. RI Etch Nozzle Exit Silicon Oxide Mask

RI etch in the AOE for five runs of 2.5 minutes each with 5 minutes cool down time between. Soak the device wafer in Bakers PRS2000 photoresist stripper for at least 30 minutes. Wash the wafer in water and dry in a 120° C. oven for 10 minutes.

xiv. DRI Etch Nozzle Exit

Mount on a 6 inch diameter plain supporting wafer using crystal bonding. DRI etch in ASE for 133.3, 140, 146.6, and 153.3 minutes to acquire AR~8, AR~6, AR~4, and AR~2 nozzles respectively. Unmount wafer by remelting the adhesive and sliding the wafers apart, wash the crystal bonding away with water and then soak the device wafer in Bakers PRS2000 photoresist stripper overnight. Wash the wafer in water and dry in a 120° C. oven for 10 minutes. If photoresist is still present soak in NANOSTRIP 2x® for 5 minutes then wash with water. Separate individual dies with wafer dicer. Re-clean as necessary, dip in BOE solution for 15 seconds just prior to testing to remove native oxide.

Determination of mass loss due evaporation while in quiescent or unpowered mode is helpful so that an accurate working lifetime can be established for this type of system.

The FEMTA was mounted to the bottom of the test vessel to which was added approximately 15 grams of ultrapure water. This was then weighed on an analytic scale before being placed in the vacuum chamber. This arrangement allows the back pressure on the nozzle to be controlled as it would equal the vapor pressure of the water at that temperature plus the hydrostatic pressure of the water column in the vessel. A port was added to the top of the vessel to release air from during the pump down procedure and was closed at a preprogrammed setting.

The tests were carried out in a 12 inch diameter by 12 inch height cylindrical caste acrylic vacuum chamber. Chamber pressure was measure by a 10 Torr Baratron 626, vessel pressure was measure by a 100 Torr Baratron 122, and bulk fluid temperature was measured with a T type thermocouple.

Figure 55:
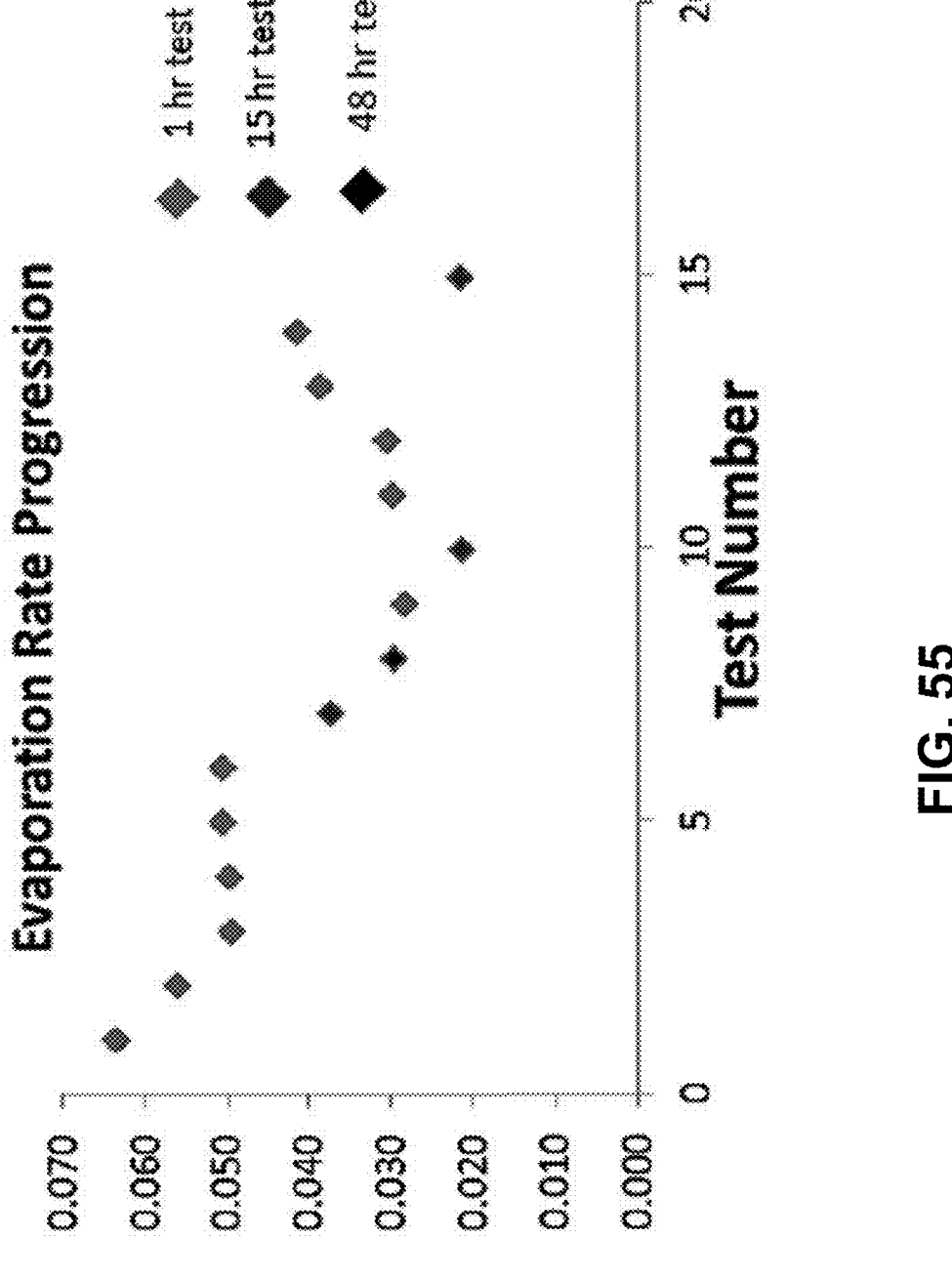
FIG. 55 shows the sequence of evaporative tests of AR~8 FEMTA nozzle.

The testing procedure was computer controlled and actuated by a dedicated control system built specifically for this purpose. A series of evaporative test measurements were performed in a vacuum chamber on AR~8 nozzles and plotted in FIG. 55. The longer duration tests show an evaporation rate through the nozzle on the order of 20 mg per hour. One hour tests are shown in blue, 15 hour tests in red and a 48 hour test in black. This results in 29.9±15.5 mg/hr evaporation rate with 95% confidence. It is believed the reduction in mass loss over time is due to reduced outgassing of the container.

Torsional balance thrust stands are in common use for performance measurement of small thrusters in the microNewton to milliNewton thrust ranges. Due to their mechanical nature these stands must be calibrated regularly to minimize drift caused by external factors such as ambient temperature change and internal variations such as inertial differences in test articles. Common calibration methods include electrostatics, linear induction motors, and piezoelectric impulse comparison, all of which in turn must be initially calibrated for force. The thrust stand in the High Vacuum Lab at Purdue University utilizes an electrostatic fin assembly originally calibrated with repeatability errors less than 3% at forces over 50 µN. The need for more accurate measurements, in particular, for a MEMS microthruster array characterization and sensing of Knudsen thermal force at low pressures, prompted a campaign of recalibration and reconfiguration to achieve better performance to values less than 10 µN.

The microNewton thrust stand system at Purdue/Aerospace Sciences Laboratory is a torsional pendulum type incorporating an electrostatic fin assembly for calibration, top and bottom Cflex® pivot bearings for motion control, and a Schaevitz® HR-050 linear variable differential transformer for deflection measurement.

Figure 56:
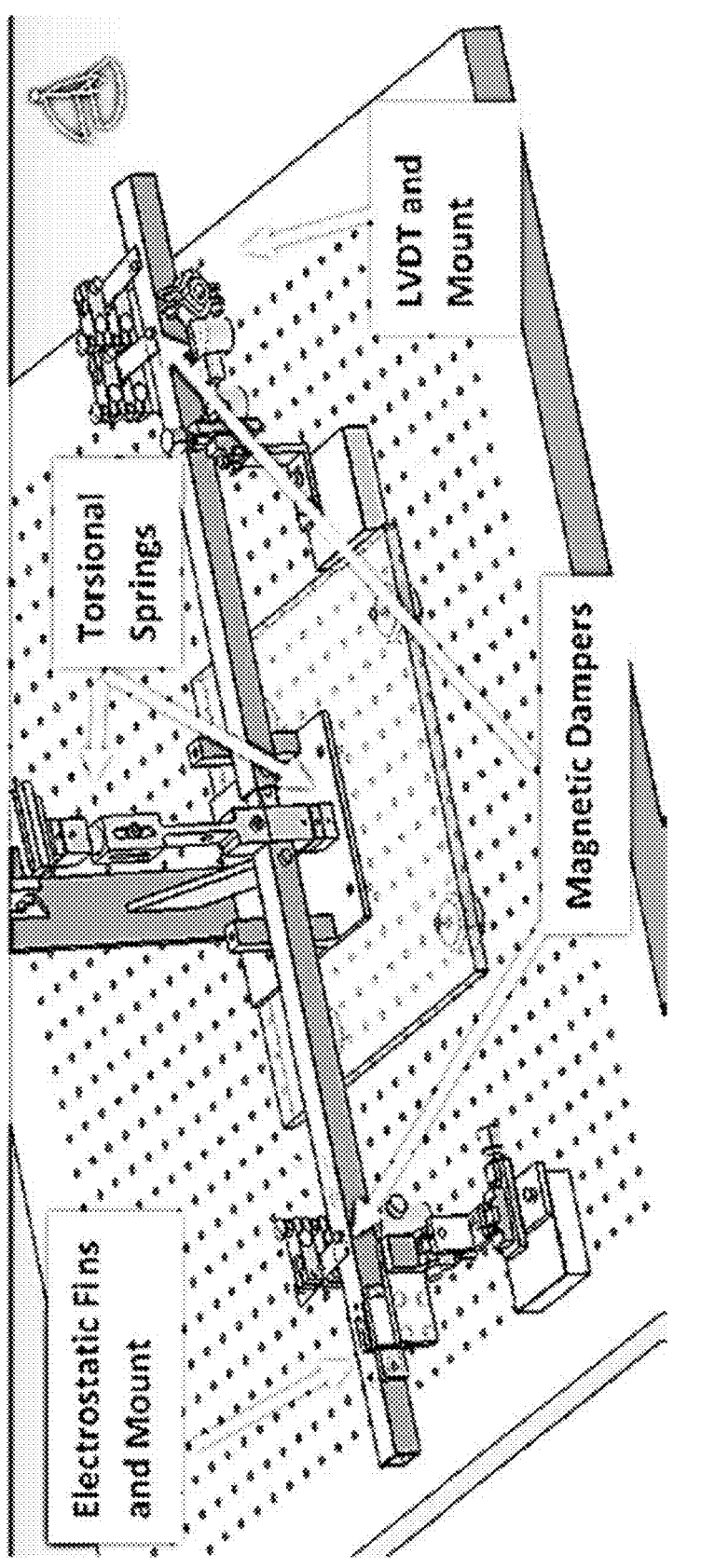
FIG. 56 shows MicroNewton thrust stand at the High Vacuum Lab at Purdue University.

The unmodified thrust stand is mounted in a 4.2 m3 aluminum vacuum chamber as shown in FIG. 56. The distances from the center of the springs to the center of the calibration fins and the center of the LVDT are both 15½ inches so that the deflections at both locations are identical. The thruster is mounted directly above the calibration fins. Typical deflection rates at the thruster are about 1.7 µN/µm, the full scale of the LVDT is 2 mm and with a 16 bit DAQ gives resolutions on the order of 60 nm which corresponds to about 0.11 µN thrust resolution.

To measure mass flow on the microgram scale the pressure change inside the chamber was integrated over time with a calibrated set of mass flows of a known gas and adjust for the pressure measurement correction factor and molecular mass. This method is made possible by the fact that the diffusion pump maintains a constant pumping speed below 10 milliTorr pressure.

The resolution of the Fisher Scientific XA-100 analytic balance used in the electrostatic fin calibration procedure is 0.1 mg which corresponds to 0.98 µN force. By virtue of the enhancement lever this is reduced to about 0.15 µN or 1.7% of the lowest calibration point at 8.7 µN. The scale accuracy is 0.001% at full scale which is negligible. The measurement error with 95% confidence at this point is 7% so that the worst case thrust measurement accuracy is 7.2%.

Although nozzle geometry has been constant through all fabrication iterations the choice and thickness of heater material and thickness of oxide insulator have varied and are listed in Table 5-1. Nozzle widths of all models were 6-8 µm with aspect ratios ranging from 2 to 8.

TABLE 5-1

| | | Heater | insulator | Heater | Wafer |
| Embodiment | Heater Material | Thickness (µm) | Thickness (µm) | Resistance (ohms) | Thickness (µm) |
|---|---|---|---|---|---|
| Variations in FEMTA heater design | | | | | |
| First Generation | Nichrome | 0.7 | 0.5 | 200-400 | 200 |
| Second Generation | Nichrome | 1.4 | 1.9 | 100-200 | 200 |
| Third Generation | Vanadium | 0.7-1.4 | 1.8 | 800-2k | 500 |
| Third Generation* | Platinum | 0.14 | 1.8 | 60-80 | 500 |

*No new fabrication only heaters replaced

Figure 57:
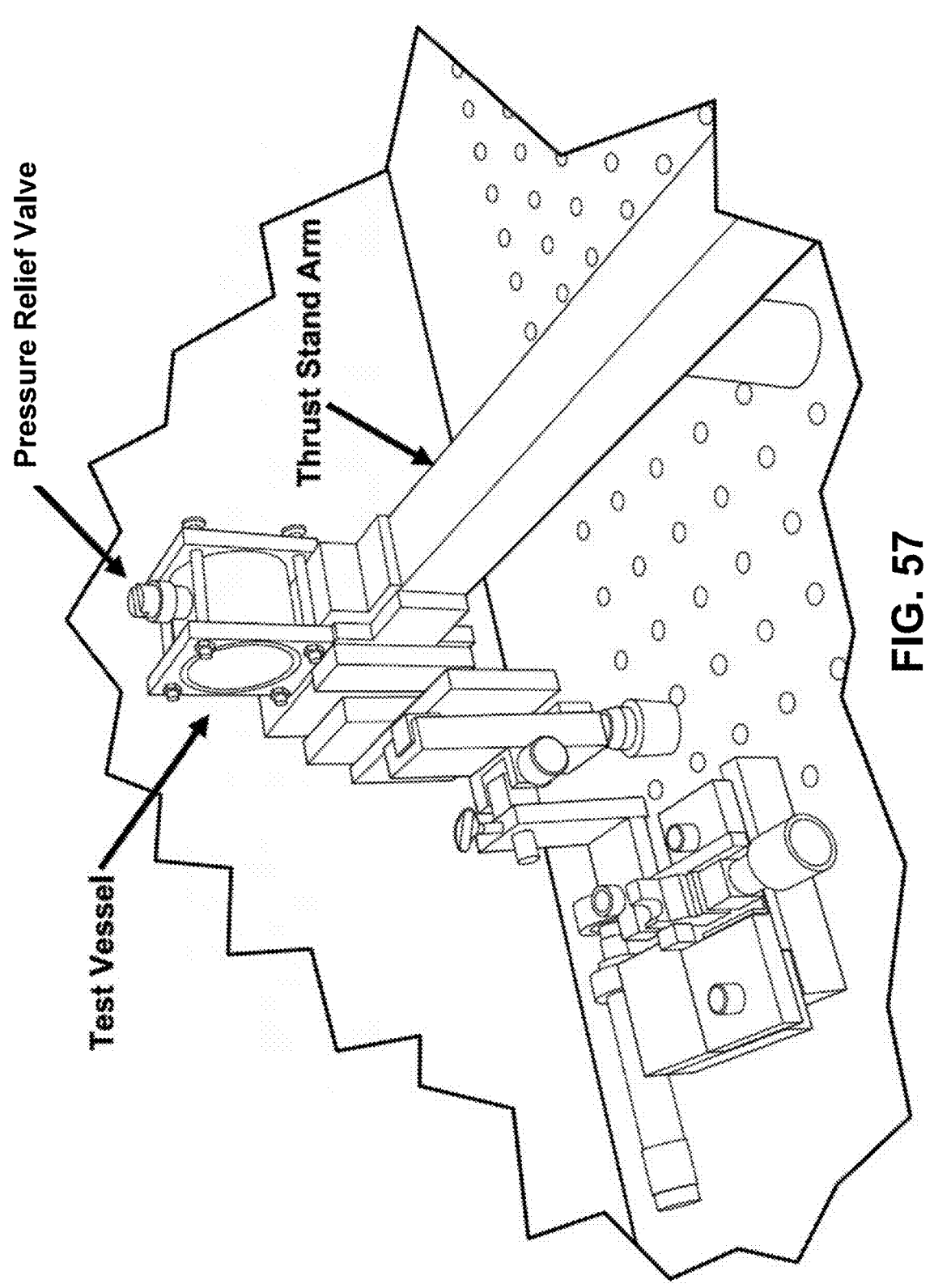
FIG. 57—Gen2 FEMTA thrust test setup.

Thrust testing of second embodiment nozzles was performed in the 4.2 cubic meter vacuum chamber at Purdue's High Vacuum Lab. The test vessel used was the same as for the first embodiment evaporation tests with minor modifications. The device was rotated so that the nozzle exit would have a horizontal orientation for mounting on the thrust stand. The pressure relief port was plugged and a new one drilled and tapped in the new vertical position. Instead of the active internal pressure control system used on previous tests a 0.5 psi fixed pressure relief valve was installed to simplify the setup. A photo of the vessel mounted on the thrust stand is displayed in FIG. 57.

The thicker nichrome layer permitted testing at higher power levels than the Gen1 models but effective lifetimes of the devices were still limited to a few minutes. Electromigration was no longer considered a factor since the current density was a magnitude lower than the accepted limit of $1\times10_6$ amps/cm$^2$. The AR~8 with the highest aspect ratio and theoretically the lowest flow rate had good survival characteristics. Maximum thrust was measured below one microNewton at all power levels indicating a viscous flow which is expected in high aspect ratio channels.

Figure 58:
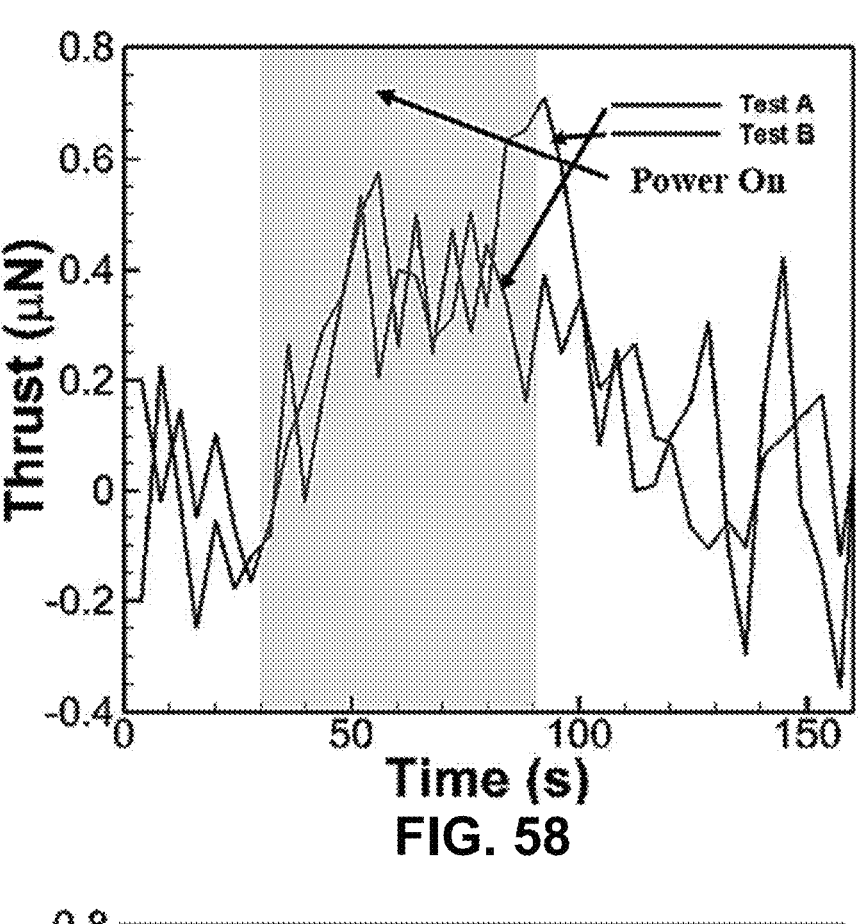
FIG. 58 is a graphical representation of thrust histories for two tests of 60 second pulses at 211 mW utilizing a 7 Volt 100 hz square wave input.
Figure 59:
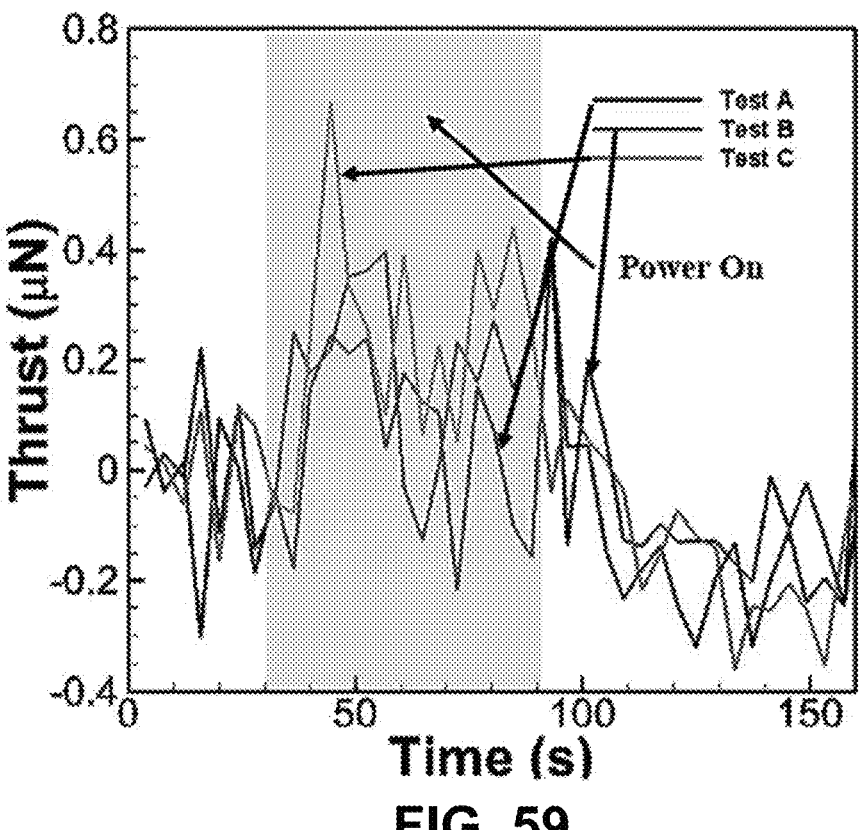
FIG. 59 is a graphical representation of thrust histories for three tests of 60 second pulses at 431 mW utilizing a 10 Volt 100 Hz square wave input.

Two tests were performed using a 7 Volt 100 hz square wave which provided 211 mW of applied power. Thrust histories are plotted in FIG. 58 and indicate forces of less than 1 microNewton which are within the noise range. Three tests at 431 mW were also performed and the results plotted in FIG. 59 and show similar thrusts.

The second embodiment FEMTA nozzles were tested in the 4.2 cubic meter vacuum chamber using the microNewton thrust stand. A test vessel was fashioned from a 1½× 1½×1 inch block of Teflon® with power connections and a fixed pressure relief valve.

The relief valve from Gen2 testing was used to reduce pressure from atmospheric to just above vapor pressure so that water would not be expelled during the pump down process. Teflon was chosen to replace the aluminum model used in thermalvac testing to reduce galvanic corrosion due to metals having a dissimilar galvanic indices in an aqueous environment.

The use of platinum heaters improved the corrosion problems experienced with chrome and vanadium so that a more comprehensive thrust testing format could be implemented. These heaters also operated at a lower voltage so that applied power could be controlled by a labview program with current augmentation from a unity gain power amplifier.

22

Figures 60, 61:
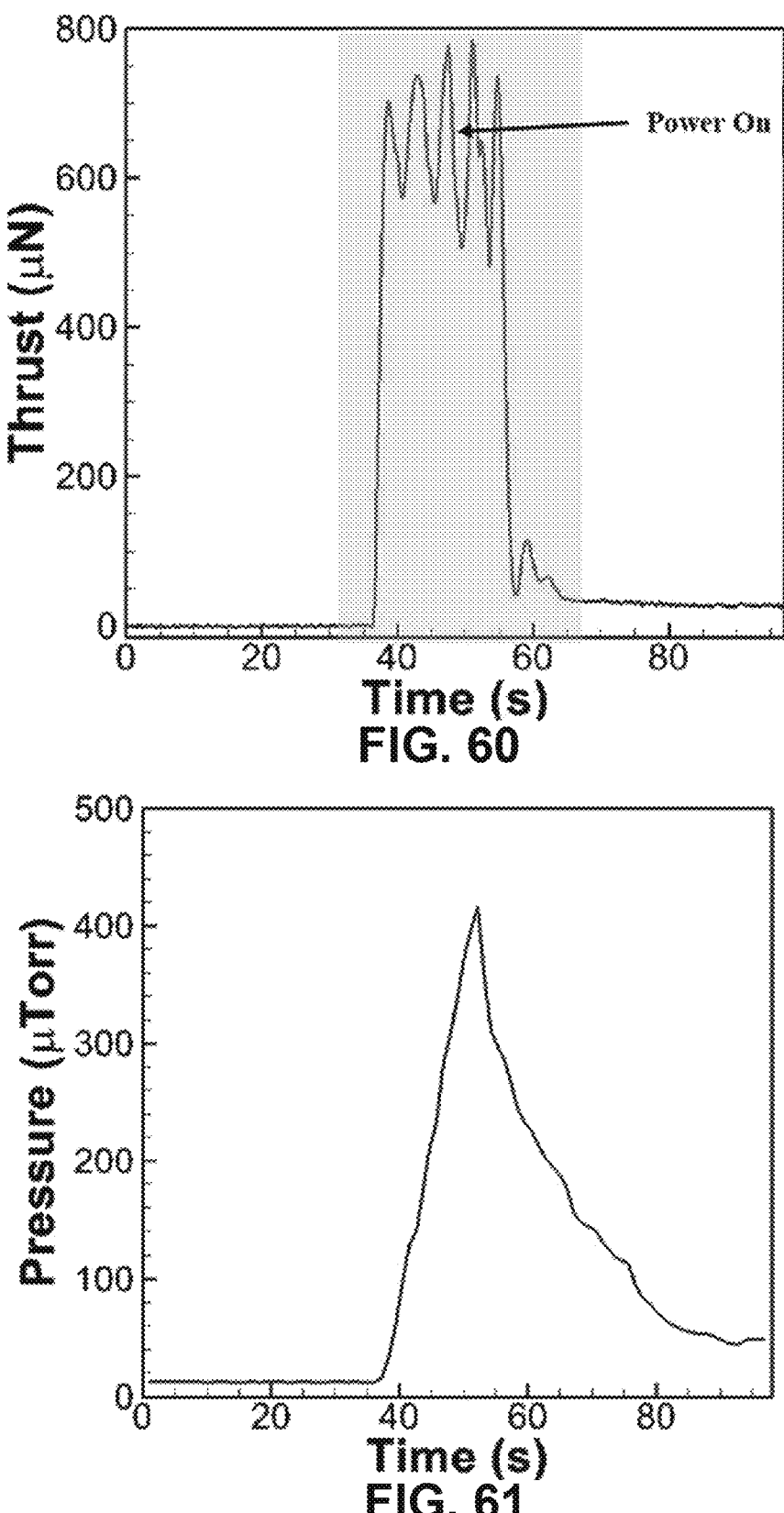
FIG. 60 is a graphical representation of thrust history of 30 second 65 mW pulse on Gen3 AR~2 nozzle with vanadium heater.
FIG. 61 is a graphical representation of pressure history of 30 second 65 mW pulse on Gen3 AR~2 nozzle with vanadium heater.

The thrust history of a 65 mW test is plotted in FIG. 60. The maximum thrust attained exceeded isentropic flow calculations through a throat of the same dimensions by a factor of two. This seemed to indicate that the flow through the nozzle throat was primarily liquid which was then vacuum boiled in the exit cavity. The total impulse was found by integrating thrust over time beginning at the start of the power pulse and continuing to the end of the test and totaled 12.7 mN·s. A pressure history of the same test is found in FIG. 61 and the change from base pressure was integrated over the same period as thrust and totaled 0.008 Torr·s which converts to 42 mg of water expelled. The Isp is then $$Isp = \frac{\text{Impulse}}{\text{mass} \cdot g} = 30 \text{ seconds.} \tag{31}$$

Figures 62, 63:
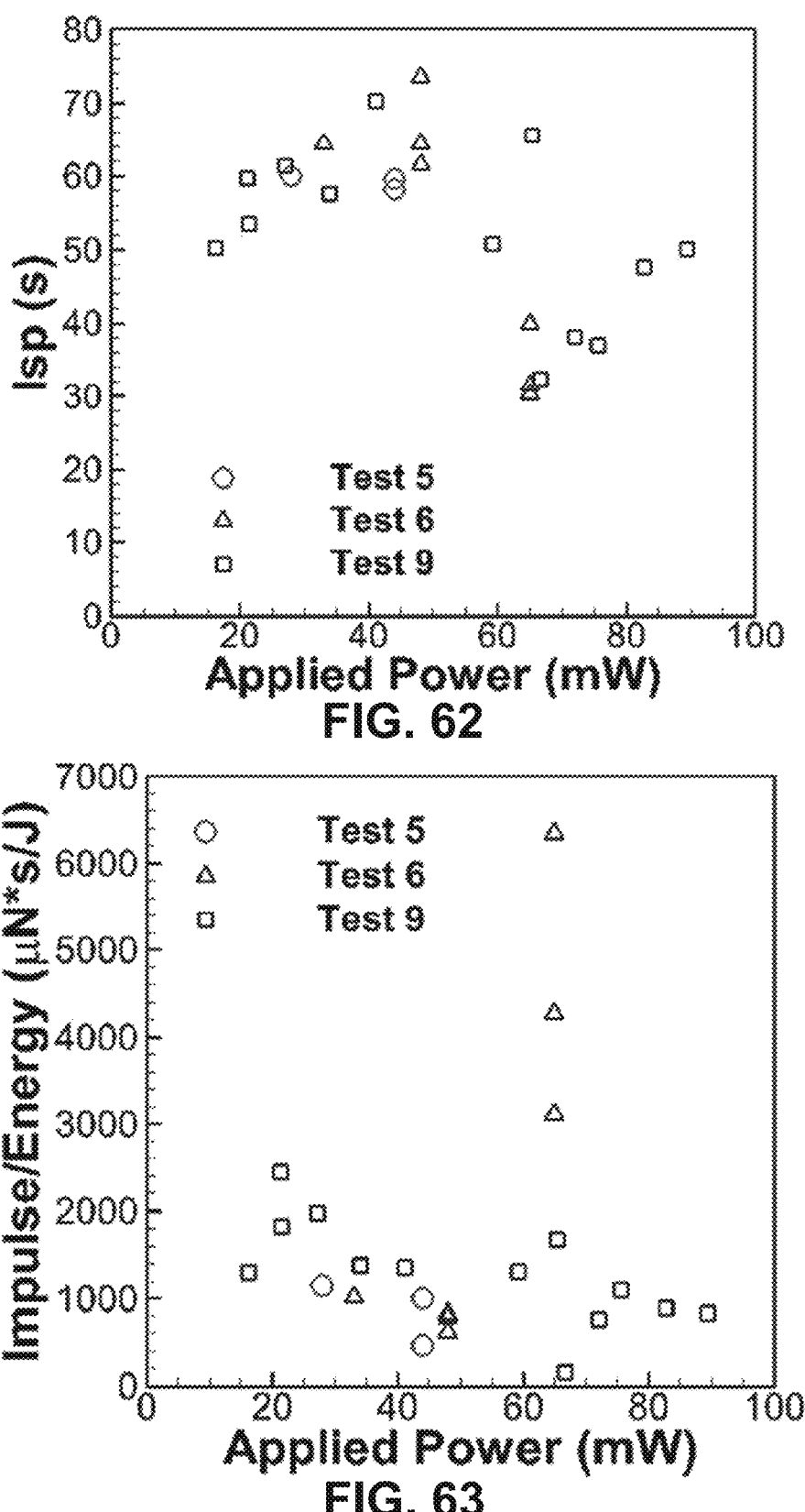
FIG. 62 shows specific Impulse vs applied power for Gen3 AR~2 nozzles with vanadium heaters.
FIG. 63 shows impulse to energy ratio vs applied power for Gen3 AR~2 nozzles with vanadium heaters.

Three AR~2 nozzles were thrust tested at different dates and varying power levels. The resistance of the vanadium tended to increase over time. A scatter plot of Isp attained vs average applied power can be found in FIG. 62 and one of impulse to energy ratio vs applied power in FIG. 63. These plots seem to indicate an extremum at around 50 mW when the Isp is highest but impulse to energy (or thrust to power) is lowest as there seems to be an inverse relationship between the two.

Figures 64, 65:
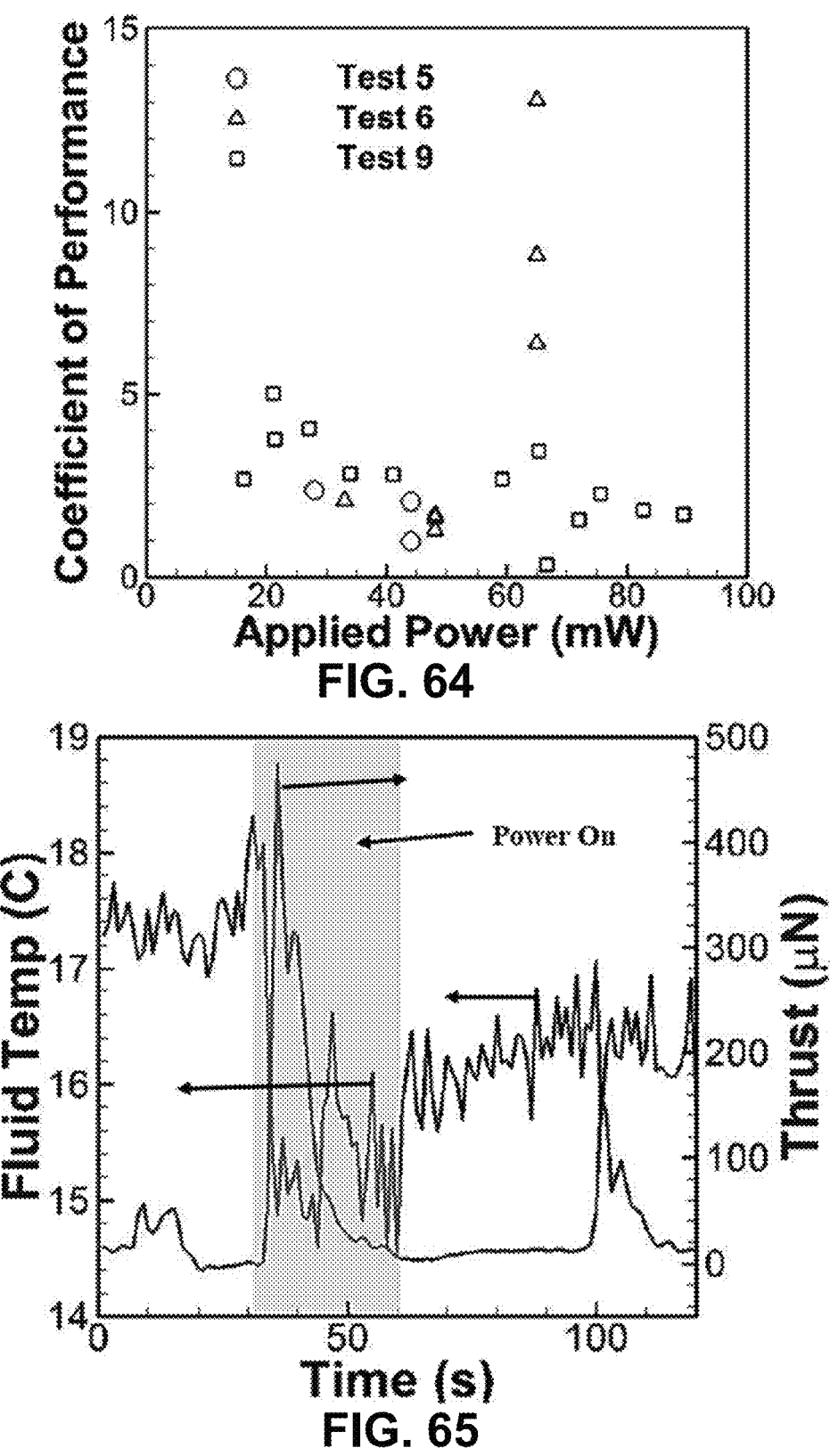
FIG. 64 shows coefficient of performance v applied power.
FIG. 65 is a graphical representation of thrust and bulk temp histories for 30 second 50 mW pulse on Gen 3 AR~2 nozzle with platinum heaters.

The Coefficient of Performance or COP is a term used in air conditioning and is the ratio of cooling power to input power and can be applied here as the ratio of energy lost to vaporization to the energy input and is plotted against applied power in FIG. 64 and mirrors the impulse to energy ratio. This is expected as the vaporization energy is provided by the bulk fluid rather than from the heaters.

The temperature histories of the single pulse tests verified the cooling effect seen in the ethylene glycol proof of concept trials. The thrust and temperature histories of a 50 mW single pulse test are plotted in FIG. 65. Note an unwanted impulse occurs before power is applied.

The temperature of 6 grams of water in the reservoir dropped about 1 degree Celsius over the course of the test. With the specific heat $$C_p = 4.18 \frac{kj}{kgK}$$

this correlates to about 23 Joules of energy lost. Approximately 13 milligrams of water was ejected as vapor$^{in}$. An energy balance can be expressed by $$W = \Delta E_{gas} + \Delta E_{liquid} \tag{33}$$

Where W is the energy added to the system and $$\Delta E_{gas} = \dot{m}(C_p \cdot \Delta T_{gas} + h_v) = 28 \text{ Joules} \tag{34}$$

is the energy change of the ejected mass with vaporization energy hv=2.2 MJ/kg. This leads to W=5 J, the known input was 50 mW for 30 seconds or 1.5 J. The other 3.5 J can be accounted for by cooling of the walls of the test vessel.

To ensure this process is thermodynamically valid an entropy balance is used $$\Delta S_{gen} = (S_2 - S_1)_{liquid} + (S_2 - S_1)_{gas} \tag{35}$$

$$(S_2 - S_1)_{liquid} = s_{liquid}{}^0 * \Delta T_{liquid} * m_{liquid} = -23 \text{ J} \tag{36}$$

Where $$S\frac{0}{\text{liquid}} = 3886 \; \frac{1}{\text{kgK}}$$

the specific entropy change for liquid water. The entropy change for the gas has two parts; the change of the liquid to FEMTA firing temperature and the change from liquid to gas, and is given by $$(S_2-S_1)_{gas}=m_{gas}(s_{liquid}{}^0*\Delta T_{gas}+\Delta_{vap}s^0*T)=43 \text{ J} \qquad (37)$$

Assuming the phase change occurred at T=323° K, which is $\Delta T_{gas}$=30° K, and $$\Delta_{vap}s^0 = 2.1 \; \frac{Mj}{\text{kgK}}$$

is the specific entropy change of vaporization, then $\Delta S_{gas}$=+ 20 Joules so that the second law of thermodynamics is not violated through the exact thermal mechanism is yet to be ascertained.

Figure 66:
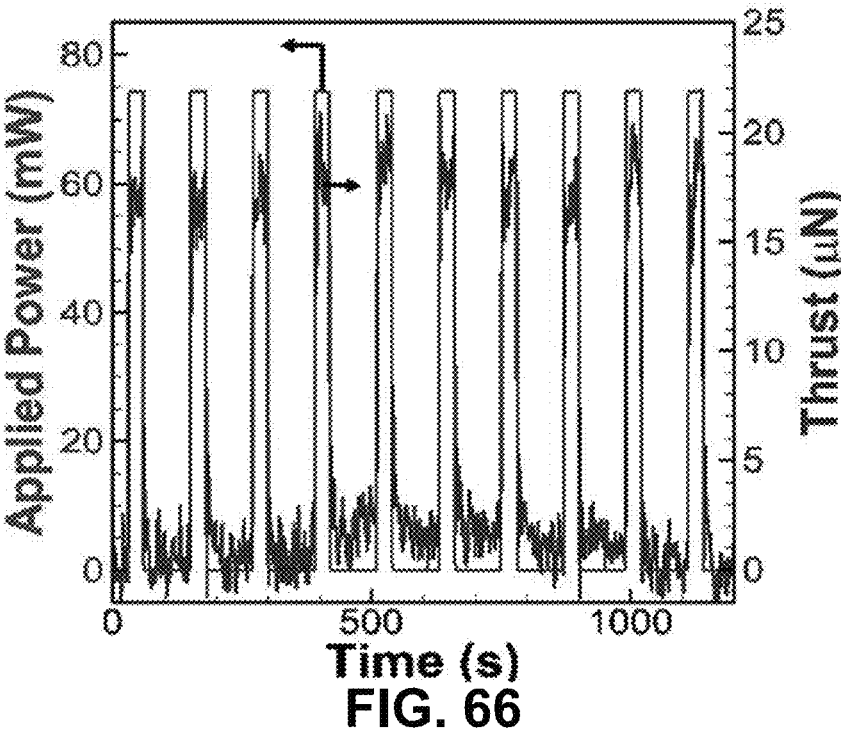
FIG. 66 shows thrust and power history for 10 pulses at 75 mW and 30 second duration with 90 second spacing.

Tests on an AR~4 nozzle provided more consistent results so that automated multipulse experiments could be conducted without unwanted mass flow or impulse bits between desired firing times. A series of tests consisting of 10 equally powered pulses of 30 second duration and 90 second delays were performed at 25, 50, 75, 125, 150, 200, and 300 milliWatts. The thrust and power histories of the 75 mW test are plotted in FIG. 66. These results show repeatable behavior with substantial thrust (when compared to prior attempts in 1$^{st}$ and 2$^{nd}$ embodiment designs. Thrust was obtained only when commanded.

Figure 67:
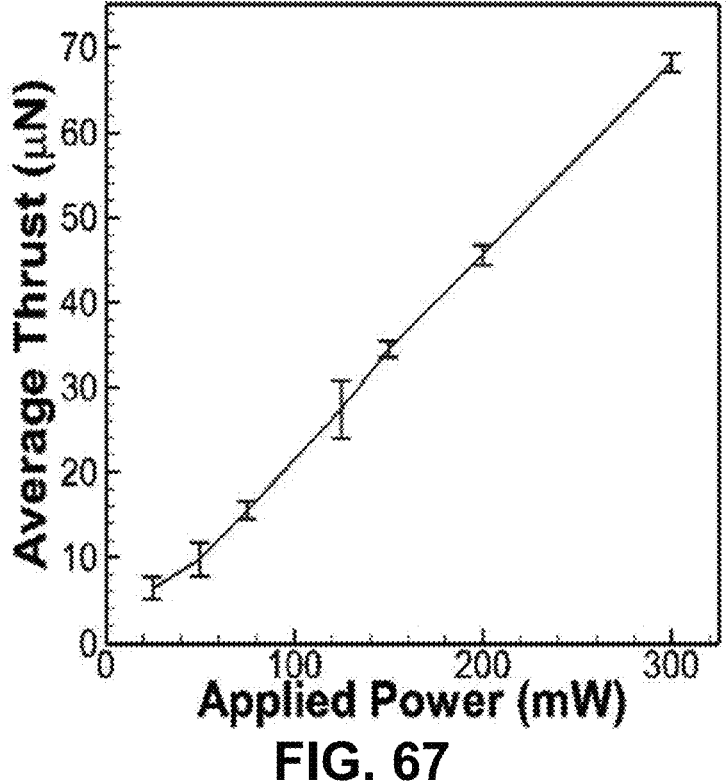
FIG. 67 shows thrust vs applied power for Gen3 AR~4 nozzle with platinum heaters.
Figures 68, 69:
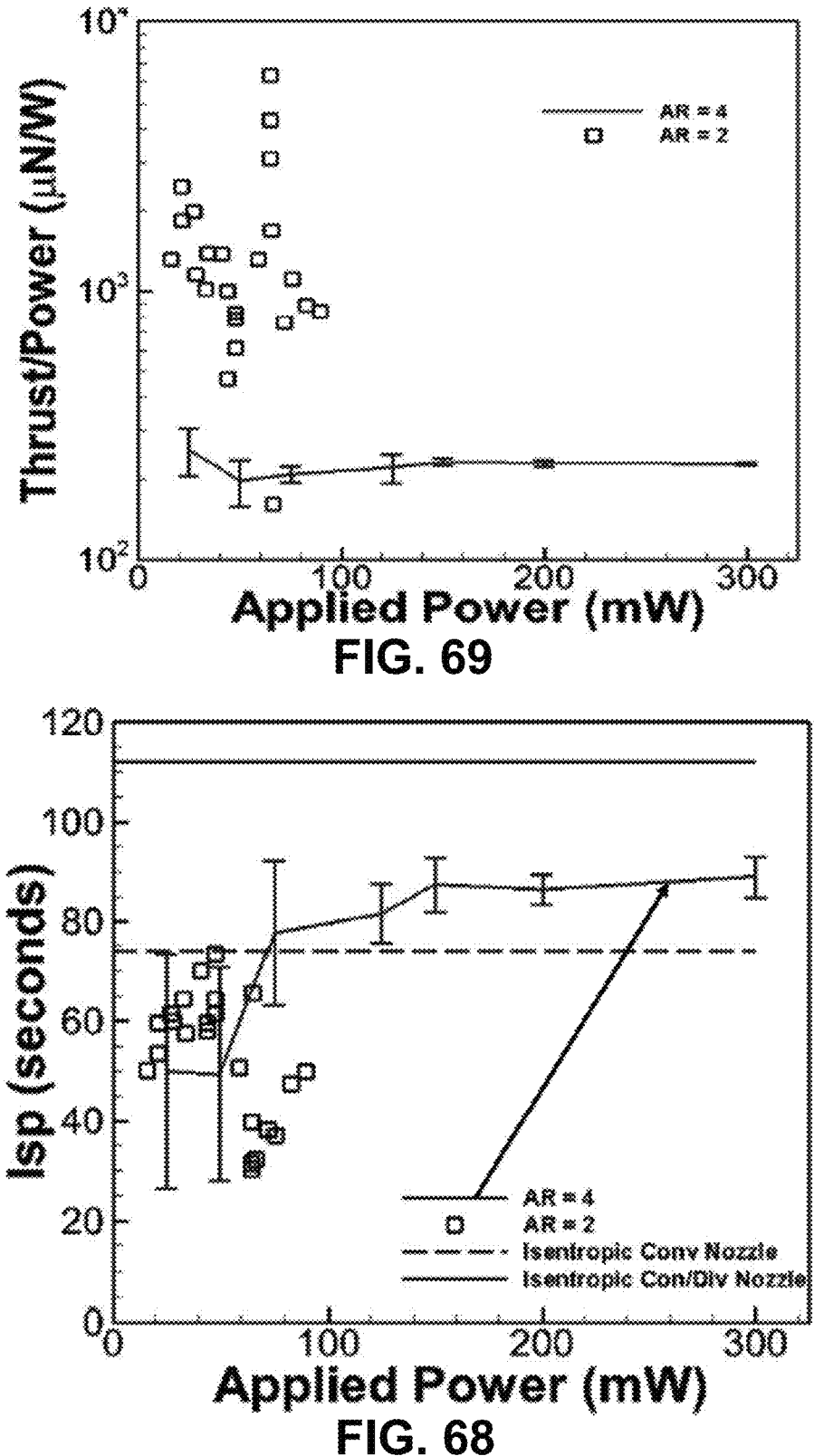
FIG. 68 shows the comparison of Isp's of Gen3 AR~2 and AR~4 nozzles with applied power.
FIG. 69 shows thrust/power ratios for AR~4 and AR~2.
Figure 70:
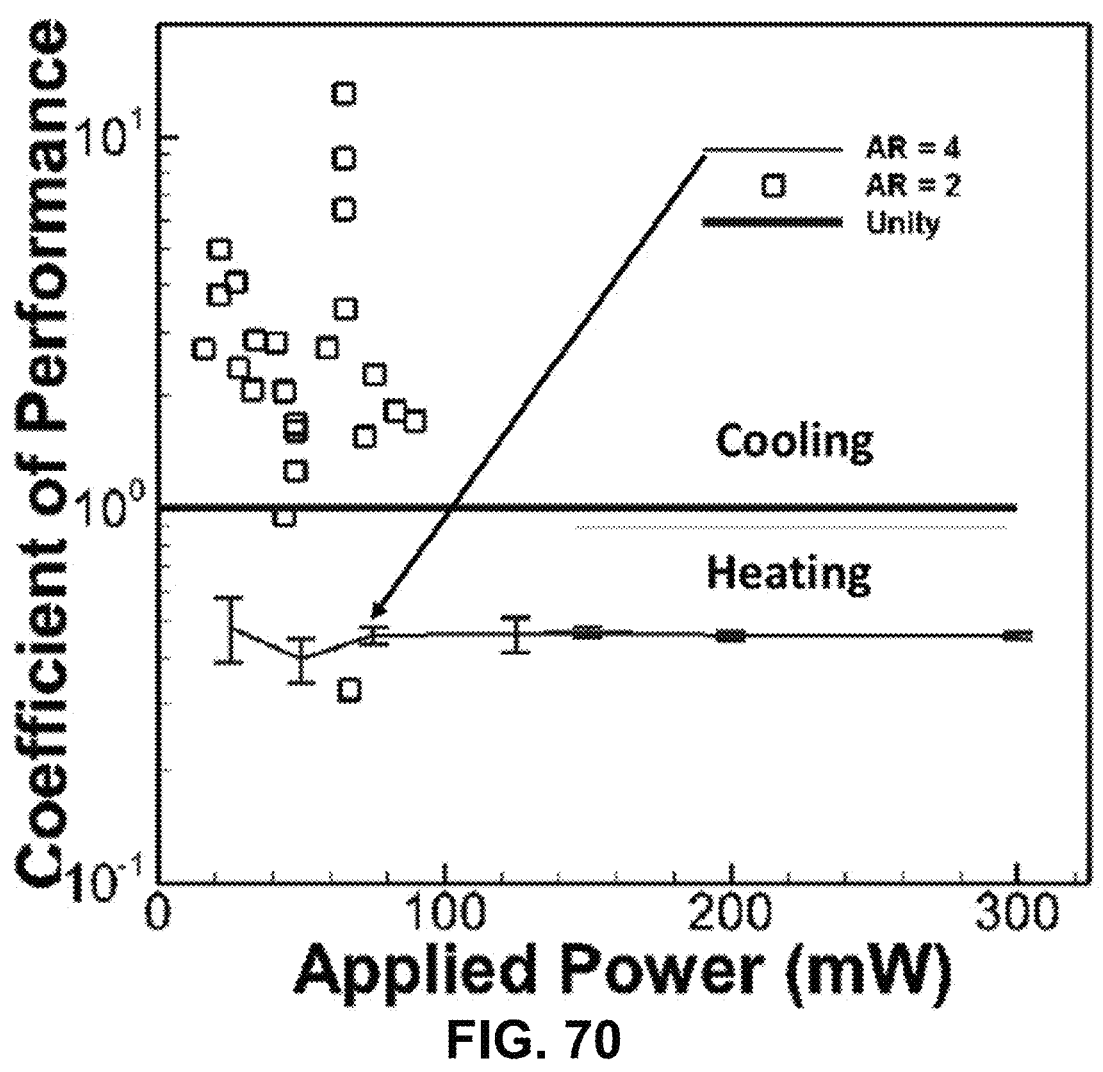
FIG. 70 shows the coefficient of performance—energy lost to energy gained for Gen 3 AR~2 and AR~4 nozzles.

The power to thrust delay time is on the order of 200 milliseconds and show none of the delays and non-commanded thrust episodes displayed by the AR~2 models. This allows taking average thrust across the pulse instead of integrating over time as was done with the AR~2 tests. Thrust data for all AR~4 tests are plotted in FIG. 67 and display a linear trend with power. The thrust to power ratio is plotted with the impulse to energy data from the AR~2 tests in FIG. 68 and indicates that the AR~2 nozzles deliver an order of magnitude more impulse per energy input than the AR~4 nozzles. Isp's for both types of FEMTA are plotted in FIG. 69 and show that at applied power of 50 mW or less the AR~2 provide as good or better performance than the AR~4 but seem to reach a peak near the isentropic limit for a converging nozzle at around 50 mW. Ratios of the vaporization energies of the water vapor produced to the total input energy are plotted in FIG. 70 against applied power for both nozzles. This should provide a measure of the cooling effect that each nozzle might produce. The vaporized mass was adjusted by multiplying the total mass ejected by the ratio of measured specific impulse to the ideal isentropic. This plot shows a cooling effect from the AR~2 that removes several times more heat than is added.

Propellant delivery in a grounded environment is supplied by simple hydrostatic pressure in conjunction with the ambient vapor pressure of the liquid. In a zero gravity setting liquid could be directed to the nozzle by means of either an elastic bladder 92 to supply pressure to the fluid or possibly a capillary type system (wick). One configuration using the optional bladder approach is illustrated in FIG. 77 and FIG. 78 which highlights the major components. The casing 91 can be of any low density vacuum compatible construction material since internal pressure is on the order of ¹⁄₁₀th of an atmosphere. Ribbon cables 97 can supply power and feedback to a thrust controller or the contacts can be made to mount the device directly to a circuit board. Some embodiments include means for relieving pressure in the casing, such as a MEMS pressure relief valve, or a FEMTA device adapted and configured to provide pressure control.

Various aspects of different embodiments of the present invention are expressed in paragraphs X1, X2, and X3 as follows:

X1. One aspect of the present invention pertains to a microelectronic thermal valve (MW). The valve preferably includes an inlet provided on an inlet side of a cap configured to be coupled to a fluid that is to be ejected out of the MTV, the inlet initiating at a first region and terminating at a first width The valve preferably includes an outlet provided on an outlet side of the cap, the outlet initiating at the first width and terminating at a second region, the space between the inlet and the outlet defining a channel having a length and the width, the width being sufficiently small such that surface tension of the fluid to be ejected would prevent free flow of the fluid out of the channel. The valve preferably includes at least one heater positioned at the first region, the heater configured to heat the fluid causing ejecting of the fluid through the channel and out of the second region X2. Another aspect of the present invention pertains to a method for controlling the flow of a substance. The method preferably includes closing an aperture in a chamber containing substance by the surface tension of the substance. The method preferably includes heating a portion of the substance proximate to the aperture and changing a physical property of the portion by said heating. The method preferably includes flowing the heated portion through the aperture, and reclosing the aperture by the surface tension of the substance after said flowing X3. Yet another aspect of the present invention pertains to a valve for controlling the flow of a substance. The valve preferably includes chamber having an interior adapted and configured as a reservoir of substance. The valve preferably includes an aperture in the chamber, the aperture having an entrance in fluid communication with the substance and an exit in fluid communication with the ambient conditions of said chamber, the aperture being adapted and configured to be blocked by the surface tension of the fluid. The valve preferably includes a source of heat proximate to the aperture; wherein application of heat from the source to the substance changes a physical property of the substance at the entrance and permits an ejection of the substance from the exit to ambient conditions.

Yet other embodiments pertain to any of the previous statements X1, X2, or X3, which are combined with one or more of the following other aspects. It is also understood that any of the aforementioned X paragraphs include listings of individual features that can be combined with individual features of other X paragraphs.

Wherein said heating changes the phase of the portion and said flowing is of the gaseous phase.

Wherein the aperture is a nozzle and which further comprises applying a force to the chamber by said flowing.

Wherein the nozzle is a converging nozzle and said applying is a net thrust in a direction.

Wherein the nozzle is a channel having a length greater than its width.

Wherein the chamber is part of a spacecraft and said flowing is to a vacuum.

Wherein the spacecraft includes an attitude control system, and said heating is by commanding with the control system; wherein the spacecraft includes a source of waste heat and said heating is with the waste heat; wherein the chamber has walls and said heating is by conduction of the waste heat into the walls.

Wherein said flowing reduces the temperature of the walls of the chamber.

Wherein said flowing reduces the temperature of the substance in the chamber.

Wherein said heating is resistively heating with the flow of electricity.

Wherein said reclosing is by stopping said heating.

Wherein said heating is resistively heating with the flow of electricity and said stopping said heating is by reducing the flow of electricity.

Wherein the physical property is the surface tension of the fluid and the application of heat reduces the surface tension.

Wherein the physical property is the vapor pressure of the fluid and the application of heat increases the vapor pressure.

Wherein the pressure of the substance in the interior is greater than the ambient pressure at the exit.

Wherein said source is electricity and which further comprises a resistive heater proximate to the aperture and in electrical communication with the source.

Wherein said resistive heater is placed downstream of the exit, upstream of the entrance, or in the throat.

Wherein the aperture has a rounded shape, including circular and oval shapes.

Wherein the aperture includes a channel having a width and a length, and the width is adapted and configured to be blocked by the surface tension of the substance.

Wherein the ratio of the length to the width is greater than about four.

Wherein the width and the length defines an aspect ratio between about 1 to about 10.

Wherein the at least one heater is platinum or vanadium.

Wherein the at least one heater is two heaters.

Wherein the inlet, the outlet, and the at least one heater are fabricated on a 500 μm thick silicon wafer.

Wherein the inlet, the outlet, and the at least one heater are fabricated on a 200 μm thick silicon wafer.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

Those skilled in the art will recognize that numerous modifications can be made to the specific implementations described above. The implementations should not be limited to the particular limitations described. Other implementations may be possible.

What is claimed is:

1. A method for applying a thrust to a spacecraft, comprising:

closing a converging nozzle in a chamber containing a substance;

conductively heating a portion of the substance within the converging nozzle by a resistive heater element and changing a physical property of the portion by said heating;

flowing the heated portion through the converging nozzle; and applying a thrust to the chamber by said flowing, wherein the converging nozzle has an inlet having a width, and said closing the converging nozzle is by the surface tension of the substance across the width of the inlet.

* * * * *